(12) United States Patent
Serita et al.

(10) Patent No.: US 10,292,086 B2
(45) Date of Patent: May 14, 2019

(54) INFORMATION PROCESSING DEVICE AND INFORMATION PROCESSING METHOD

(71) Applicant: SONY CORPORATION, Tokyo (JP)

(72) Inventors: Kazutoshi Serita, Tokyo (JP); Kazuyuki Sakoda, Chiba (JP); Masayuki Takada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 15/104,637

(22) PCT Filed: Nov. 7, 2014

(86) PCT No.: PCT/JP2014/079567
§ 371 (c)(1),
(2) Date: Jun. 15, 2016

(87) PCT Pub. No.: WO2015/098311
PCT Pub. Date: Jul. 2, 2015

(65) Prior Publication Data
US 2016/0323801 A1    Nov. 3, 2016

(30) Foreign Application Priority Data

Dec. 26, 2013   (JP) .................................. 2013-268387

(51) Int. Cl.
*H04W 40/04*  (2009.01)
*H04W 40/24*  (2009.01)
*H04W 40/02*  (2009.01)

(52) U.S. Cl.
CPC ........... *H04W 40/04* (2013.01); *H04W 40/02* (2013.01); *H04W 40/24* (2013.01)

(58) Field of Classification Search
CPC ..... H04W 40/02; H04W 40/04; H04W 40/24; H04W 16/22; H04W 24/06; H04W 4/70; H04W 84/18
See application file for complete search history.

(56) References Cited

U.S. PATENT DOCUMENTS

| 6,286,044 B1 | 9/2001 | Aoyama |
| 6,650,347 B1 * | 11/2003 | Nulu ....................... H04L 67/36 700/83 |

(Continued)

FOREIGN PATENT DOCUMENTS

| EP | 2466798 A1 | 6/2012 |
| JP | 2005-123781 A | 5/2005 |

(Continued)

OTHER PUBLICATIONS

Extended European Search Report of EP Patent Application No. 14874719.9, dated Aug. 25, 2017, 08 pages.
Office Action for JP Patent Application No. 2015-554653, dated Aug. 28, 2018, 11 pages of Office Action and 04 pages of English Translation.

(Continued)

Primary Examiner — Paul H Masur
(74) Attorney, Agent, or Firm — Chip Law Group

(57) ABSTRACT

Provided is an information processing device that includes a control unit. The control unit performs control of making a display unit display, as route information, relations between a plurality of information processing devices and routes related to wireless communication in a network in which the plurality of information processing devices are interconnected by the plurality of information processing devices performing the wireless communication in a one-to-one manner. The control unit controls the wireless communication in the network on the basis of operation input related to the route information displayed at the display unit.

20 Claims, 30 Drawing Sheets

(56) References Cited

U.S. PATENT DOCUMENTS

| | | | |
|---|---|---|---|
| 7,315,985 B1 * | 1/2008 | Gauvin | H04L 41/12 715/734 |
| 8,848,558 B1 * | 9/2014 | Martin | H04L 41/12 370/252 |
| 2008/0043627 A1 * | 2/2008 | Singh | H04L 45/00 370/241 |
| 2008/0101258 A1 | 5/2008 | Cheng | |
| 2009/0259746 A1 | 10/2009 | Sasaki | |
| 2009/0296600 A1 * | 12/2009 | Canright | H04L 41/12 370/254 |
| 2009/0327903 A1 * | 12/2009 | Smith | H04L 41/12 715/737 |
| 2010/0138794 A1 * | 6/2010 | Ganey | G06F 3/04817 715/853 |
| 2012/0213520 A1 * | 8/2012 | Doverspike | H04J 14/0257 398/79 |
| 2015/0163210 A1 * | 6/2015 | Meyers | H04W 4/70 726/4 |

FOREIGN PATENT DOCUMENTS

| | | |
|---|---|---|
| JP | 2005-301998 A | 10/2005 |
| JP | 2005-531173 A | 10/2005 |
| JP | 2008-283275 A | 11/2008 |
| JP | 2009-239385 A | 10/2009 |
| JP | 2009-246420 A | 10/2009 |
| JP | 2009-253927 A | 10/2009 |
| JP | 2011-193146 A | 9/2011 |
| WO | 03/098816 A | 11/2003 |
| WO | 2011/028381 A | 3/2011 |
| WO | 2011/028381 A2 | 3/2011 |
| WO | 2013/055800 A | 4/2013 |
| WO | 2013/055800 A1 | 4/2013 |

OTHER PUBLICATIONS

Office Action for JP Patent Application No. 2015-554653, dated Apr. 2, 2019, 03 pages of Office Action.

* cited by examiner

FUNCTIONAL LAYER EXAMPLE OF
INFORMATION PROCESSING DEVICE CONFIGURING MESH NETWORK

FIG. 4

OTHER DEVICE INFORMATION
MANAGEMENT TABLE
200

| TERMINAL IDENTIFICATION INFORMATION 201 | POSITION INFORMATION 202 | | RELAY NODE INFORMATION 203 | CONNECTION INFORMATION 204 | PREDICTED COMMUNICATION SPEED 205 | CHARGING INFORMATION 206 | POINT INFORMATION 207 | CONNECTION PERMITTED TIME INFORMATION 208 | SERVICE INFORMATION 209 | GROUP INFORMATION 210 |
|---|---|---|---|---|---|---|---|---|---|---|
| | LATITUDE | LONGITUDE | | | | | | | | |
| 0011 | ... | ... | ... | CONNECTED | 80 Mbps | 0.17 YEN / PACKET | 17 POINTS | 10 MINUTES | CONTENTS A | ID1 |
| 0012 | ... | ... | ... | CONNECTED | 100 Mbps | 0.06 YEN / PACKET | 34 POINTS | 5 MINUTES | ADVERTISEMENT A | ID1 |
| 0013 | ... | ... | ... | CONNECTION CANDIDATE | 70 Mbps | 0.45 YEN / PACKET | 56 POINTS | 13 MINUTES | ADVERTISEMENT B | ID1 |
| 0014 | ... | ... | ... | CONNECTION CANDIDATE | 100 Mbps | 0.01 YEN / PACKET | 10 POINTS | 45 MINUTES | ADVERTISEMENT C ADVERTISEMENT D | ID1 |
| 0015 | ... | ... | ... | CONNECTION CANDIDATE | 50 Mbps | — | 13 POINTS | 32 MINUTES | — | ID2 |
| 0016 | ... | ... | ... | CONNECTION CANDIDATE | 60 Mbps | — | 45 POINTS | 11 MINUTES | CONTENTS B | ID2 |
| 0017 | ... | ... | ... | CONNECTION CANDIDATE | 120 Mbps | 0.67 YEN / PACKET | — | 4 MINUTES | — | ID2 |
| 0018 | ... | ... | ... | CONNECTION CANDIDATE | 70 Mbps | 0.87 YEN / PACKET | — | 10 MINUTES | — | ID1 |
| 0019 | ... | ... | ... | CONNECTION CANDIDATE | 10 Mbps | 0.34 YEN / PACKET | 32 POINTS | 3 MINUTES | CONTENTS C TO E | ID1 |
| 0021 | ... | ... | ... | CONNECTED | ... | — | — | — | — | BS1 |
| 0022 | ... | ... | ... | CONNECTION CANDIDATE | ... | — | — | — | — | BS2 |
| ⋮ | ⋮ | ⋮ | ⋮ | ⋮ | ⋮ | ⋮ | ⋮ | ⋮ | ⋮ | ⋮ |

FIG. 5

SUBJECT DEVICE INFORMATION
MANAGEMENT TABLE
220

| 221 RELAY NODE SETTING INFORMATION | 222 CHARGING INFORMATION | 223 REQUEST POINT INFORMATION | 224 POSSESSED POINT INFORMATION | 225 CONNECTION PERMITTED TIME INFORMATION | 226 SERVICE INFORMATION | 227 GROUP INFORMATION | ... |
|---|---|---|---|---|---|---|---|
| RELAY NODE POSSIBLE | 0.01 YEN / PACKET | 10 POINTS / 1 CONNECTION | 107 POINTS | 10 MINUTES / 1 CONNECTION | CONTENTS AB <br> ADVERTISEMENT CD <br> ⋮ | ID 1 | ... |

FIG. 8
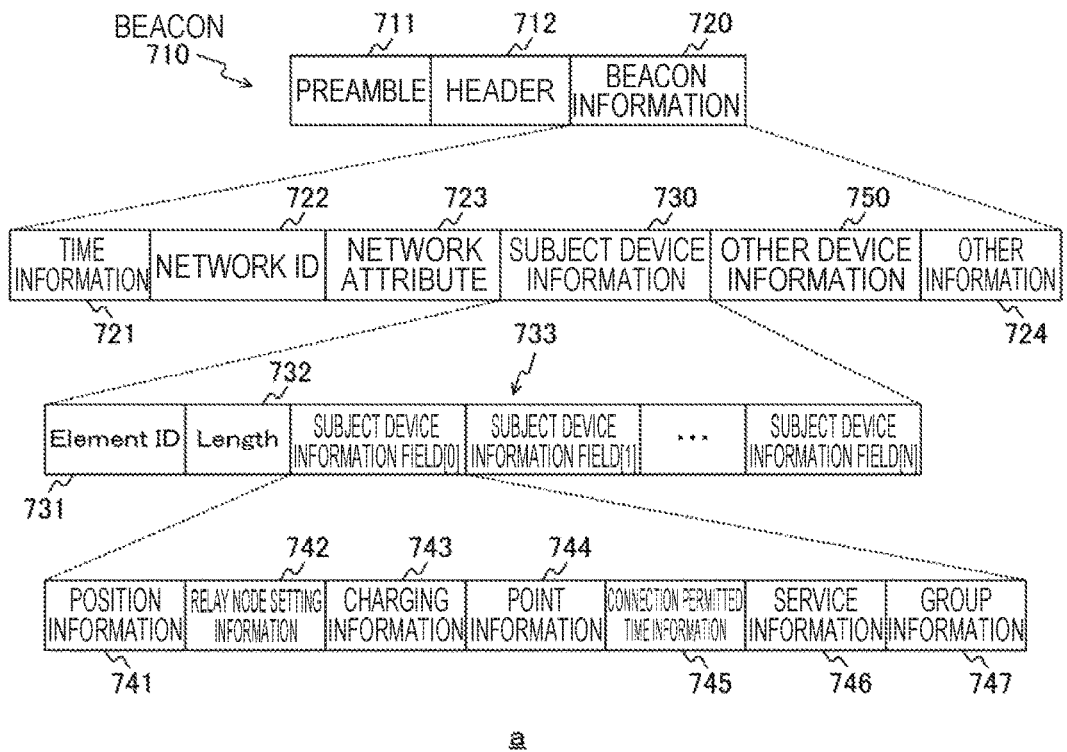
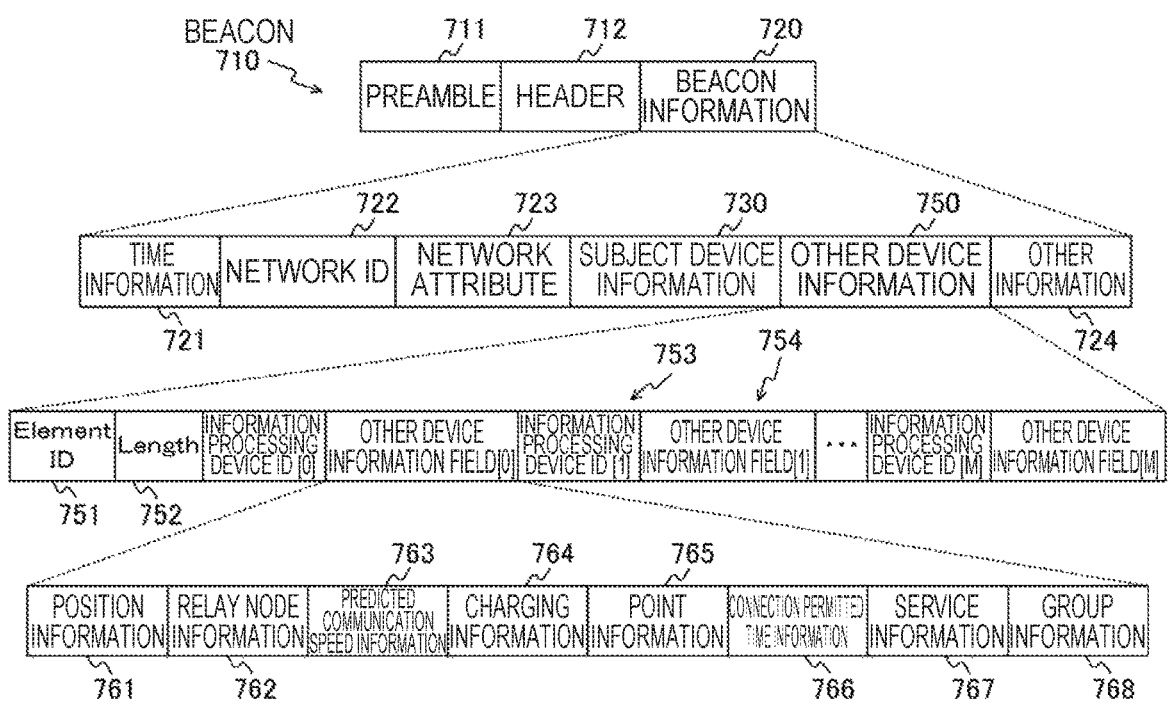

FIG. 14

| RELAY NODE | 12 | 12-13 | 14-13 | 14-13-12 |
|---|---|---|---|---|
| PREDICTED COMMUNICATION SPEED | 100Mbps | 80Mbps | 140Mbps | 170Mbps |
| CHARGING INFORMATION | 0.06 YEN / PACKET | 0.04 YEN / PACKET | 0.13 YEN / PACKET | 0.07 YEN / PACKET |
| POINT INFORMATION | 17 POINTS | 19 POINTS | 25 POINTS | 65 POINTS |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2014/079567 filed on Nov. 7, 2014, which claims priority benefit of Japanese Patent Application No. JP 2013-268387 filed in the Japan Patent Office on Dec. 26, 2013. Each of the above-referenced applications is hereby incorporated herein by reference in its entirety.

TECHNICAL FIELD

The present technology relates to an information processing device, and specifically, to an information processing device configured to exchange various pieces of information using wireless communication, an information processing method thereof and a program causing a computer to execute the method.

BACKGROUND ART

In the related art, wireless communication technologies in which wireless communication is used to exchange various types of data are provided. For example, a communication method (for example, ad hoc communication or an ad hoc network) in which autonomous interconnection is performed with a nearby wireless communication device is proposed (for example, refer to Patent Literature 1).

CITATION LIST

Patent Literature

Patent Literature 1: JP 2009-239385A

SUMMARY OF INVENTION

Technical Problem

According to the above-described technologies of the related art, it is possible to exchange various types of data between two information processing devices using wireless communication without wired line connection. In addition, in such a network, the information processing devices can communicate with a nearby information processing device without depending on a master station such as a control device. Further, in an ad hoc network, when a new information processing device appears nearby, the new information processing device can also freely participate in the network. Therefore, it is possible to increase coverage of the network according to an increased number of information processing devices nearby.

In addition, each information processing device can transfer information exchanged with other information processing devices in a bucket brigade manner (a so-called multi-hop relay) in addition to autonomously interconnecting with a nearby information processing device. In addition, a network in which multi-hop is performed is generally known as a mesh network.

In this manner, in the ad hoc network or the mesh network, it is possible to freely communicate with a nearby information processing device. In addition, by connecting to the nearby information processing device, the network can be extended. In this manner, in the case that the network is extended, since information processing devices that can be connected increase, it is important to easily recognize relations of the information processing devices.

The present technology is created in consideration of such a situation, and an object thereof is to easily recognize relations of information processing devices in a network.

Solution to Problem

The present technology is devised to solve the above-described problem, and a first aspect thereof resides in an information processing device, an information processing method thereof, and a program that makes a computer to execute the information processing method, the information processing device including: a control unit that makes a display unit display, as route information, relations between a plurality of information processing devices and routes related to wireless communication in a network in which the plurality of information processing devices are interconnected by the plurality of information processing devices performing the wireless communication in a one-to-one manner, and controls the wireless communication in the network on the basis of operation input related to the route information. Thus, an action of displaying route information and controlling wireless communication in a network on the basis of operation input about the route information is exerted.

According to the first aspect, the control unit may perform control of making the display unit display, as the route information, at least one of connection route information indicating a connection route when the information processing device is connected to another information processing device by utilizing the wireless communication and connection candidate route information indicating a route through which the information processing device is capable of being connected to the other information processing device by utilizing the wireless communication. Thus, an action of displaying at least one of connection route information and connection candidate route information is exerted.

According to the first aspect, when the operation input of selecting a route in the connection candidate route information displayed at the display unit is performed, the control unit may perform control for connecting the information processing device and the other information processing device via the selected route. Thus, in the case that operation input of selecting a route in connection candidate route information displayed at a display unit is performed, an action of connecting a subject device and other information processing devices through the selected route is exerted.

According to the first aspect, when the operation input of selecting the other information processing device displayed at the display unit is performed, the control unit may perform control for connecting the information processing device to the selected other information processing device. Thus, in the case that operation input of selecting other information processing devices displayed at a display unit is performed, an action of connecting a subject device to the selected other information processing devices is exerted.

According to the first aspect, the control unit may perform control of transmitting a connection request for connecting to the selected other information processing device to the other information processing device by utilizing the wireless communication. Thus, an action of transmitting to other information processing devices a connection request for connecting to the selected other information processing devices is exerted.

According to the first aspect, the control unit may perform control of making the display unit display information related to another information processing device, which is information including at least one of communication speed information, charging information and point information, in association with the other information processing device. Thus, an action of displaying information including at least one of communication speed information, charging information and point information in association with other information processing devices is exerted.

According to the first aspect, the control unit may perform control of making the display unit display at least one of user information related to a user managing another information processing device and service information related to a service that the other information processing device is capable of providing by utilizing the wireless communication in association with the other information processing device. Thus, an action of displaying at least one of user information and service information in association with other information processing devices is exerted.

According to the first aspect, the control unit may make the display unit display point information related to another information processing device in association with the other information processing device, and may perform control for exchanging the point information with the other information processing device when the information processing device is connected to the other information processing device by utilizing the wireless communication. Thus, in the case that point information about other information processing devices is displayed in association with other information processing devices and a subject device is connected to other information processing devices, an action of exchanging the point information with other information processing devices is exerted.

According to the first aspect, the control unit may perform control for transferring a point specified by the point information to the other information processing device when the information processing device is connected to the other information processing device by utilizing the wireless communication. Thus, in the case that a subject device is connected to other information processing devices, an action of transferring points to other information processing devices is exerted.

According to the first aspect, the point may be set on the basis of connection time with the other information processing device. Thus, an action of transferring points set on the basis of connection time with other information processing devices to other information processing devices is exerted.

According to the first aspect, the control unit may perform control of making the display unit display priority information related to the route information, on the basis of setting information set beforehand. Thus, an action of displaying priority information about route information on the basis of setting information set beforehand is exerted.

According to the first aspect, the setting information may include at least one of communication speed information, charging information, point information and user information related to a user managing the information processing device. The control unit may extract an information processing device satisfying at least one of information items included in the setting information from the plurality of information processing devices and may perform control of making the display unit display the priority information for specifying the extracted information processing device or a route for connecting to the information processing device. Thus, an action of extracting an information processing device that satisfies at least one of information items included in setting information from a plurality of information processing devices, and displaying priority information for specifying the extracted information processing device or a route for connecting to the information processing device is exerted.

According to the first aspect, the control unit may perform control of making the display unit display each of the plurality of information processing devices distinguishably in group units. Thus, an action of displaying each of a plurality of information processing devices so as to be identified in units of groups is exerted.

According to the first aspect, when a selecting operation of selecting another information processing device to be a provision destination of a service is accepted, the control unit may perform control for providing the selected other information processing device with the service by utilizing the wireless communication. Thus, in the case that a selecting operation of selecting other information processing devices to be service providing destinations is accepted, an action of providing the selected other information processing devices with a service is exerted.

According to the first aspect, the control unit may make the display unit display each of the plurality of information processing devices distinguishably in group units, and when a selecting operation of selecting a group to be a provision destination of a service is accepted, the control unit may perform control for providing each information processing device belonging to the selected group with the service by utilizing the wireless communication. Thus, in the case that a selecting operation of selecting a group to be a service providing destination is accepted, an action of providing information processing devices belonging to the selected group with a service is exerted.

According to the first aspect, when a selecting operation of selecting another information processing device to be made to execute a predetermined operation is accepted, the control unit may perform control for making the selected other information processing device execute the predetermined operation by utilizing the wireless communication. Thus, in the case that a selecting operation of selecting other information processing devices to be made to execute a predetermined operation is accepted, an action of making the selected other information processing devices execute the predetermined operation is exerted.

According to the first aspect, the operation input may be at least one of a touch operation on a display surface of the display unit and an operation by a pointer using a pointing device. Thus, an action of controlling wireless communication in a network on the basis of operation input of at least one of a touch operation on a display surface of a display unit and an operation by a pointer using a pointing device is exerted.

According to the first aspect, when a connection request from another information processing device displayed as the route information is received, the control unit may make the display unit display notice information for notifying that the connection request is received, and may control the wireless communication with the other information processing device on the basis of the operation input related to whether or not to permit connection for the connection request. Thus, in the case of receiving a connection request from other information processing devices, an action of displaying notice information for notifying that the connection request is received, and controlling wireless communication with other information processing devices on the basis of operation input about whether or not to permit connection for the connection request is exerted.

Advantageous Effects of Invention

According to the present technology, an excellent effect that relations of information processing devices in a network can be easily recognized can be demonstrated. Note that, effects described herein are not necessarily limited, and any effect described in the present disclosure may be achieved.

BRIEF DESCRIPTION OF DRAWINGS

FIG. 4 is a diagram schematically illustrating an example of management contents of another device information management table 200 stored in a memory 140 in a first embodiment of the present technology.

FIG. 5 is a diagram schematically illustrating an example of management contents of a subject device information management table 220 stored in the memory 140 in a first embodiment of the present technology.

FIG. 8 is a diagram illustrating a format example of a beacon transmitted by information processing devices of the communication system 10 in a first embodiment of the present technology.

FIG. 14 is a diagram illustrating an example of a display screen displayed at the input/output unit 170 in a first embodiment of the present technology.

DESCRIPTION OF EMBODIMENTS

Hereinafter, a form (hereinafter referred to as an "embodiment") for implementing the present technology will be described. The description will proceed in the following order.
1. First embodiment (an example of performing connection processing with other information processing devices on the basis of a user operation in an input/output unit where route information, reference information and service information or the like are displayed)
2. Second embodiment (an example of displaying recommendation information according to preferences of a user)
3. Third embodiment (an example of displaying information processing devices in units of groups)
4. Fourth Embodiment (an example of negotiating a connection condition)
5. Fifth embodiment (an example of confirming whether or not to permit the connection in an information processing device selected as a connection destination)
6. Application example

1. First Embodiment

[Configuration Example of Communication System]

Figure 1:
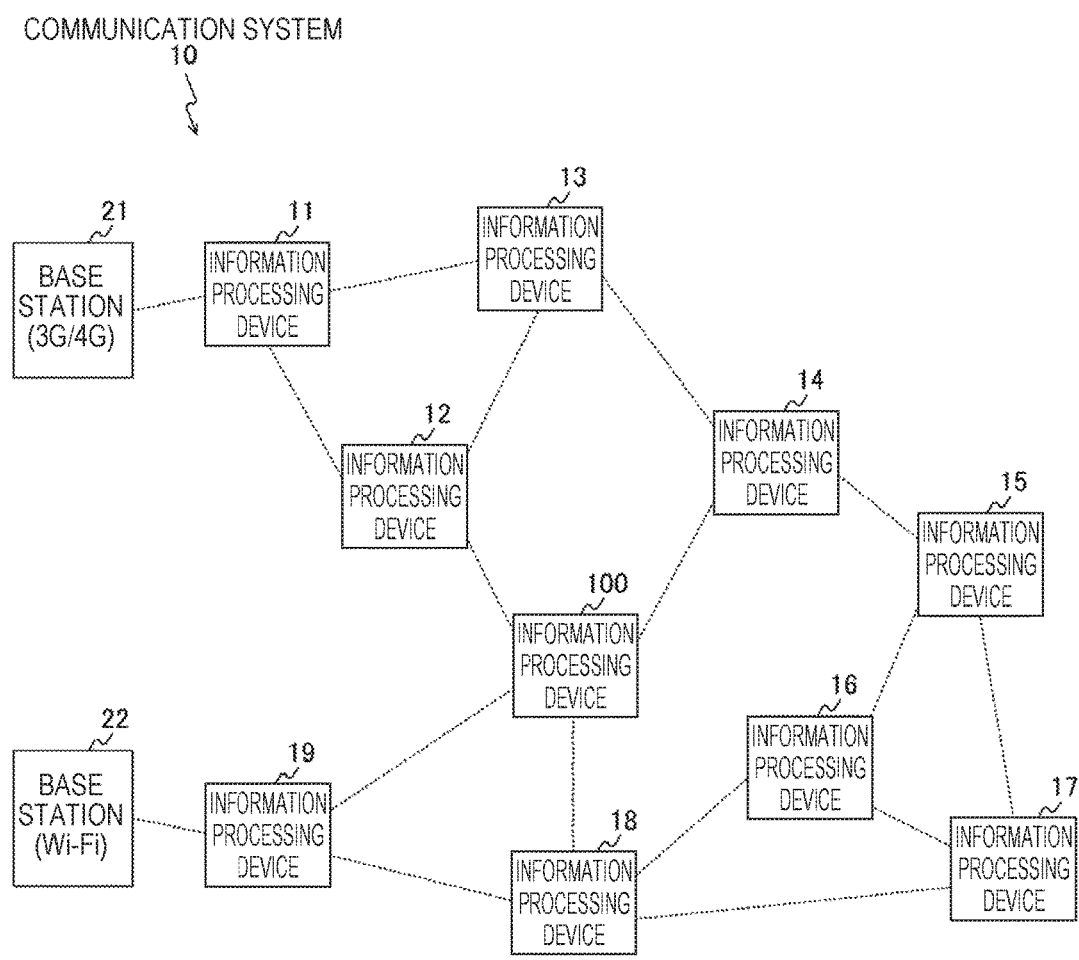
FIG. 1 is a diagram illustrating an exemplary system configuration of a communication system 10 in a first embodiment of the present technology.

FIG. 1 is a diagram illustrating a system configuration example of a communication system 10 in the first embodiment of the present technology.

A communication system 10 includes a plurality of information processing devices (information processing devices 11 to 19, 100) and base stations 21 and 22. The information processing devices (devices) configuring the communication system 10 are, for example, a portable information processing device (for example, a smartphone, a cellular phone or a tablet terminal) having a wireless communication function and a fixed type information processing device (for example, a printer or a personal computer).

Also, the base station 21 is a base station (information processing device) capable of performing a cellular phone service of at least one of a 3rd generation (3G) system and a 4th generation (4G) system. Also, the base station 22 is a base station (information processing device) capable of performing communication utilizing a wireless local area network (LAN). As the wireless LAN, for example, wireless fidelity (Wi-Fi), Wi-Fi Direct, or Wi-Fi CERTIFIED Miracast specifications (technical specification name: Wi-Fi Display) can be used. In addition, base stations that perform wireless communication utilizing other communication systems may be used. Also, for example, base stations that perform wireless communication by millimeter wave communication (60 GHz or the like), a 5 GHz wireless LAN, ultra wide band (UWB), or visible light communication may be used. Also, for example, base stations that perform wireless communication by near field communication (NFC), Bluetooth (registered trademark), or infrared rays may be used.

In addition, it is assumed that at least one (for example, the information processing device 11) of the information processing devices 11 to 19 and 100 is capable of performing wireless communication with the base station 21. Also, it is assumed that at least one (for example, the information processing device 19) of the information processing devices 11 to 19 and 100 is capable of performing wireless communication with the base station 22.

Herein, ad hoc communication, ad hoc networks, and the like are known as communication methods in which nearby information processing devices autonomously interconnect. On such a network, each information processing device is able to communicate with nearby information processing devices without depending on a master station (for example, a control device). Accordingly, an embodiment of the present technology will be described by taking an ad hoc network as an example of a communication method in which nearby information processing devices autonomously interconnect.

On an ad hoc network, if a new information processing device is added nearby, the new information processing device is also able to freely join the network. For example, suppose a case in which, at first, only the information processing devices 11 to 14, and 100 have joined the ad hoc network from among the information processing devices 11 to 19, and 100 illustrated in FIG. 1. In this case, suppose that the information processing devices 15 to 19 are successively added. In this case, the network coverage may be increased as these information processing devices (nearby information processing devices) increase. In other words, the network coverage may be increased as the information processing devices 15 to 19 are successively added.

Herein, besides autonomously interconnecting with nearby information processing devices, each information processing device is also able to forward information to be exchanged with another information processing device in a bucket relay manner.

For example, it is assumed that the information processing device 100 can directly communicate with each of the information processing devices 12, 14, 18 and 19, but cannot directly communicate with the other information processing devices due to reasons such that radio waves do not reach. In FIG. 1, routes of wireless communication between the information processing devices that can directly communicate are schematically illustrated by dotted lines. For example, since the information processing device 100 can directly communicate with the information processing devices 12, 14, 18 and 19, the individual routes of the information processing device 100 and the information processing devices 12, 14, 18 and 19 are illustrated by dotted lines.

Also, even in the case that direct communication cannot be performed, the information processing devices 12, 14, 18 and 19 capable of directly communicating with the information processing device 100 can forward data of the information processing device 100 to the other information processing devices. Then, by forwarding data in this way, the information processing device 100 and the information processing devices that cannot directly communicate with the information processing device 100 can exchange information with each other. For example, the information processing device 100 and the information processing device 11 that cannot directly communicate with the information processing device 100 can exchange information with each other via the information processing device 12.

A method that conducts mutual data forwarding (also called a bucket relay) in this way and delivers information to distance information processing devices is designated a multi-hop relay. Also, a network that conducts multi-hop is typically known as a mesh network.

A configuration example of the information processing devices configuring such an ad hoc network or a mesh network will be described in detail with reference to FIG. 2.

Herein, a multi-hop relay that is generally conducted will be described.

As an example, a procedure will be described in which a mesh network is formed as illustrated in FIG. 1, and the information processing device 100 communicates with the information processing device 11.

The information processing device 100, before starting communication with the information processing device 11, specifies which communication route to use (which information processing device to traverse). For example, the information processing device 100 exchanges communication routing information with each neighboring information processing device, on the basis of a procedure conforming to an established communication routing protocol.

For example, a procedure determined by the standard of the Optimized Link State Routing Protocol (OLSR) of RFC 3626 published by the IETF may be used. As another example, a procedure determined by a standard such as the IEEE Standard for Information Technology-Telecommunications and information exchange between systems—Local and metropolitan area networks—Specific requirements, Part 11: Wireless LAN Medium Access Control (MAC) and Physical Layer (PHY) specifications, Amendment 10: Mesh Networking (commonly known as IEEE 802.11s) published by the IEEE may be used.

On the basis of these procedures, the information processing device 100 is able to detect that communication with the information processing device 11 is possible by traversing the information processing device 12, without needlessly wasting radio resources. For example, it is possible to detect that communication is possible without needless waste, on the basis of factors such as a small number of relay nodes, minimal transmission delay, and minimal time occupying a frequency channel for transmission. Here, in the case of exchanging information by wireless communication between two information processing devices, the information processing device that is present in a connection route between the two information processing devices, forwards the information and functions as a relay of the information is designated a relay node and described.

The information used for the detection is held internally in each information processing device as communication route information, and when a packet is actually transmitted or received, the information is referenced to search for which information processing device the packet should be transmitted to next in order to make the packet reach the final destination.

In the procedure discussed above, the information processing device 100 acquires communication route information that is valid up to the information processing device 11. Subsequently, on the basis of the acquired communication route information, the information processing device 100 transmits a packet addressed to the information processing device 11 to the information processing device 12. The information processing device 12 receives the packet, and on the basis of internally held communication route information, forwards the received packet addressed to the information processing device 11 to the information processing device 11.

Note that the creation of the above communication route information is also conducted with respect to all information processing devices connected to the mesh network in some cases. However, in some cases, such as when there is an extremely large number of information processing devices present on the network, the overhead related to the creation of communication route information increases due to factors such as control packets. Accordingly, to reduce the overhead related to the creation of communication route information due to factors such as control packets, a limit on the number of times that each packet is forwarded may be imposed as discussed earlier, for example. For example, the number of times of forwarding (hop) of each packet may be limited to a predetermined number of times (for example, two to four times).

Also, a mechanism of distributing contents while freely communicating with peripheral equipment using an ad hoc network or a mesh network is conceivable. In order to implement such a mechanism, it is needed to inform the peripheral equipment of which information processing device holds what kind of contents and is capable of supplying the contents.

For example, as illustrated in FIG. 8, by including subject device information and other device information (subject device information 730 and other device information 750) in beacons periodically transmitted by information processing devices, it is possible to inform nearby devices of services that information processing devices can provide. Also, information processing devices can find the information processing device that is present around by searching for the beacon. In this case, it is also possible to detect what kind of service the found information processing device provides.

In this way, a network in an embodiment of the present technology can be recognized as, for example, an autonomous distributed network (for example, an ad hoc network). That is, the network in an embodiment of the present technology can be recognized as a network in which a plurality of information processing devices perform wireless communication in a one-to-one manner, such as peer-to-peer (P2P), so that the information processing devices are interconnected. In other words, the network in an embodiment of the present technology can be recognized as a network in which wireless communication is performed between two information processing devices among the plurality of information processing devices so that the plurality of information processing devices are interconnected.

Herein, as described above, in the case that an ad hoc network or a mesh network is extended, information processing devices that can be connected increase. Therefore, in order to easily perform connection to an information processing device desired by a user (for example, connection for contents transmission), it is important to easily recognize relations with information processing devices. Accordingly, in an embodiment of the present technology, an example of easily recognizing the relations with information processing devices is shown.

[Configuration Example of Information Processing Device]

Figure 2:
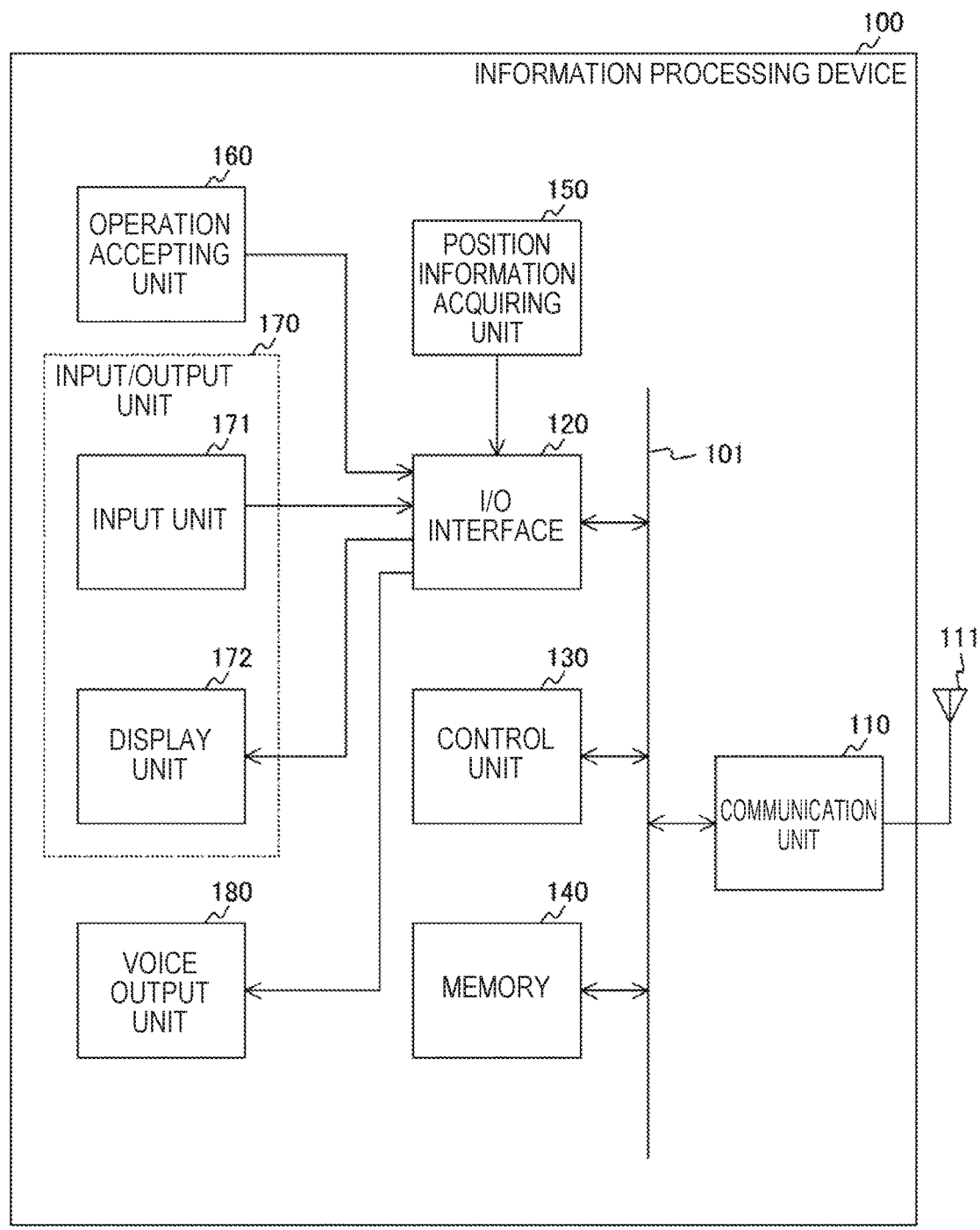
FIG. 2 is a block diagram illustrating an exemplary internal configuration of an information processing device 100 according to a first embodiment of the present technology.

FIG. 2 is a block diagram illustrating an internal configuration example of the information processing device 100 in the first embodiment of the present technology. Note that, since internal configurations of the other information processing devices are almost the same as the information processing device 100, only the information processing device 100 will be described here and the description of the other information processing devices will be omitted.

The information processing device 100 includes a communication unit 110, an antenna 111, an input/output (I/O) interface 120, a control unit 130, a memory 140, a position information acquiring unit 150, an operation accepting unit 160, an input/output unit 170, and a voice output unit 180. Also, these units are connected via a bus 101. Also, the input/output unit 170 is provided with an input unit 171 and a display unit 172.

The communication unit 110 is a module (for example, a modem) for transmitting and receiving radio waves via the antenna 111. For example, the communication unit 110 can perform wireless communication by a wireless LAN (for example, Wi-Fi, Wi-Fi Direct, or Wi-Fi CERTIFIED Miracast), millimeter wave communication (60 GHz or the like), a 5 GHz wireless LAN, or UWB. In addition, for example, the communication unit 110 can perform wireless communication by visible light communication, NFC, Bluetooth, infrared rays, portable radio waves or the like.

For example, the communication unit 110 transmits and receives a beacon (for example, a beacon 710 illustrated in FIG. 8) to/from the other information processing devices present within a predetermined range by utilizing wireless communication on the basis of control of the control unit 130. Also, the communication unit 110 transmits and receives data related to services provided by the information processing devices to/from the other information processing devices present within the predetermined range by utilizing wireless communication on the basis of the control of the control unit 130. In this case, the communication unit 110 is also capable of forwarding the data related to the services to be provided from one information processing device to the other information processing devices. That is, the communication unit 110 can transmit and receive the data related to the services provided by the information processing device 100 and at least one of the other information processing devices to/from the other information processing devices present within the predetermined range by utilizing wireless communication. Here, the predetermined range is, for example, a range based on a position of the information processing device 100, and means a range in which the communication unit 110 can transmit and receive the data by utilizing wireless communication. Also, the information processing devices present within the predetermined range are, for example, the information processing devices present in the vicinity of the information processing device 100, and the information processing devices capable of transmitting and receiving the data to/from the information processing device 100 by utilizing wireless communication.

Note that, the communication unit 110 may perform wireless communication using radio waves (electromagnetic waves), or perform wireless communication (for example, wireless communication that is performed using a magnetic field) using a medium other than radio waves.

Also, the communication unit 110 intercommunicates with the nearby information processing devices by opening a communication link, manages the number of the nearby information processing devices with which the information processing device 100 can communicate, and holds information (communicable number information) indicating the number of the nearby information processing devices that are communicable. In addition, the communication unit 110 periodically or non-periodically observes a utilization degree of a channel used in wireless communication, and holds information (congestion degree information) indicating how much a communication line around the information processing device 100 is congested or not. Also, the communication unit 110 observes link quality (reception power or transmittable data rate or the like) with the neighboring information processing devices that perform wireless communication, and holds information (communication state information) indicating in what bandwidth wireless communication can be performed with the neighboring information processing devices. Then, the communication unit 110 supplies these information items to the control unit 130.

The I/O interface 120 is an interface with individual units (including an external device) of a sensor/actuator or the like operated in linkage with the information processing device 100. In FIG. 2, an example that the position information acquiring unit 150, the operation accepting unit 160, the input/output unit 170, and the voice output unit 180 are connected to the I/O interface 120 is illustrated. Also, in FIG. 2, an example of incorporating the position information acquiring unit 150, the operation accepting unit 160, the input/output unit 170 and the voice output unit 180 inside the information processing device 100 is illustrated, however, all or part of these may be provided outside the information processing device 100.

The position information acquiring unit 150 acquires information (position information) for specifying a position at which the information processing device 100 is present, and outputs the acquired position information to the control unit 130 via the I/O interface 120. The position information is absolute position information, and is, for example, latitude, a route and an altitude. The position information acquiring unit 150 is implemented, for example, by a global positioning system (GPS) receiver that receives GPS signals and calculates the latitude, longitude and altitude. Also, the position information acquiring unit 150 can acquire the position information from the other information processing device (for example, a communication control device operated by a common carrier) via a network. Also, for example, the position information acquiring unit 150 can acquire information (position information) related to a position corresponding to identification information of a base station (or an access point of a wireless LAN) operated by a common carrier. Note that the identification information of a base station of the information processing device is a cell ID for example, and the identification information of an access point of a wireless LAN is a service set identifier (SSID) for example. Note that the position information may be acquired by acquiring methods other than these acquiring methods.

The operation accepting unit 160 is an operation accepting unit configured to accept an operation input performed by a user, and outputs operation information corresponding to the accepted operation input to the control unit 130 via the I/O interface 120. The operation accepting unit 160 is implemented by, for example, a touch panel, a keyboard, and a mouse.

For the input/output unit 170, the input unit 171 and the display unit 172 are configured as one body. The input/output unit 170 can be configured as one body using a touch panel with which a user can input operations by bringing his/her finger into contact with or close to a display surface, for example. For example, in the case that the information processing device 100 is a smartphone, the input/output unit 170 corresponds to a display screen (operation screen) of the smartphone. Then, for example, a user can operate the information processing device 100 by performing a contacting operation (or an approaching operation) to an image or the like displayed at the display unit 172.

Also, the input/output unit 170 displays various kinds of images at the display unit 172 on the basis of the control of the control unit 130, and accepts operation input from a user by the input unit 171 on the basis of a detection state of an object close to or in contact with the display surface of the display unit 172. Also, the input unit 171 outputs control information according to the accepted operation input to the control unit 130.

For example, as the input unit 171, an electrostatic type (electrostatic capacity type) touch panel that detects contact or approach of a conductive object (for example, a finger of a person) on the basis of a change of electrostatic capacity can be used. Note that, touch panels other than the electrostatic type (electrostatic capacity type) may be used. For example, a touch panel of a pressure sensitive type (resistance film pressure type) or an optical type or the like can be used. Also, for example, as the display unit 172, a display panel such as a liquid crystal display (LCD) or an organic electro luminescence (EL) panel can be used. Then, the input/output unit 170 is configured by superimposing a transparent touch panel on a display surface of a display panel, for example.

The voice output unit 180 is a voice output unit (for example, a speaker) configured to output various voices based on control of the control unit 130.

The control unit 130 controls units of the information processing device 100 based on a control program stored in the memory 140. For example, the control unit 130 performs signal processing on transmitted and received information. In addition, the control unit 130 is implemented by, for example, a central processing unit (CPU).

The memory 140 is a memory that stores various kinds of information. For example, in the memory 140, various kinds of information (for example, a control program) to be needed in order for the information processing device 100 to perform a desired operation are stored. Also, in a contents storage area of the memory 140, various kinds of contents such as music contents and image contents (for example, moving image contents and still image contents) are stored.

Also, in the memory 140, another device information management table 200 (illustrated in FIG. 4), a subject device information management table 220 (illustrated in FIG. 5) and a setting information management table 230 (illustrated in FIG. 6) are stored. Note that the other device information management table 200 is a table for managing information (other device information) related to the other information processing devices other than the information processing device 100. Also, the subject device information management table 220 is a table for managing information (subject device information) related to the information processing device 100. Also, the setting information management table 230 is a table for managing information (setting information) set by a user who possesses the information processing device 100.

For example, when data is transmitted using wireless communication, the control unit 130 processes information read from the memory 140 and signals input from the I/O interface 120, and generates a data block (a transmission packet) to be actually transmitted. Next, the control unit 130 outputs the generated transmission packet to the communication unit 110. In addition, the communication unit 110 converts the transmission packet into a format of a communication scheme for actual transmission, and then transmits the converted transmission packet from an antenna 11 to the outside.

In addition, for example, when wireless communication is used to receive data, the communication unit 110 extracts a reception packet through signal processing performed on a radio wave signal received through the antenna 111 by a receiver in the communication unit 110. Therefore, the control unit 130 interprets the extracted reception packet. When it is determined that data should be retained based on the interpretation result, the control unit 130 writes the data in the memory 140. In addition, when it is determined that data should be transferred to other information processing devices, the control unit 130 outputs the data to the communication unit 110 as a transmission packet to be transferred to the other information processing devices. In addition, when it is determined that data should be forwarded to an internal or an external actuator, the control unit 130 outputs the data from the I/O interface 120 to the inside or the outside (for example, the display unit 172).

In addition, for example, the control unit 130 generates the subject device information (the subject device information 730 illustrated in FIG. 8) on the basis of the subject device information management table 220 in the memory 140. Also, for example, the control unit 130 generates the other device information (the other device information 750 illustrated in FIG. 8) on the basis of the other device information management table 200 in the memory 140. Then, the control unit 130 can transmit a beacon (the beacon 710 illustrated in FIG. 8) including the subject device information and the other device information that are generated to the other information processing devices. In addition, for example, the control unit 130 can provide the other information processing devices with the various kinds of contents stored in the memory 140 by utilizing wireless communication.

Figure 9:
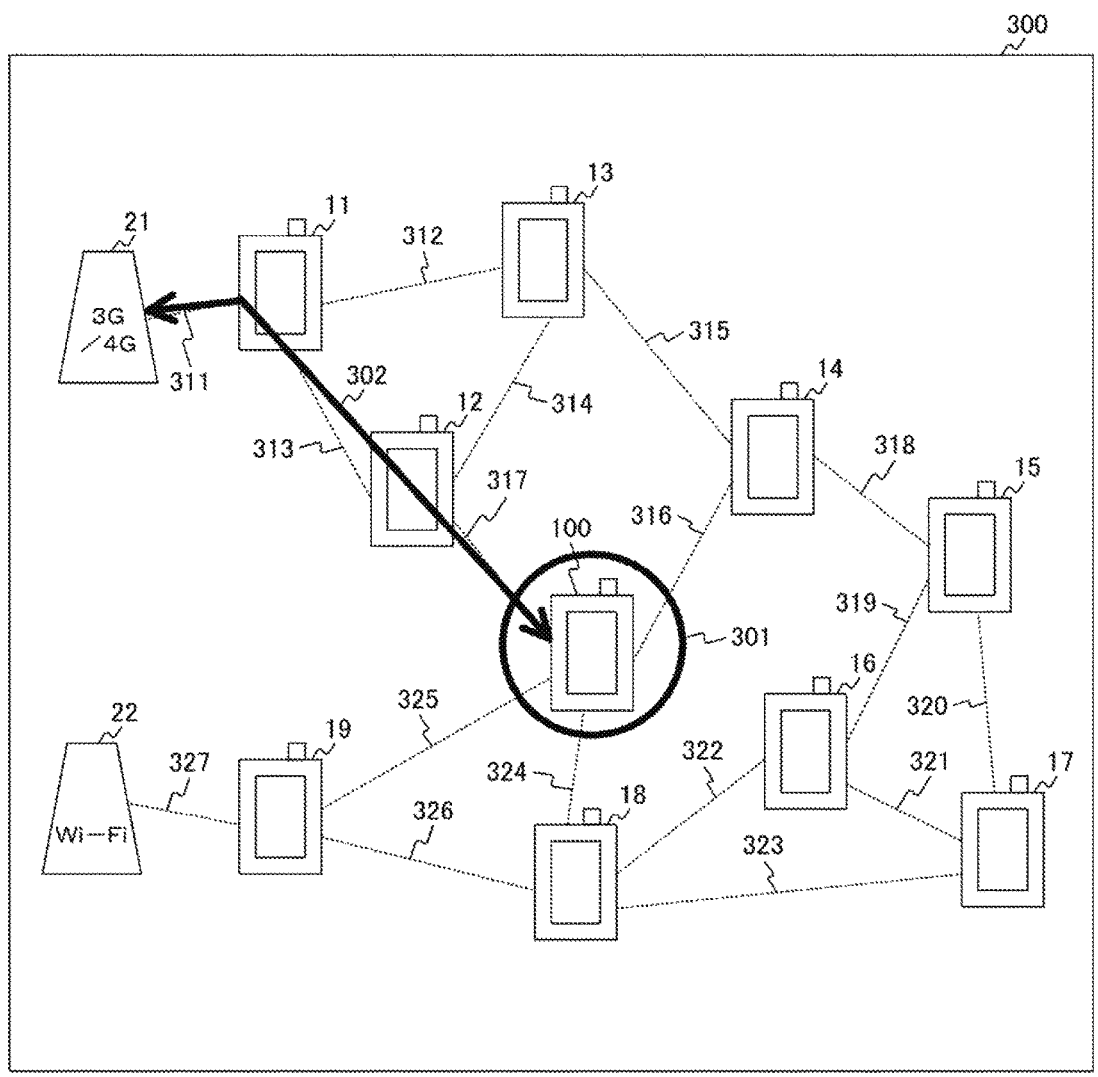
FIG. 9 is a diagram illustrating an example (display screen 300) of a display screen displayed at an input/output unit 170 in a first embodiment of the present technology.

In addition, for example, the control unit 130 performs control of making the input/output unit 170 display relations of the plurality of information processing devices and routes related to wireless communication in a network as route information (for example, the information processing devices, connection routes and connection candidate routes illustrated in FIG. 9). Also, for example, the control unit 130 performs control of wireless communication in a network on the basis of operation input related to the route information. Here, the operation input related to the route information is operation input using an operation member such as a touch panel or a pointing device (for example, a mouse, a track pad, or a track ball), for example. For example, the operation input using a touch panel is a touch operation (for example, a contacting operation or an approaching operation) or a tracing operation or the like. In addition, for example, the operation input using a pointing device is an operation (for example, a moving operation or an enclosing operation) by a pointer on a display screen. That is, at least one of the touch operation and the operation by a pointer using a pointing device can be used as the operation input. Note that, an example of the operation input using the touch panel is mainly illustrated below, however, the other operation input (for example, the operation input using a pointing device) can be similarly applied.

Note that, when the information processing device 100 is driven by a battery, a battery is loaded (incorporated or mounted) on the information processing device 100. In this case, the control unit 130 has a function of estimating a battery residual amount, and is capable of acquiring the estimated battery residual amount at any time.

[Functional Layer Example]

Figure 3:
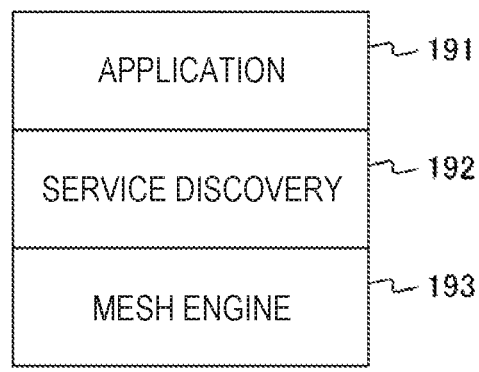
FIG. 3 is a diagram illustrating an example of a functional layer of each information processing device in a first embodiment of the present technology.

FIG. 3 is a diagram illustrating one example of a functional layer of each information processing device in the first embodiment of the present technology. In FIG. 3, one example of a functional layer for each information processing device to recognize states of the other information processing devices present around the subject device is illustrated.

An application 191 is a layer indicating an application for a mesh network.

A service discovery 192 is, similarly to the application, a layer indicating information (information (service information) related to services provided by each information processing device) that can be downloaded by each information processing device. In addition, by the service discovery 192, service information related to the information processing devices which are 2 hops or more ahead and are not participating in a mesh network can be recognized. Here, an information processing device which is 1 hop ahead means an information processing device to which data can be transmitted by one time of forwarding (hop). Also, an information processing device which is 2 hops ahead means an information processing device to which data can be transmitted by two times of forwarding.

A mesh engine 193 is a layer indicating IDs (including IDs of information processing devices not participating in a mesh network) of all the information processing devices within 1 hop. By the mesh engine 193, routes related to the information processing devices which are 2 hops or more ahead and are participating in a mesh network can be recognized.

[State Example of Link]

Herein, a link between information processing devices configuring a mesh network will be described. In an embodiment of the present technology, as a state of the link between the information processing devices, the following three states (1) to (3) are assumed.

(1) The state of being recognized as a neighboring information processing device (neighbor terminal) and participating in the same mesh network. In this state, a beacon is exchanged (transmitted and received) between the information processing devices.

(2) The state of being recognized as a neighboring information processing device (neighbor terminal) and being communicable as a peer station (STA). That is, it is the state after association (being approved as a connectable and reliable information processing device). In this state, various kinds of information (for example, contents) can be exchanged.

(3) The state that a route of a mesh network is set and turned to an active link. That is, it is the state after a path discovery procedure.

In this way, the above-described three states (1) to (3) are assumed as the state of the link between the information processing devices. In this case, it is possible to display the above-described link states (1) to (3). Then, in an embodiment of the present technology, an example of displaying the above-described link states (1) to (3) is illustrated.

[Contents Example of Other Device Information Management Table]

FIG. 4 is a diagram schematically illustrating one example of management contents of the other device information management table 200 stored in the memory 140 in the first embodiment of the present technology.

The other device information management table 200 is a table for managing information (other device information) related to the other information processing devices other than the information processing device 100. Here, the other information processing devices include, for example, information processing devices capable of directly communicating with the information processing device 100 and information processing devices capable of indirectly communicating with the information processing device 100 via the other information processing devices (relay nodes).

In the other device information management table 200, terminal identification information 201, position information 202, relay node information 203, connection information 204, a predicted communication speed 205, charging information 206, point information 207, connection permitted time information 208, service information 209, and group information 210 are stored in association. In addition, the information in the other device information management table 200 is updated (or added) on the basis of the subject device information and the other device information (the subject device information 730 and the other device information 750 illustrated in FIG. 8) transmitted from the other information processing devices.

The terminal identification information 201 is identification information for identifying other information processing devices. As the terminal identification information, for example, a media access control (MAC) address can be used. In addition, for example, application-specific identification information may be used.

Note that, in FIG. 4, for facilitation of description, as the terminal identification information, only simple numerals (0011, 0012, 0013, 0014, . . . ) are indicated. For example, it is assumed that the terminal identification information 201 "0011" is the terminal identification information of the information processing device 11, and the terminal identification information 201 "0012" is the terminal identification information of the information processing device 12. It is assumed that the other terminal identification information is similar.

The position information 202 is information for specifying positions where the information processing devices are present. As the position information, for example, latitude and longitude can be used. These latitude and longitude are acquired by a position information acquiring unit (for example, a GPS receiver) provided in each information processing device. Then, they are stored in position information 741 illustrated in FIG. 8a and transmitted to the information processing device 100.

The relay node information 203 is information (relay node information) about an information processing device that can be a relay node when the information processing device 100 is connected to the information processing devices. For example, in the state illustrated in FIG. 1, when the information processing device 100 is connected to the information processing device 11, the information processing device 12 can be a relay node. Therefore, in the relay node information 203 of the terminal identification information 201 "0011", the terminal identification information "0012" of the information processing device 12 that can be a relay node is stored. Note that, in the state illustrated in FIG. 1, when the information processing device 100 is connected to the information processing device 11, the information processing devices 13 and 14 can be a relay node other than the information processing device 12. When there are a plurality of routes in this way, the other device information for each route is managed for one information processing device.

The connection information 204 is information about presence/absence of connection of the information processing device 100 and the other information processing devices. For example, for an information processing device connected to the information processing device 100 by utilizing wireless communication (for example, the state indicated in (2) described above), the fact that it is connected ("connected" in FIG. 4) is stored. On the other hand, for an information processing device not connected to the information processing device 100 (for example, the state indicated in (1) or (3) described above), the fact that it is a connection candidate ("connection candidate" in FIG. 4) is stored.

The predicted communication speed 205 is predicted information of a communication speed between the information processing device 100 and the other information processing device when the information processing device 100 and the other information processing device are connected. That is, the predicted communication speed 205 is a value indicating a communication speed predicted in the case that the information processing device 100 is connected to the other information processing device and performs wireless communication. For example, the predicted communication speed can be calculated on the basis of a value indicating what metric value is needed to reach from a data transmission source node (for example, an information processing device which first transmits data).

Here, a metric value of a link between information processing devices is, for example, a value indicating at what Mbps transmission is possible in the link. For example, in an IEEE802.11-2012 standard, a metric value ca can be obtained by the following expression 1.

$$ca=[O+(Bt/r)]/[1/(1-ef)]$$  Expression 1

Here, r is a value indicating a data rate (Mb/s). Also, of is a value indicating a frame error rate. In addition, Bt is a value indicating a frame size. In addition, O is a value intrinsic to a physical layer (PHY).

For example, an information processing device which receives data from the other information processing device conducts multi-hop forwarding of the received data, and for each of this forwarding processing, acquires a metric value of a link between the information processing devices. Then, by adding the newly acquired metric value (the metric value of the link between the information processing devices) to the metric value included in the data to be a forwarding object, the metric value from a data transmission source node can be calculated. That is, every time data is forwarded, the metric value of the link between the information processing devices is cumulatively added. Then, on the basis of the cumulatively added value, the predicted communication speed can be calculated.

Also, for example, usable modulation (modulation of up to what value is usable) may be recognized from received field strength to determine the predicted communication speed based on a frequency and an error rate.

The charging information 206 is information about charging when the information processing device 100 and the other information processing device are connected. For example, to users of the other information processing devices to which the information processing device 100 is connected by transmitting a connection request, the information processing device 100 needs to pay a charge corresponding to a value of the charging information 206. In this case, the charge corresponding to the value of the charging information 206 may be paid to all the users of the other information processing devices connected by transmitting the connection request, or the charge may be paid to some of the users (users of relay nodes). Also, when there are a plurality of payment objects, the charge corresponding to the value of the charging information 206 may be converted according to a position (the number of hops from the information processing device 100) in the connection route. Note that, for a method of paying the charge, the user may manually make a payment or the information processing device 100 may automatically perform payment processing.

The point information 207 is information about points when the information processing device 100 and the other information processing devices are connected. For example, to users of the other information processing devices to which the information processing device 100 is connected by transmitting a connection request, the information processing device 100 needs to transfer points corresponding to a value of the point information 207. In this case, the points corresponding to the value of the point information 207 may be transferred to all the users of the other information processing devices connected by transmitting the connection request, or the points may be transferred to some of the users (users of relay nodes). Also, when there are a plurality of transfer objects, the points corresponding to the value of the point information 207 may be converted according to a position (the number of hops from the information processing device 100) in the connection route. Note that, for a method of transferring the points, the user may manually make a transfer or the information processing device 100 may automatically perform transfer processing.

Here, the points refer to information (for example, a score or a numerical value) used to assign something to a user who possesses the information processing device (for example, tangible or intangible benefits such as services or incentives). In addition, "points" are used to refer to a point service. Note that "point service" is used to refer to a loyalty program.

Note that, in an embodiment of the present technology, both of the charging information 206 and the point information 207 are managed for each information processing device, and at least one of the charging information 206 and the point information 207 is used. For example, to the other information processing devices to which the information processing device 100 is connected by transmitting a connection request, the information processing device 100 may pay the charge corresponding to the value of the charging information 206 and transfer the points corresponding to the value of the point information 207. Note that, only one of the payment of the charge corresponding to the value of the charging information 206 and the transfer of the points corresponding to the value of the point information 207 may be made. These may be set in the information processing device of a connection destination. Note that the other information items used to assign something to a user (for example, tangible or intangible benefits such as discount tickets, coupon tickets, service tickets, or exchange tickets) are managed instead of the charging information and the point information and these are used.

In addition, only to relay nodes among the other information processing devices to which the information processing device 100 is connected by transmitting a connection request, the payment of the charge corresponding to the value of the charging information 206 and the transfer of the points corresponding to the value of the point information 207 may be made.

The connection permitted time information 208 is information indicating the connectable time when the information processing device 100 performs connection processing (the time connectable by the connection processing of one time). For example, in the connection permitted time information 208 of the information processing device 11, "10 minutes" is stored. Therefore, when the information processing device 100 is connected to the information processing device 11 by transmitting a connection request, the information processing device 100 and the information processing device 11 can be connected only for 10 minutes, and the connection is cut off after 10 minutes elapse.

The service information 209 is information (service information) about services that the other information processing devices can provide. The services that the other information processing devices can provide are, for example, provision of contents (for example, moving image contents, still image contents, or music contents) and advertisements. In addition, in the service information 209, service identification information (for example, contents identification information or advertisement identification information) for specifying the services is stored.

The group information 210 is information (group identifier) for identifying a group to which the information processing devices belong. For example, for the information processing devices belonging to the same group, the same identification information is stored. As the group information 210, for example, an SSID or an originally set identifier can be used.

[Contents Example of Subject Device Information Management Table]

FIG. 5 is a diagram schematically illustrating one example of management contents of the subject device information management table 220 stored in the memory 140 in the first embodiment of the present technology.

The subject device information management table 220 is a table for managing information (subject device information) related to the information processing device 100.

In the subject device information management table 220, relay node setting information 221, charging information 222, request point information 223, possessed point information 224, connection permitted time information 225, service information 226, and group information 227 are stored. In addition, the information in the subject device information management table 220 is updated on the basis of user operations and exchange with the other information processing devices.

The relay node setting information 221 is information about setting of whether or not to turn the information processing device 100 to a relay node. That is, the information processing device 100 can set whether or not to turn the information processing device 100 to a relay node, on the basis of a user operation. Then, the information (relay node possible, or relay node impossible) related to the setting is stored in the relay node setting information 221.

The charging information 222 is information about charging to the other information processing devices connected to the information processing device 100. That is, when the other information processing devices are connected to the information processing device 100 by transmitting a connection request, users of the other information processing devices need to pay a charge corresponding to a value of the charging information 222 to a user of the information processing device 100. Note that, as described above, payment of the charge corresponding to the value of the charging information 222 may be requested only when the information processing device 100 becomes a relay node among the other information processing devices connected to the information processing device 100 by transmitting a connection request. Note that the charging information 222 corresponds to the charging information 206 illustrated in FIG. 4.

The request point information 223 is information about points to the other information processing devices connected to the information processing device 100. That is, when the other information processing devices are connected to the information processing device 100 by transmitting a connection request, the users of the other information processing devices need to transfer points corresponding to a value of the request point information 223 to the user of the information processing device 100. Note that, as described above, transfer of the points corresponding to the value of the request point information 223 may be requested only when the information processing device 100 becomes a relay node among the other information processing devices connected to the information processing device 100 by transmitting a connection request. Also, in FIG. 5, an example that the value of the request point information 223 is a fixed value (a fixed value per connection) is illustrated, however, the value may be a variable value that varies based on connection time with the other information processing devices. For example, as the variable value, it can be a value for which a predetermined value (for example, 5 points) is added every time predetermined time (for example, 5 minutes) elapses. Note that the request point information 223 corresponds to the point information 207 illustrated in FIG. 4.

The possessed point information 224 is information about points possessed by the user of the information processing device 100. Using the points corresponding to a value of the possessed point information 224, the information processing device 100 can be connected to the other information processing devices and perform communication. Also, when the other information processing devices are connected to the information processing device 100 by transmitting a connection request, points from the other information processing devices are added to the value of the possessed point information 224.

Note that, in an embodiment of the present technology, an example of managing the points possessed by the user of the subject device inside the subject device is illustrated, however, an external device may manage the points of the information processing devices altogether. For example, a server connectable through the base stations 21 and 22 can be made to manage the points of the information processing devices. In this case, every time the connection processing is performed between the information processing devices, information related to the exchange is transmitted to the server.

The connection permitted time information 225 is information indicating the connectable time after the other information processing devices are connected to the information processing device 100. Note that the connection permitted time information 225 corresponds to the connection permitted time information 208 illustrated in FIG. 4.

The service information 226 is information (service information) related to services that the information processing device 100 can provide the other information processing devices. The services are, for example, provision of contents (for example, moving image contents, still image contents, or music contents) and advertisements. Note that, as the service information 226, contents information or advertisement information may be stored, and the other information (for example, service identification information) for specifying contents and advertisements may be stored. Note that the service information 226 corresponds to the service information 209 illustrated in FIG. 4. In addition, there may be a user who does not want to extend transmission destinations of contents so much. Therefore, a transfer possible number (the number of hops) may be stored in association with the service information 226 to limit the transfer possible number (the number of hops). In this case, the transfer possible number (the number of hops) is stored in association also in the other device information management table 200 illustrated in FIG. 4. Then, the information processing devices do not transfer the service information 209 related to the contents for which the transfer possible number (the number of hops) is reached.

The group information 227 is information (group information) for identifying a group to which the information processing device 100 belongs. Note that the group information 227 corresponds to the group information 210 illustrated in FIG. 4.

[Contents Example of Setting Information Management Table]

Figure 6:
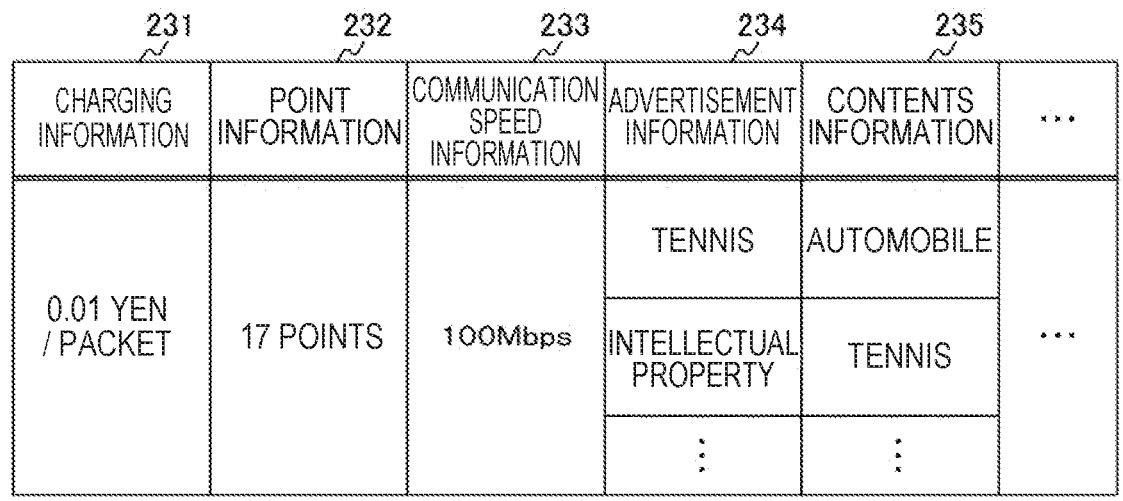
FIG. 6 is a diagram schematically illustrating an example of management contents of a setting information management table 230 stored in the memory 140 in a first embodiment of the present technology.

FIG. 6 is a diagram schematically illustrating one example of management contents of the setting information management table 230 stored in the memory 140 in the first embodiment of the present technology.

The setting information management table 230 is a table for managing information (setting information) set by a user who possesses the information processing device 100.

In the setting information management table 230, charging information 231, point information 232, communication speed information 233, advertisement information 234, and contents information 235 are stored.

In the charging information 231, an upper limit value (an upper limit value desired by the user) of a cost to be needed for the connection in the case of connecting the information processing device 100 to the other information processing devices is stored.

In the point information 232, an upper limit value (an upper limit value desired by the user) of points to be needed for the connection in the case of connecting the information processing device 100 to the other information processing devices is stored.

In the communication speed information 233, a lower limit value (a lower limit value desired by the user) of a communication speed of wireless communication to be performed after the connection in the case of connecting the information processing device 100 to the other information processing devices is stored.

In the advertisement information 234, information related to advertisements (for example, an advertisement of moving images, an advertisement of still images, or an advertisement by sound) that the user of the information processing device 100 is highly interested in is stored. For example, a user who likes intellectual properties and desires to browse advertisements related to intellectual properties can browse the advertisements related to intellectual properties by storing information related to intellectual properties in the advertisement information 234.

In the contents information 235, information related to contents (for example, moving image contents, still image contents, or music contents) that the user of the information processing device 100 is highly interested in is stored. For example, a user who likes automobiles and desires to view contents related to automobiles can view advertisements related to automobiles by storing information related to automobiles in the contents information 235.

In this way, in each of the point information 232, the charging information 231 and the communication speed information 233, values desired by the user in the case of connecting the information processing device 100 to the other information processing devices are stored. Then, on the basis of these values, the control unit 130 generates recommendation information (for example, recommendation information 362 illustrated in FIG. 15).

In addition, in the advertisement information 234 and the contents information 235, the information related to advertisements and the information related to contents that the user of the information processing device 100 is highly interested in are stored, respectively. Then, on the basis of these information items, the control unit 130 generates recommendation information (for example, recommendation information 361 illustrated in FIG. 15). Note that recommendation information will be described in detail in a second embodiment of the present technology.

[Transmission Example of Subject Device Information and Other Device Information]

Figure 7:
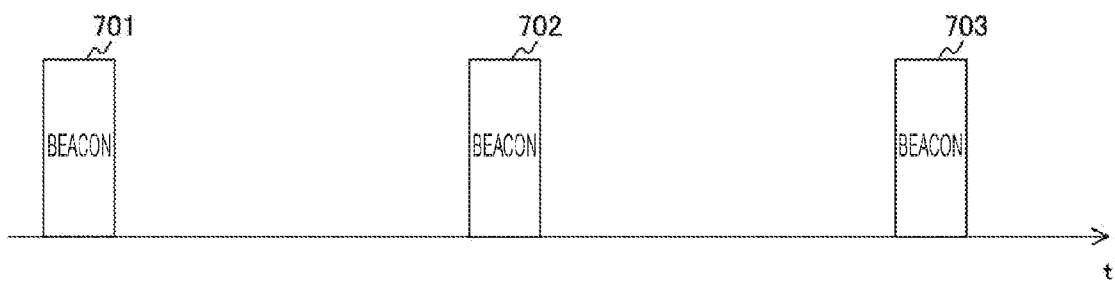
FIG. 7 is a diagram illustrating a transmission example in the case that information processing devices of the communication system 10 transmit subject device information and other device information in a first embodiment of the present technology.

FIG. 7 is a diagram illustrating a transmission example when information processing devices of the communication system 10 in the first embodiment of the present technology transmit subject device information and other device information.

In FIG. 7, an example of periodically (or non-periodically) transmitting beacons (beacon signals) including subject device information and other device information is illustrated. In addition, in FIG. 7, a transmission example of beacons when a horizontal axis is a time base is illustrated. That is, in FIG. 7, beacons 701 to 703 that are successively transmitted in a time sequential manner are schematically illustrated.

In this way, information processing devices of the communication system 10 periodically (or non-periodically) inform the nearby information processing devices of beacons (including subject device information and other device information). Note that a configuration example of a beacon will be described in detail with reference to FIG. 8.

[Format Example of Subject Device Information and Other Device Information]

FIG. 8 is a diagram illustrating a format example of a beacon transmitted by information processing devices of the communication system 10 in the first embodiment of the present technology. Note that a format example of the subject device information 730 included in beacon information 720 is illustrated in FIG. 8a, and a format example of the other device information 750 included in the beacon information 720 is illustrated in FIG. 8b.

A beacon 710 includes a preamble 711, a header 712, and the beacon information 720.

The preamble 711 is information indicating the presence of a packet (a beacon). That is, information processing devices of the communication system 10 can detect the presence of the beacon by receiving the preamble 711.

The header 712 stores information about the packet (beacon) itself arranged in a predetermined position of the packet. For example, information items (information about the packet (beacon) itself) such as a transmission source, a transmission destination, and a size of a packet are stored in the header 712. That is, information processing devices of the communication system 10 decode and analyze the header. According to the analysis, information processing devices of the communication system 10 can detect which information processing devices transmit and receive a signal and a type of the signal (for example, whether it is a beacon).

The beacon information 720 is information that information processing devices of the communication system 10 are informed of. That is, information processing devices of the communication system 10 include information of which other information processing devices are to be informed in a beacon and transmit the beacon.

Next, the beacon information 720 will be described in detail.

The beacon information 720 includes time information 721, a network ID 722, a network attribute 723, the subject device information 730, the other device information 750, and the other information 724.

The time information 721 is time information indicating the time at which a beacon including this information is transmitted from an information processing device of a transmission source.

The network ID 722 is information indicating an ID of a network configured by the information processing device of the transmission source.

The network attribute 723 is information indicating an attribute of the network configured by the information processing device of the transmission source.

The subject device information 730 is information (subject device information) about the information processing device of the transmission source.

The other device information 750 is information (other device information) about information processing devices present around the information processing device of the transmission source.

The other information 724 is information other than the information described above.

Next, the subject device information 730 and the other device information 750 will be described.

As illustrated in FIG. 8a, the subject device information 730 is formed of information fields of an element ID 731, a length 732, and subject device information fields [0]-[N] 733.

The element ID 731 is an element ID indicating that subject device information is stored.

The length 732 is a length indicating a length of an element of subject device information.

The subject device information fields [0]-[N] 733 are formed of one or a plurality of subject device information fields (for example, N fields). One subject device information field is arranged for each service provided by the subject device. For example, for an information processing device that provides three services, three fields are arranged.

For example, the subject device information fields [0]-[N] 733 are arranged for the number of services (for example, contents or advertisements) stored in the service information 226 (illustrated in FIG. 5) in the subject device information management table 220.

In the subject device information fields [0]-[N] 733, the position information 741, relay node setting information 742, charging information 743, point information 744, connection permitted time information 745, service information 746, and group information 747 are stored in association.

Here, in the position information 741, position information (latest position information) acquired by the position information acquiring unit 150 is stored.

In the relay node setting information 742, relay node setting information (relay node possible, or relay node impossible) stored in the relay node setting information 221 (illustrated in FIG. 5) in the subject device information management table 220 is stored.

In the charging information 743, charging information stored in the charging information 222 (illustrated in FIG. 5) in the subject device information management table 220 is stored.

In the point information 744, point information stored in the request point information 223 (illustrated in FIG. 5) in the subject device information management table 220 is stored.

In the connection permitted time information 745, connection permitted time information stored in the connection permitted time information 225 (illustrated in FIG. 5) in the subject device information management table 220 is stored.

In the service information 746, service information stored in the service information 226 (illustrated in FIG. 5) in the subject device information management table 220 is stored. As described above, the subject device information fields are arranged for the number of pieces of the service information stored in the service information 226 in the subject device information management table 220.

In the group information 747, group information stored in the group information 227 (illustrated in FIG. 5) in the subject device information management table 220 is stored.

As illustrated in FIG. 8b, the other device information 750 is formed of information fields of an element ID 751, a length 752, information processing device IDs [0]-[M] 753, and other device information fields [0]-[M] 754.

Note that, in the other device information 750, information roughly similar to that in the subject device information 730 is stored, however, it is different at a point that the information processing device IDs [0]-[M] 753 are added and stored. That is, the element ID 751 and the length 752 correspond to the element ID 731 and the length 732 illustrated in FIG. 8a. In addition, the information processing device IDs [0]-[M] 753 and the other device information fields [0]-[M] 754 are arranged in a pair for each service provided by the information processing device.

The information processing device IDs [0]-[M] 753 are IDs for identifying corresponding information processing devices (for example, neighboring information processing devices). That is, the information processing device IDs [0]-[M] 753 are information indicating which information processing device provides the service of the other device information field to be a pair. For example, in the information processing device IDs [0]-[M] 753, terminal identification information stored in the terminal identification information 201 (illustrated in FIG. 4) in the other device information management table 200 is stored.

The other device information fields [0]-[M] 754 are formed of one or a plurality of other device information fields (for example, M fields). In addition, in the other device information fields [0]-[M] 754, position information 761, relay node information 762, predicted communication speed information 763, charging information 764, point information 765, connection permitted time information 766, service information 767, and group information 768 are stored in association.

Note that, in the other device information fields [0]-[M] 754, information related to other information processing devices (that is, the information processing devices other than the information processing device which transmits the beacon) is stored. Except for this point and a point that the relay node information 762 and the predicted communication speed information 763 are stored instead of the relay node setting information 742, they are similar to the subject device information fields [0]-[N] 733 illustrated in FIG. 8a.

In addition, in each of the position information 761, the charging information 764, the point information 765, the connection permitted time information 766, the service information 767 and the group information 768, the information (the information of the same name) stored in the other device information management table 200 (illustrated in FIG. 4) is stored.

In addition, in the relay node information 762, information for which information related to the subject device (that is, the information processing device which transmits the beacon) is added to the relay node information stored in the relay node information 203 (illustrated in FIG. 4) in the other device information management table 200 is stored. For example, in the state illustrated in FIG. 1, a case that a route from the information processing device 100 to the information processing device 11 via the information processing device 12 can be set is assumed. In this case, in the relay node information 203 of the terminal identification information 201 "0011" in the other device information management table 200 of the information processing device 100, the terminal identification information "0012" of the information processing device 12 that can be a relay node is stored. In this case, when the information processing device 100 transmits the beacon, information ("0012" and "0100") for which the terminal identification information "0100" of the information processing device 100 is added to the relay node information "0012" stored in the relay node information 203 is stored in the relay node information 762.

However, when "relay node impossible" is stored in the relay node setting information 742 in FIG. 8a, the information processing device which has transmitted the beacon cannot be turned to a relay node. Therefore, the other device information including the information processing device which has transmitted the beacon in the relay node information 203 (illustrated in FIG. 4) may be eliminated from the other device information management table 200.

Also, in the predicted communication speed information 763, a value for which a newly acquired metric value is added to a metric value corresponding to the value stored in the predicted communication speed 205 (illustrated in FIG. 4) in the other device information management table 200 is stored.

In this way, combinations (that is, M combinations) of the information processing device IDs [0]-[M] 753 and the other device information fields [0]-[M] 754 are present for the number of services that the information processing device which transmits the beacon should be notified of.

For example, when the information processing device 100 illustrated in FIG. 1 transmits a beacon by broadcast, the nearby information processing devices (for example, the information processing devices 12, 14, 18 and 19) receive the beacon. Then, the information processing devices around the information processing device 100 can detect that the beacon is the beacon transmitted from the information processing device 100 on the basis of the header of the received beacon. Also, the information processing devices around the information processing device 100 can recognize the services or the like that the information processing device 100 can provide by confirming contents of the beacon information 720 included in the received beacon. In addition, the information processing devices around the information processing device 100 update (or add) the other device information management table (which corresponds to the other device information management table 200 illustrated in FIG. 4), on the basis of the contents of the beacon information 720 included in the received beacon.

For example, a case that the information processing device 12 receives the beacon 710 transmitted from the information processing device 100 is assumed. In this case, the information processing device 12 can detect that the information processing device 100 of the transmission source is present configuring a network nearby, on the basis of the network attribute 723 included in the received beacon 710. In addition, the attribute of this network is specified by the network attribute 723.

In addition, the information processing device 12 can acquire the information (the position information, the charging information and the service or the like) related to the information processing device 100, on the basis of the subject device information 730 included in the received beacon 710. Similarly, the information processing device 12 can acquire the information (the position information, the charging information and the service or the like) related to the other information processing devices other than the information processing device 100, on the basis of the other device information 750 included in the received beacon 710. Then, the information processing device 12 updates (or adds) the other device information management table (which corresponds to the other device information management table 200 illustrated in FIG. 4), on the basis of the subject device information 730 and the other device information 750 included in the received beacon 710.

Also, for the information processing device 12, the subject device can operate as a relay node of a multi-hop relay. Thus, the information processing device 12 can also notify the other information processing devices of the information (the position information, the charging information and the service or the like) related to the information processing device 100. That is, the other device information 750 included in the beacon 710 transmitted by the information processing device 12 partially includes the information (the other device information) related to the information processing device 100.

By repeating transmission and reception of the subject device information and the other device information in this way, the subject device information and the other device information recognized by the information processing device 100 can be provided all over the network. That is, the information processing devices can report the information (the position information, the charging information and the service or the like) related to the information processing devices to the nearby information processing devices, by including the subject device information and the other device information in the beacons which are periodically transmitted. In addition, the information processing devices can find the information processing devices that are present around and can simultaneously detect, for example, what kind of services the found information processing devices provide, by receiving the beacon. In this way, the subject device information and the other device information can recognize information (service information) related to the services provided by the information processing devices as service discovery information of which the other information processing devices are to be notified.

However, as described above, by limiting the number of times of forwarding a packet, communicating parties that the information processing device 100 can be connected to can be limited. In this way, by limiting the number of times of forwarding, a range of transmitting the subject device information and the other device information recognized by the information processing device 100 can be adjusted. Thus, overheads can be reduced.

[Display Example of Route Information]

FIG. 9 is a diagram illustrating one example (display screen 300) of a display screen displayed at the input/output unit 170 in the first embodiment of the present technology.

FIG. 9 illustrates a display example of a connection route and a connection candidate route (a connection structure of a mesh network) in the case that information processing devices are arranged as illustrated in FIG. 1. Here, a connection route means a route (an actually connected route) between information processing devices for which connection processing is performed to be in the state that various kinds of information can be exchanged (for example, the state (2) described above). Also, a connection candidate route means a route (a connectable route) between information processing devices turned to a connectable state (for example, the state (1) or (3) described above). In addition, it is assumed that route information is information indicating relations of a plurality of information processing devices in a network and routes related to wireless communication. For example, the route information is information processing devices, connection routes and connection candidate routes.

As illustrated in FIG. 9, at the input/output unit 170, marks expressing information processing devices are displayed at relative positions of the information processing devices (including the information processing device 100). Note that FIG. 9 illustrates an example of displaying an image for which a portable information processing device (for example, a smartphone or a tablet terminal) is simplified as a mark that expresses each movable information processing device (moving body). Also, FIG. 9 illustrates an example of displaying an image for which a base station is simplified as a mark that expresses each fixed type information processing device (base station). In addition, in FIG. 9, for facilitation of the description, to the marks that express information processing devices, the same signs as the signs of the information processing devices illustrated in FIG. 1 are attached and indicated.

In addition, the information processing device 100 (subject device) is displayed by attaching a mark 301 indicating that it is the subject device so as to be distinguished from the other information processing devices. The mark 301 can be a circular mark which surrounds the information processing device 100, for example.

Here, a position of each information processing device on a display surface of the input/output unit 170 can be determined on the basis of position information acquired by the position information acquiring unit 150 and the position information 202 (illustrated in FIG. 4) in the other device information management table 200. For example, on the basis of the latitude and the longitude included in the position information of each information processing device to be a display object, an absolute position of each information processing device can be determined. On the basis of the position of each information processing device determined in this way, the relative position of each information processing device can be determined.

In addition, the control unit 130 of the information processing device 100 can make the input/output unit 170 display a map including the position at which the information processing device 100 is present, on the basis of the position information (the position information related to the position at which the information processing device 100 is present) acquired by the position information acquiring unit 150. Then, the control unit 130 of the information processing device 100 may arrange marks 11 to 19, 21 and 22 that express the information processing device 100 and the other information processing devices on the map. Note that map data for displaying the map may be stored in the memory 140, or may be acquired from the outside for each display. In addition, this map data is data specified by the latitude and the longitude for example, and is sectioned into a plurality of areas with fixed latitude width and longitude width as units. Note that the position of the information processing device 100 on the map is specified by the position information acquired by the position information acquiring unit 150. Also, the positions of the other information processing devices on the map can be specified by the position information 202 (illustrated in FIG. 4) in the other device information management table 200.

For example, a relative position of each information processing device can be detected using radio waves. For example, the control unit 130 of the information processing device 100 acquires radio wave strengths from the plurality of information processing devices. Based on such radio wave strengths, the relative position (the position of the subject device) with the other information processing devices can be obtained using a triangulation measurement method. Note that, when this position estimating method is used, it may be impossible to obtain an absolute position of the information processing device 100. However, when the relative positions with the other information processing devices obtained by the plurality of information processing devices belonging to the network are counted and used, it is possible to exactly map the relative position with each of the information processing devices to some extent.

For example, information processing devices belonging to the network obtain the relative position (the position of the subject device) with the other information processing devices and share information about the position (position information) via the network. Therefore, the relative position of the subject device can be obtained based on a position (a relative position of the subject device seen from other information processing devices) obtained by other information processing devices and a position (a relative position (a position of the subject device) with other information processing devices) obtained by the subject device.

In addition, it is assumed a case in which a plurality of antennas are provided in the information processing device 100, and radio waves are transmitted and received using the plurality of antennas. In this case, the control unit 130 of the information processing device 100 can predict a direction in which radio waves are received by acquiring a difference of radio waves that reach the antennas of the information processing device 100.

In addition, when the direction predicted by information processing devices belonging to the network is shared via the network, it is possible to further increase accuracy of the direction predicted by the information processing devices. In addition, when radio waves having directivity are transmitted and received in cooperation with each other via the network, it is possible to further increase the accuracy of the prediction.

In addition, when position estimation based on the radio wave strength, and prediction of a direction in which radio waves reach are combined, it is possible to more accurately predict the relative position. In addition, along with such a combination, when the sensor information of the acceleration sensor and the geomagnetic sensor described above is used together, it is possible to further increase the accuracy of relative position prediction.

Note that, while FIG. 9 illustrates an example of displaying images for which a portable information processing device and a base station are simplified as images that express information processing devices, other images may be displayed. For example, information (accompanying information) related to a user who possesses an information processing device (moving body) and information (accompanying information) related to a location where an information processing device (fixed type device) is installed may be stored in association with the information processing devices and these accompanying information items may be displayed. For example, as the information related to a user who possesses an information processing device (moving body), a name, a nickname, an image (for example, a face image), an icon and an avatar of the user can be stored in the other device information management table 200 in association. In addition, as the information related to a location where an information processing device (fixed type device) is installed, an address of the location, a geographical name, a landmark, a name of a sightseeing spot, and these images can be stored in the other device information management table 200 in association. Then, by displaying the associated accompanying information at positions (positions on the display surface) to display the information processing devices, relations with actual objects and a present location can be easily recognized. Thus, a user can easily recognize which information processing device is present in which direction or the like.

Also, a connection state between the information processing device 100 and the other information processing device can be specified by the connection information 204 (illustrated in FIG. 4) in the other device information management table 200. In addition, a route (connection route) to the other information processing device connected to the information processing device 100 can be specified by the relay node information 203 (illustrated in FIG. 4) in the other device information management table 200.

Here, for example, a case that the base station 21 and the information processing device 100 are connected via the information processing devices 11 and 12 is assumed. In this case, like an arrow 302 of a thick line illustrated in FIG. 9, the connection route between the base station 21 and the information processing device 100 can be displayed.

In addition, a route (connection candidate route) to an information processing device connectable with the information processing device 100 among the other information processing devices not connected to the information processing device 100 can be also specified by the relay node information 203 (illustrated in FIG. 4) in the other device information management table 200.

For example, as illustrated in FIG. 9, connection routes and connection candidate routes among the devices can be displayed by dotted lines 311 to 327. Note that FIG. 9 illustrates an example of displaying routes among the devices that are connected by dotted lines 311, 313 and 317.

In addition, FIG. 9 illustrates an example of expressing a connection route by an arrow of a thick line and expressing a connection candidate route by a dotted line. However, the connection route and the connection candidate route may be in other distinguishable display forms. For example, colors and thicknesses of the connection route and the connection candidate route can be changed.

Here, for example, on the basis of a predetermined operation (for example, a touch operation or a tracing operation) on a display surface (display screen 300) of the input/output unit 170, wireless communication in a network can be controlled.

For example, in the state illustrated in FIG. 9, an example of performing operation input for connecting the information processing device 100 to the information processing device 18 is illustrated.

For example, a touch operation (a contacting operation or an approaching operation) of touching the mark that expresses the information processing device 18 can be an operation for connecting the information processing device 100 to the information processing device 18. Also, for example, an operation (a contacting operation or an approaching operation) of tracing the mark that expresses the information processing device 18 so as to enclose it may be performed. Note that it is also assumed that the information processing device 100 is connected to the other information processing device (connection destination) via at least one information processing device (relay node). In this case, for example, a touch operation or a tracing operation is performed for a mark that expresses the information processing device to be the connection destination and also a mark that expresses the information processing device to be the relay node. Note that an order of performing a touch operation and a tracing operation cab be set beforehand. Also, the connection destination and the relay node may be determined on the basis of those operations.

Also, for example, an operation (for example, an operation of tracing a dotted line 324 connecting two marks) of connecting the mark that expresses the information processing device 100 and the mark that expresses the information processing device 18 can be an operation for connecting the information processing device 100 to the information processing device 18. Note that, as a connecting operation, for example, a drag operation, a drag-and-drop operation, or a moving operation can be performed. Note that, in the case of connecting the information processing device 100 to the other information processing device (connection destination) via a relay node, for example, an operation of connecting the marks that respectively express the information processing device 100, the relay node and the connection destination is performed.

In addition, for example, a touch operation (a contacting operation or an approaching operation) of touching the dotted line 324 connecting the mark that expresses the information processing device 100 and the mark that expresses the information processing device 18 can be an operation for connecting the information processing device 100 to the information processing device 18. Note that, in the case of connecting the information processing device 100 to the other information processing device (connection destination) via a relay node, for example, an operation of touching (successively touching, or simultaneously touching) the dotted lines connecting each of the information processing device 100, the relay node and the connection destination is performed.

Also, for example, a touch operation (a contacting operation or an approaching operation) of simultaneously (or almost simultaneously) touching the mark that expresses the information processing device 100 and the mark that expresses the information processing device 18 can be an operation for connecting the information processing device 100 to the information processing device 18. Note that, in the case of connecting the information processing device 100 to the other information processing device (connection destination) via a relay node, for example, a touch operation of simultaneously (or almost simultaneously) touching the marks that respectively express the information processing device 100, the relay node and the connection destination is performed.

When one of these operations (the operation for connecting the information processing device 100 to the information processing device 18) is performed, the control unit 130 of the information processing device 100 performs connection processing for connecting the information processing device 100 to the information processing device 18.

Specifically, the control unit 130 of the information processing device 100 transmits a connection request to the information processing device 18. Note that, in the case of connecting to the information processing device incapable of directly exchanging information with the information processing device 100, a connection request is transmitted via the other information processing device other than the information processing device. When the information processing device 18 receives the connection request, the connection processing is started between the information processing device 100 and the information processing device 18, and the information processing device 100 and the information processing device 18 are connected by utilizing wireless communication.

In this way, by displaying route information indicating relations of the information processing devices and routes among the information processing devices, it is possible to visually and easily recognize the positions of the information processing devices and communicable routes. Also, by performing a user operation such as a touch operation on a display screen where these are displayed, the information processing device desired by a user can be easily connected.

Here, for example, it is highly possible that connection routes and connection candidate routes in a mesh network are successively changed due to movement of the other information processing devices, battery exhaustion, rejection from the other information processing device side, timeout of the connection time or the like. Then, it is preferable to update the connection routes and the connection candidate routes in the mesh network in real time according to these changes.

In addition, whether or not the connection to the information processing device 100 is possible can be also determined on the basis of whether or not a response comes for a beacon from the information processing device 100. That is, when a response comes for a beacon from the information processing device 100, it can be determined that the information processing device which has transmitted the response is connectable with the information processing device 100. Then, when a user operation for connecting to the information processing device which has transmitted the response is accepted, a request of a connection request is transmitted to the information processing device and the connection processing can be performed with the information processing device.

[Operation Example of Information Processing Device]

Figure 10:
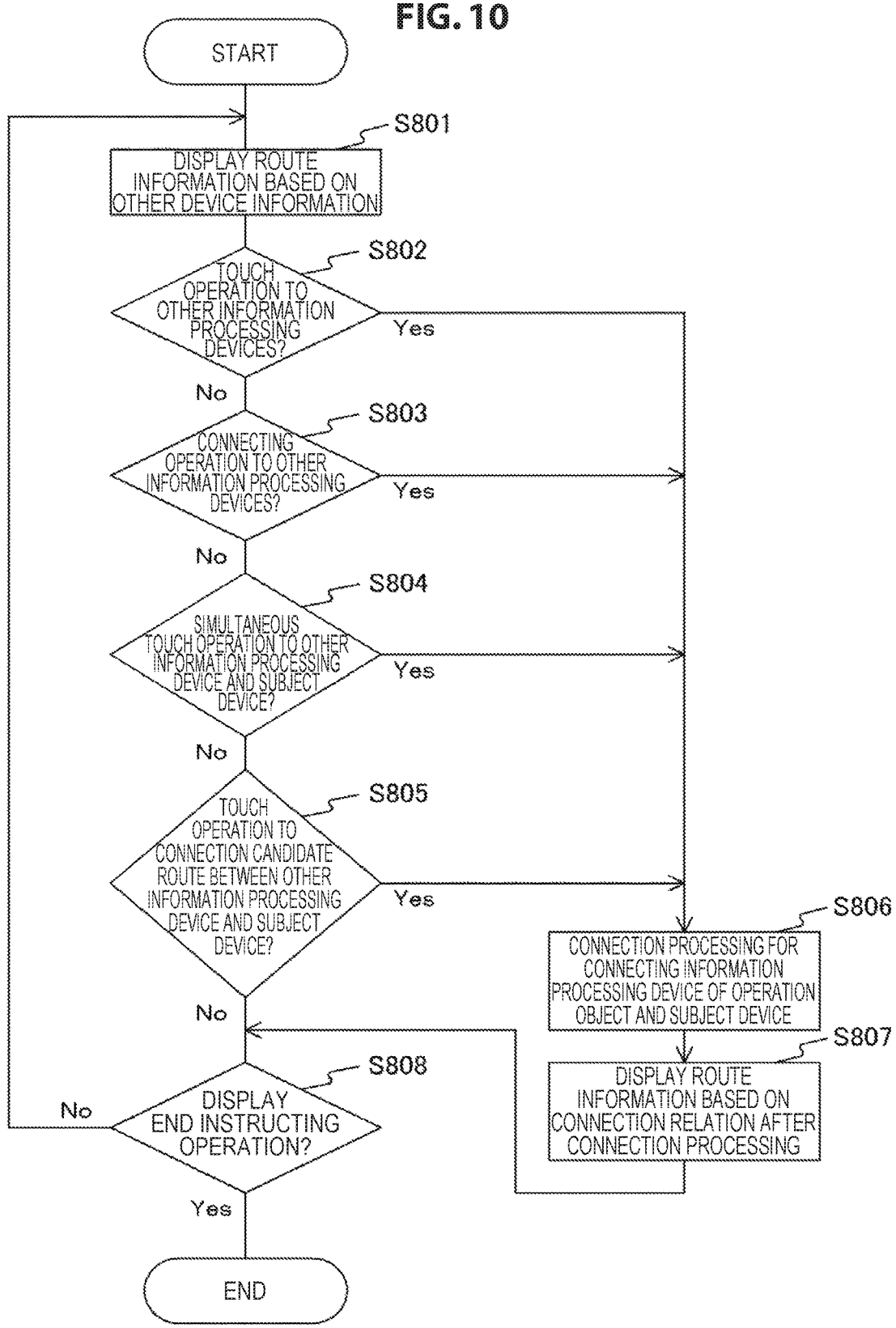
FIG. 10 is a flowchart illustrating an example of a processing procedure of connection processing by the information processing device 100 in a first embodiment of the present technology.

FIG. 10 is a flowchart illustrating one example of a processing procedure of connection processing by the information processing device 100 in the first embodiment of the present technology.

First, the control unit 130 makes the input/output unit 170 display route information (for example, a display screen including devices, connection routes and connection candidate routes), on the basis of the information stored in the other device information management table 200 (step S801). For example, as illustrated in FIG. 9, the display screen 300 including devices, connection routes and connection candidate routes is displayed.

Next, the control unit 130 determines whether or not a touch operation to the other information processing device displayed at the input/output unit 170 is performed (step S802). When the touch operation to the other information processing device is performed (step S802), the control unit 130 performs connection processing for connecting the information processing device touched by the touch operation and the subject device (the information processing device 100) (step S806). That is, the control unit 130 performs connection processing for connecting the information processing device which is the operation object and the subject device (the information processing device 100) (step S806).

Subsequently, the control unit 130 makes the input/output unit 170 display route information, on the basis of the information (the information after the connection processing) stored in the other device information management table 200 (step S807).

In the case that the touch operation to the other information processing devices is not performed (step S802), the control unit 130 determines whether or not an operation of connecting the information processing device 100 displayed at the input/output unit 170 to the other information processing device is performed (step S803). When the operation of connecting to the other information processing device is performed (step S803), the control unit 130 performs connection processing for connecting the information processing device specified by the connecting operation with the subject device (the information processing device 100) (step S806).

In the case that the operation of connecting to the other information processing device is not performed (step S803), the control unit 130 determines whether or not a touch operation of simultaneously touching the information processing device 100 displayed at the input/output unit 170 and the other information processing device is performed (step S804). When the touch operation of simultaneously touching them is performed (step S804), the control unit 130 performs connection processing for connecting the information processing device touched by the touch operation and the subject device (the information processing device 100) (step S806).

In the case that the touch operation of simultaneously touching them is not performed (step S804), the control unit 130 determines whether or not a touch operation to a connection candidate route between the information processing device 100 displayed at the input/output unit 170 and the other information processing device is performed (step S805). When the touch operation to the connection candidate route is performed (step S805), the control unit 130 performs connection processing for connecting the other information processing device of the connection candidate route touched by the touch operation and the subject device (the information processing device 100) (step S806).

In the case that the touch operation to the connection candidate route is not performed (step S805), the control unit 130 determines whether or not an instructing operation of ending display of route information is performed (step S808). Then, when the instructing operation is performed (step S808), an operation of the connection processing is ended. On the other hand, when the instructing operation is not performed (step S808), the operation returns to step S801. Note that steps S801 and S807 are one example of a display procedure described in the scope of claims. Also, steps S802 to S806 are one example of a control procedure described in the scope of claims.

In this way, the control unit 130 can perform control of making the input/output unit 170 display at least one of connection route information and connection candidate route information as route information. Here, connection route information is information indicating a connection route in the case that the information processing device 100 is connected to the other information processing device by utilizing wireless communication. In addition, connection candidate route information is information indicating a route through which the information processing device 100 can be connected to the other information processing device by utilizing wireless communication.

In addition, in the case that operation input of selecting a route in connection candidate route information displayed at the input/output unit 170 is performed, the control unit 130 performs control for connecting the information processing device 100 and the other information processing device via the selected route. In addition, in the case that the operation input of selecting the other information processing device displayed at the input/output unit 170 is performed, the control unit 130 performs control for connecting the information processing device 100 to the selected other information processing device. In these cases, the control unit 130 transmits a connection request for connecting to the selected other information processing device to the other information processing device by utilizing wireless communication.

[Display Example of Communication Speed Information, Charging Information and Point Information]

As described above, in an embodiment of the present technology, when each information processing device is selected as a connection destination, points or a charge is transferred from the information processing device which has requested the connection to the connection destination.

Here, a case that the subject device becomes a relay node so that the subject device assists communication of other users is assumed. In this case, even though the subject device does not perform communication related to the subject device, a battery residual amount (cell residual amount) of the subject device decreases, and a communication speed of the subject device also decreases. Therefore, it is assumed that users who desire to be a relay node decrease. Then, it is important to increase users who want to be a relay node by transferring, to the information processing device which has become a relay node, points or charges from the other information processing device which performs communication through the relay node. Then, in an embodiment of the present technology, to the information processing device which has become a relay node, points or charges from the other information processing device which performs communication through the relay node is transferred.

Here, it is assumed that a decreasing rate of the communication speed or the battery residual amount (cell residual amount) is different depending on the information processing devices. Therefore, it is preferable to change points and charges according to the information processing device which has become a relay node, without setting fixed points or charges to all the information processing devices which have become the relay node. In the case of changing points and charges according to the information processing device which has become the relay node in this way, it is preferable to easily recognize points and charges in the case of becoming a relay node for each information processing device.

Figure 11:
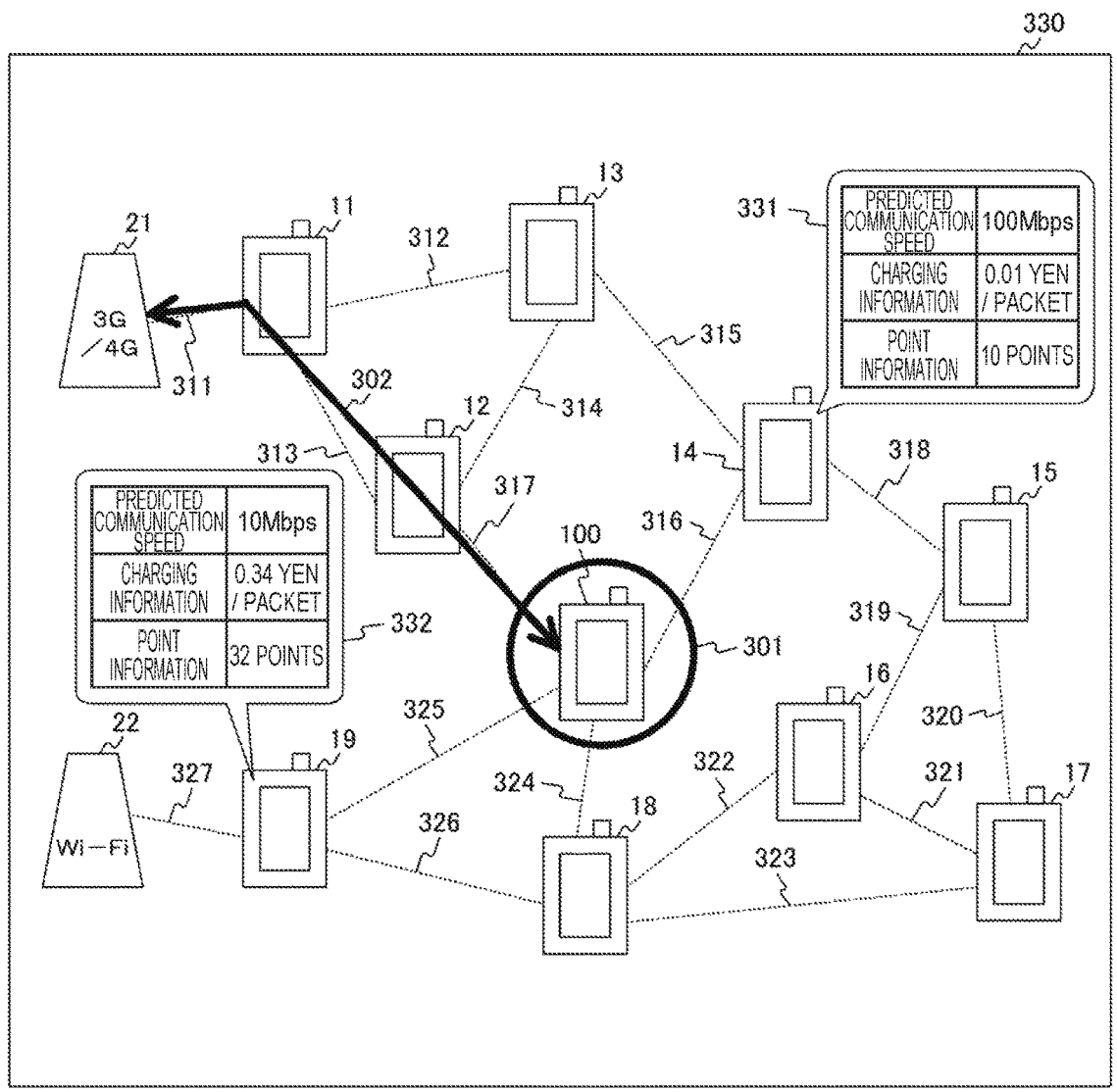
FIG. 11 is a diagram illustrating an example (display screen 330) of a display screen displayed at the input/output unit 170 in a first embodiment of the present technology.

Therefore, FIG. 11 illustrates an example of displaying points and the charge to be requested to the other information processing device when the subject device becomes a relay node near a connection candidate route. Thus, a user can visually and easily confirm the points and the charge. In addition, after the user confirms the points and the charge, a connection destination can be determined.

In this way, in the case that a user performs a connection operation with the other information processing device, it is assumed to select a connection destination in consideration of a communication speed after the connection and charging upon the connection or the like. Therefore, by displaying the information to be considered when selecting a connection destination, a selecting operation for the connection destination can be further facilitated.

[Display Example of Reference Information]

FIG. 11 is a diagram illustrating one example (display screen 330) of a display screen displayed at the input/output unit 170 in the first embodiment of the present technology.

FIG. 11, for facilitation of the description, illustrates an example of displaying reference information 331 of the information processing device 14 and reference information 332 of the information processing device 19 on the display screen 300 illustrated in FIG. 9.

Here, reference information is information which a user refers to when selecting a connection destination of the information processing device 100. FIG. 11 illustrates an example of displaying, as the reference information 331, a predicted communication speed, charging information and point information related to the information processing device 14 when the information processing device 100 is connected. In addition, an example of displaying, as the reference information 332, a predicted communication speed, charging information and point information related to the information processing device 19 when the information processing device 100 is connected is illustrated.

Note that FIG. 11 illustrates an example of displaying only the reference information 331 and 332 of the information processing devices 14 and 19, however, reference information of all the other information processing devices or reference information of some of them may be displayed. Also, reference information of the information processing device specified by a user operation (for example, a touch operation to a mark that expresses a desired information processing device) may be displayed.

Here, the reference information 331 can be displayed on the basis of the information associated with "0014" of the terminal identification information 201 (illustrated in FIG. 4) in the other device information management table 200. For example, the predicted communication speed of the reference information 331 is displayed on the basis of the predicted communication speed 205. In addition, charging information of the reference information 331 is displayed on the basis of the charging information 206. Also, point information of the reference information 331 is displayed on the basis of the point information 207.

Similarly, the reference information 332 can be displayed on the basis of the information associated with "0019" of the terminal identification information 201 (illustrated in FIG. 4) in the other device information management table 200.

In FIG. 11, an example of displaying charging information and point information as the reference information is illustrated. However, in the case of using only one of the charging information and the point information when connecting to the other information processing device, display of the information which is not used can be omitted.

In this way, the control unit 130 can perform control of making the input/output unit 170 display information related to the other information processing device and including at least one of communication speed information, charging information and point information in association with the other information processing device.

In addition, reference information (the information during connection or in the case of being connected) such as a predicted communication speed, charging information and points related to a connection candidate route can be displayed on the connection candidate route (node) or in its vicinity.

Thus, a user can visually and easily confirm by which connection candidate route it is good to perform connection. Also, confirmation can be easily performed such that a determining operation of a connection candidate route can be easily performed.

[Display Example of Service Information]

Figure 12:
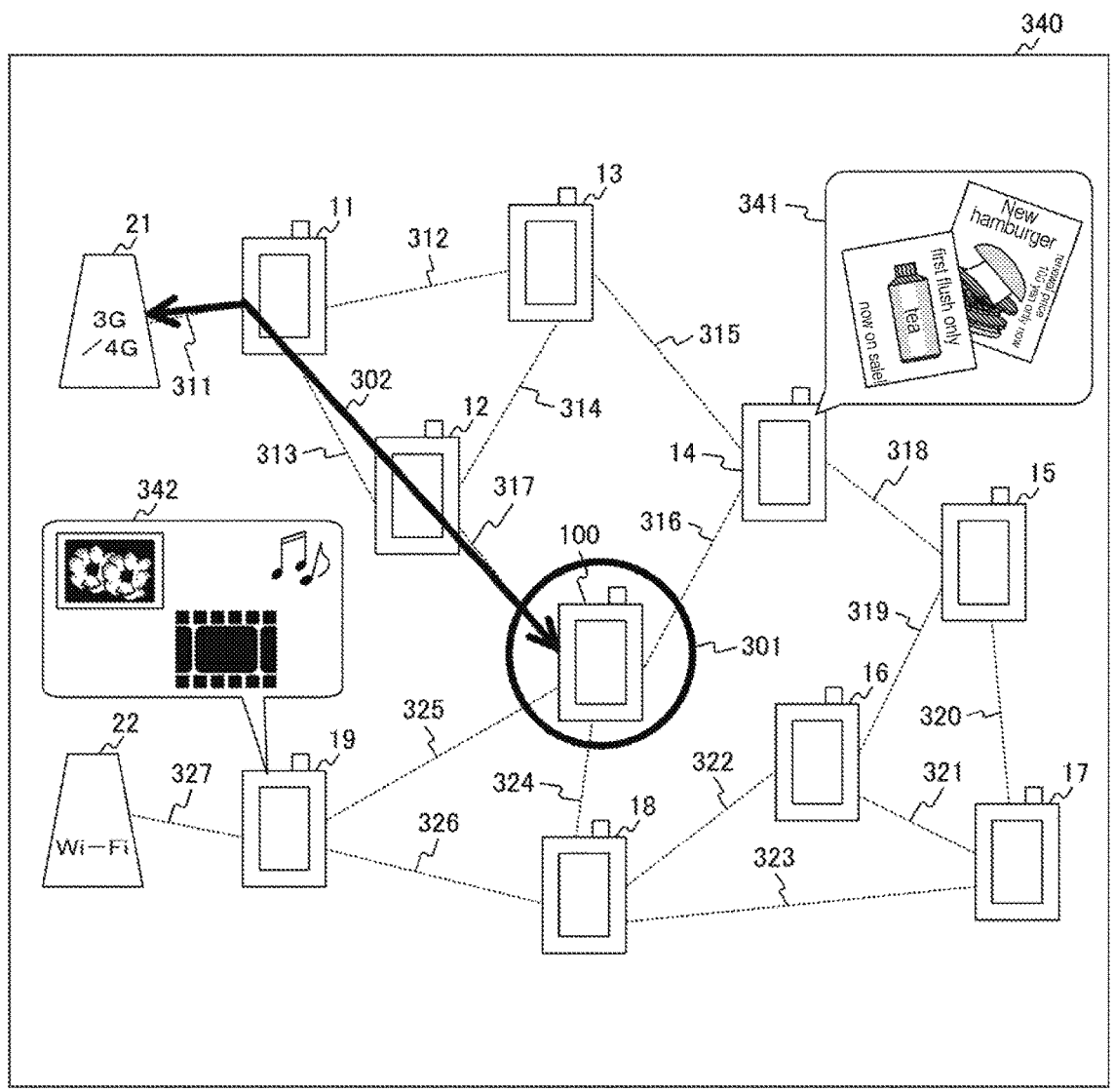
FIG. 12 is a diagram illustrating an example (display screen 340) of a display screen displayed at the input/output unit 170 in a first embodiment of the present technology.

FIG. 12 is a diagram illustrating one example (display screen 340) of a display screen displayed at the input/output unit 170 in the first embodiment of the present technology.

FIG. 12, for facilitation of the description, illustrates an example of displaying service information 341 of the information processing device 14 and service information 342 of the information processing device 19 on the display screen 300 illustrated in FIG. 9.

Here, service information is information about services that information processing devices can provide. For example, in the case that the information processing device 14 can provide an advertisement of tea and an advertisement of hamburgers, the service information 341 indicating that it is possible to provide an advertisement of tea and an advertisement of hamburgers is displayed. Also, for example, in the case that the information processing device 19 can provide still image contents, moving image contents and music contents, the service information 342 indicating that it is possible to provide those contents is displayed.

Note that an advertisement of tea and an advertisement of hamburgers in the service information 341 correspond to an advertisement C and an advertisement D stored in the service information 209 (illustrated in FIG. 4) in the other device information management table 200. In addition, still image contents, moving image contents and music contents in the service information 342 correspond to contents C to E stored in the service information 209 in the other device information management table 200.

That is, the service information 341 can be displayed on the basis of the service information 209 associated with "0014" of the terminal identification information 201 (illustrated in FIG. 4) in the other device information management table 200. Similarly, the service information 342 can be displayed on the basis of the service information 209 associated with "0019" of the terminal identification information 201 (illustrated in FIG. 4) in the other device information management table 200.

Note that FIG. 12 illustrates an example of displaying only the service information 341 and 342 of the information processing devices 14 and 19, however, all the service information of the other information processing devices or some of the service information may be displayed. Also, the service information of the information processing device specified by a user operation (for example, a touch operation to a mark that expresses a desired information processing device) may be displayed.

Note that, in the case that advertisement information and contents information are stored in service information related to one information processing device, the information items may be simultaneously displayed or may be displayed switchably by a user operation. Also, in the case that a plurality of advertisement information items are stored in service information related to one information processing device, the advertisement information items may be simultaneously displayed or may be displayed switchably by a user operation. Similarly, in the case that a plurality of contents information items are stored in service information related to one information processing device, the contents information items may be simultaneously displayed or may be displayed switchably by a user operation.

Note that FIG. 12 illustrates an example of displaying advertisement information and contents information as service information, however, the other information may be displayed as service information. For example, coupon information that a user can use may be displayed. In addition, for example, information (user information) related to a user who possesses (or uses or manages) each information processing device may be displayed. The user information is, for example, information items (for example, a nickname, an icon and a hobby) determined and set to be opened to the public by a user.

In addition, while FIG. 12 illustrates an example of displaying service information of information processing devices which are one hop ahead, service information of information processing devices which are two hops or more ahead may be displayed. In the case of displaying service information of information processing devices which are two hops or more ahead in this way, service information of an information processing device to be a relay node may be also displayed. Then, in the case of connecting to the information processing devices which are two hops or more ahead, a service may be provided (for example, advertisement information may be displayed) also from the information processing device to be a relay node.

In this way, the control unit 130 can perform control of making the input/output unit 170 display at least one of user information related to users of the other information processing devices and service information related to services that the other information processing devices can provide in association with the other information processing devices.

In this way, together with connection routes and connection candidate routes, on the routes (nodes) and in their vicinity, information items (advertisement information, contents information, coupon information, and user information) related to information processing devices can be displayed. Thus, a user visually confirms information that can be obtained from an information processing device connectable through a mesh network and can then determine a connection destination by a predetermined user operation.

[Operation Example of Information Processing Device]

Figure 13:
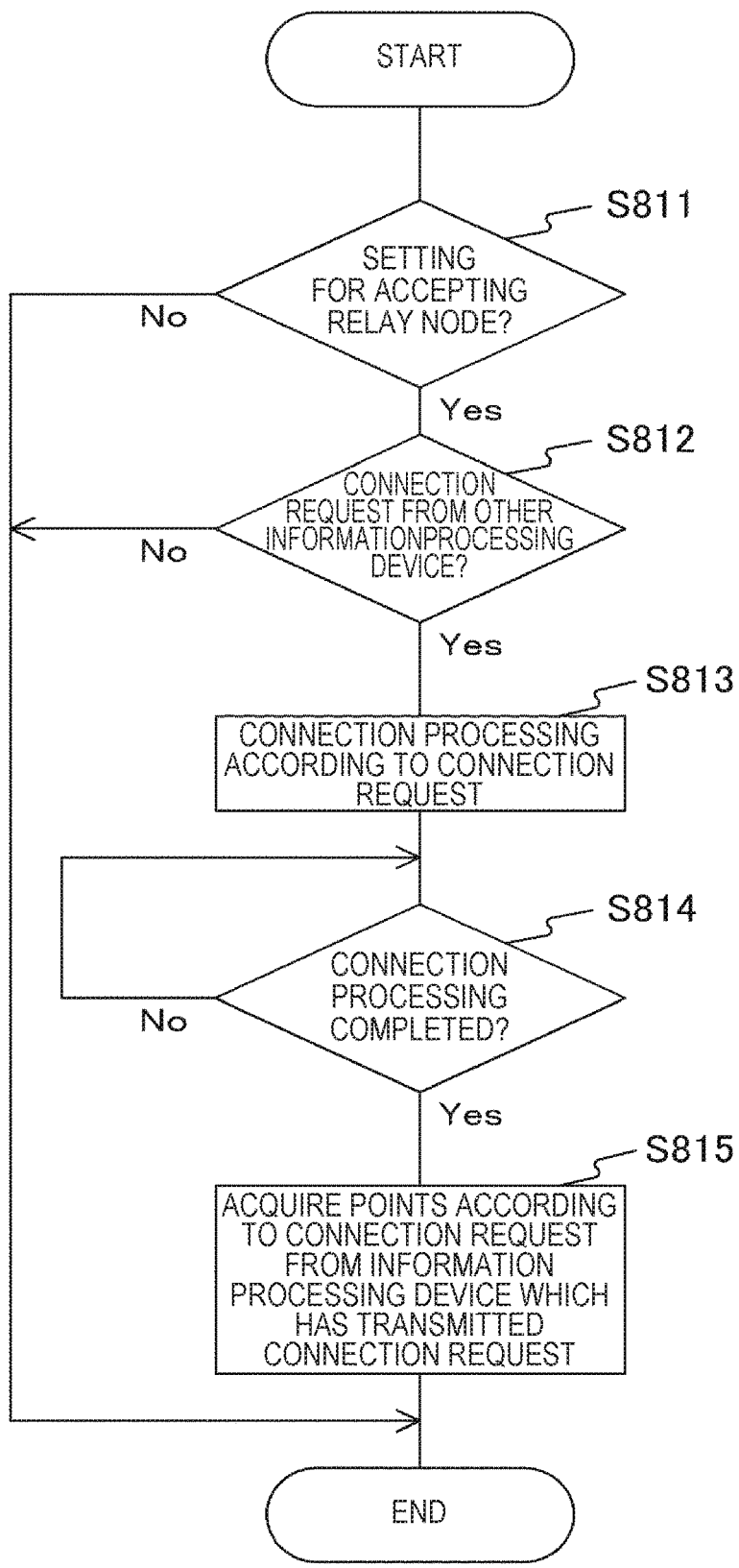
FIG. 13 is a flowchart illustrating an example of a processing procedure of connection processing by the information processing device 100 in a first embodiment of the present technology.

FIG. 13 is a flowchart illustrating one example of a processing procedure of connection processing by the information processing device 100 in the first embodiment of the present technology. FIG. 13 illustrates an example in the case that the information processing device 100 receives a connection request (a connection request for connecting to the other information processing device with the information processing device 100 as a relay node) from the other information processing device and performs connection processing. In addition, FIG. 13 illustrates an example of receiving points from a connection request source when the information processing device 100 is operated as a relay node.

First, the control unit 130 determines whether or not setting is to accept a relay node in the information processing device 100 (step S811). Specifically, the control unit 130 determines that setting is to accept a relay node when "relay node possible" is stored in the relay node setting information 211 in the subject device information management table 220. On the other hand, the control unit 130 determines that setting is not to accept a relay node when "relay node impossible" is stored in the relay node setting information 211 in the subject device information management table 220. Then, in the case that setting is not to accept a relay node (step S811), an operation of connection processing is ended.

In the case that setting is to accept a relay node (step S811), the control unit 130 determines whether or not a connection request is received from the other information processing device (step S812). Then, in the case of not receiving a connection request from the other information processing device (step S812), an operation of connection processing is ended.

In the case of receiving a connection request from the other information processing device (step S812), the control unit 130 performs connection processing according to the connection request with the information processing device which has transmitted the connection request (step S813). In addition, connection processing according to the connection request is performed with the other information processing device according to the connection request (step S813). Subsequently, the control unit 130 determines whether or not the connection processing is completed (step S814), and when the connection processing is not completed, continuously performs monitoring.

In the case that the connection processing is completed (step S814), the control unit 130 acquires points according to the connection request from the information processing device (the information processing device (connection request source) which has transmitted the connection request) connected by the connection processing (step S815). That is, the control unit 130 performs control for exchanging point information by utilizing wireless communication with the information processing device (connection request source) connected by the connection processing. For example, a case that "10 points/1 connection" is stored in the request point information 223 (illustrated in FIG. 5) in the subject device information management table 220 of the information processing device 100 is assumed. In this case, the control unit 130 subtracts 10 points from possessed point information (corresponding to the possessed point information 224 illustrated in FIG. 5) of the connection request source, and adds 10 points to the possessed point information 224 (illustrated in FIG. 5) in the subject device information management table 220 of the information processing device 100.

Note that, in this example, an example of receiving points from a connection request source when only the information processing device 100 is operated as a relay node (that is, in the case that there is one relay node) is described. However, it is also assumed that one or a plurality of the other information processing devices other than the information processing device 100 become relay nodes. In this case, a connection request source may transfer points to all the relay nodes, or a connection request source may transfer points only to a relay node which is one hop ahead. When a connection request source transfers points only to a relay node which is one hop ahead in this way, to a relay node which is two hops or more ahead, a relay node immediately before it may transfer points. When the relay node immediately before transfers points in this way, a value of request point information (corresponding to the request point information 223 illustrated in FIG. 5) may be reduced according to the number of hops (the number of forwarding) from a connection request source. Note that it is similarly applicable also for a case of receiving a predetermined charge from a connection request source in the case that the information processing device 100 is operated as a relay node.

In this way, when the information processing device 100 is connected to the other information processing device by utilizing wireless communication, the control unit 130 can perform control for exchanging points with the other information processing device. In this case, the control unit 130 performs control for transferring points specified by point information to the other information processing device. Note that points to be a transfer object may be a fixed value (a fixed value per connection) as illustrated in FIG. 5 or may be a variable value that fluctuates on the basis of connection time with the other information processing device. For example, a variable value can be a value for which 5 points are added every time 5 minutes elapse. That is, the control unit 130 may perform control for transferring points (variable value) set on the basis of the connection time with the other information processing device to the other information processing device.

Also, only when the information processing device 100 becomes a relay for connecting the other two information processing devices, the control unit 130 may perform control for exchanging point information with at least one information processing device of the two information processing devices. In this case, the control unit 130 performs control for acquiring points specified by point information from the at least one information processing device.

[Display Example of Reference Information of Information Processing Device for which a Plurality of Connection Candidate Routes are Present]

FIG. 11 illustrates an example of displaying the reference information 331 and 332 of the information processing devices 14 and 19 capable of directly communicating with the information processing device 100. Here, the information processing devices incapable of directly communicating with the information processing device 100 communicate with the information processing device 100 via a relay node (other information processing device). Therefore, it is assumed that there are a plurality of connection candidate routes for connecting the information processing devices incapable of directly communicating with the information processing device 100, and the information processing device 100.

For example, in the state illustrated in FIG. 1, the information processing device 11 is an information processing device incapable of directly communicating with the information processing device 100. Also, there are a plurality of connection candidate routes for connecting the information processing device 100 and the information processing device 11. For example, a connection candidate route for which only the information processing device 12 is a relay node, a connection candidate route for which the information processing devices 12 and 13 are relay nodes, a connection candidate route for which the information processing devices 13 and 14 are relay nodes, and a connection candidate route for which the information processing devices 12 to 14 are relay nodes are assumed. In this way, when there are a plurality of connection candidate routes to a connecting opposite destination, information related to these connection candidate routes can be displayed as reference information.

Then, FIG. 14 illustrates an example of displaying reference information related to a plurality of connection candidate routes.

FIG. 14 is a diagram illustrating one example of a display screen displayed at the input/output unit 170 in the first embodiment of the present technology.

In FIG. 14, for facilitation of the description, only the information processing device 11 on the display screen 300 illustrated in FIG. 9 and its reference information 350 are illustrated. Also, in FIG. 14, illustration is omitted, however, it is assumed that reference information can be displayed similarly also for the other information processing devices.

As described above, in the other device information management table 200, information related to a plurality of routes for one information processing device can be stored. In an example illustrated in FIG. 14, information related to four routes for the information processing device 11 is stored in the other device information management table 200.

Here, for charging information, charging information set in the information processing device 11 or a relay node may be used, or charging information set in each of the information processing device 11 and the relay node may be used. For example, a value for which a predetermined operation is executed for a value specified by charging information set in each of the information processing device 11 and the relay node may be used. For example, a value (added value) for which a value specified by charging information set in each of the information processing device 11 and the relay node is added can be used. Also, for example, a value specified by charging information may be converted (for example, reduced) according to the number of hops (the number of forwarding) from the information processing device 100 and a value (added value) for which the converted value is added may be used.

Similarly, for point information, point information set in the information processing device 11 or a relay node may be used, or point information set in each of the information processing device 11 and the relay node may be used. For example, a value for which a predetermined operation is executed for a value specified by point information set in each of the information processing device 11 and the relay node may be used. For example, a value (added value) for which a value specified by point information set in each of the information processing device 11 and the relay node is added can be used. Also, for example, a value specified by point information may be converted (for example, reduced) according to the number of hops (the number of forwarding) from the information processing device 100 and a value (added value) for which the converted value is added may be used.

Here, it is also assumed that connection is concentrated on one information processing device. That is, it is assumed that the number of the connection to one information processing device becomes large. In such a case, new connection may be rejected by an automatic or manual operation. Also, for an information processing device that is already connected, its connection may be rejected and disconnected. In this case, information (rejection or acceptance) related to the connection rejection may be displayed as reference information.

Here, a case that an information processing device capable of performing wireless communication with the base station 21 illustrated in FIG. 1 is the information processing device 11 is assumed. In this case, a user who possesses the information processing device 11 needs to enter into a contract of a wireless connection service with a common carrier operating the base station 21 and pay the communication charge (for example, a monthly communication charge). That is, by setting effective contract authentication information relating to the common carrier to the information processing device 11, the user can utilize the base station 21 operated by the common carrier. Here, the contract authentication information is information needed for connection to a wireless communication network managed by the common carrier, and for example, includes contractor information related to authentication and charging or the like. The contract authentication information is, for example, a universal subscriber identity module (USIM).

In this way, the user who possesses the information processing device 11 needs to pay a communication charge of a wireless connection service. Then, when the other information processing device is connected to the information processing device 11, the connection may be permitted on condition that some of the communication charge of the user of the information processing device 11 is to be borne. That is, the user of the information processing device 11 can set charging information (which corresponds to the charging information 222 illustrated in FIG. 5) on the basis of the communication charge of the wireless connection service. Note that charging information may be automatically set on the basis of the communication charge of the wireless connection service. By setting the charging information in this way, the user of the information processing device 11 can reduce an amount of payment to the common carrier as the number of the connection to the information processing device 11 increases.

In addition, charging information can be similarly set for the information processing device capable of performing wireless communication with the base station 22 illustrated in FIG. 1. Also, charging information can be similarly set for the other information processing device under a contract (a contract for utilizing an access point or a base station) that generates a communication charge.

2. Second Embodiment

The first embodiment of the present technology illustrates an example of performing connection processing with other information processing devices on the basis of a user operation in an input/output unit where route information, reference information and service information or the like are displayed. Here, for example, in a case that many information processing devices are included in a display screen that displays route information or the like, it is assumed that it is difficult for a user to determine a connection destination when just reference information and service information or the like are displayed.

Then, the second embodiment of the present technology illustrates an example of displaying recommendation information according to preferences of a user in order to easily connect to an information processing device desired by the user. Note that, configurations of the information processing devices and the base stations in the second embodiment of the present technology are almost the same as those of the information processing devices 11 to 19 and 100, and the base stations 21 and 22 illustrated in FIG. 1 or the like. Therefore, for parts in common with the first embodiment of the present technology, the same signs as the first embodiment of the present technology are attached and some of the description will be omitted.

[Display Example of Recommendation Information]

Figure 15:
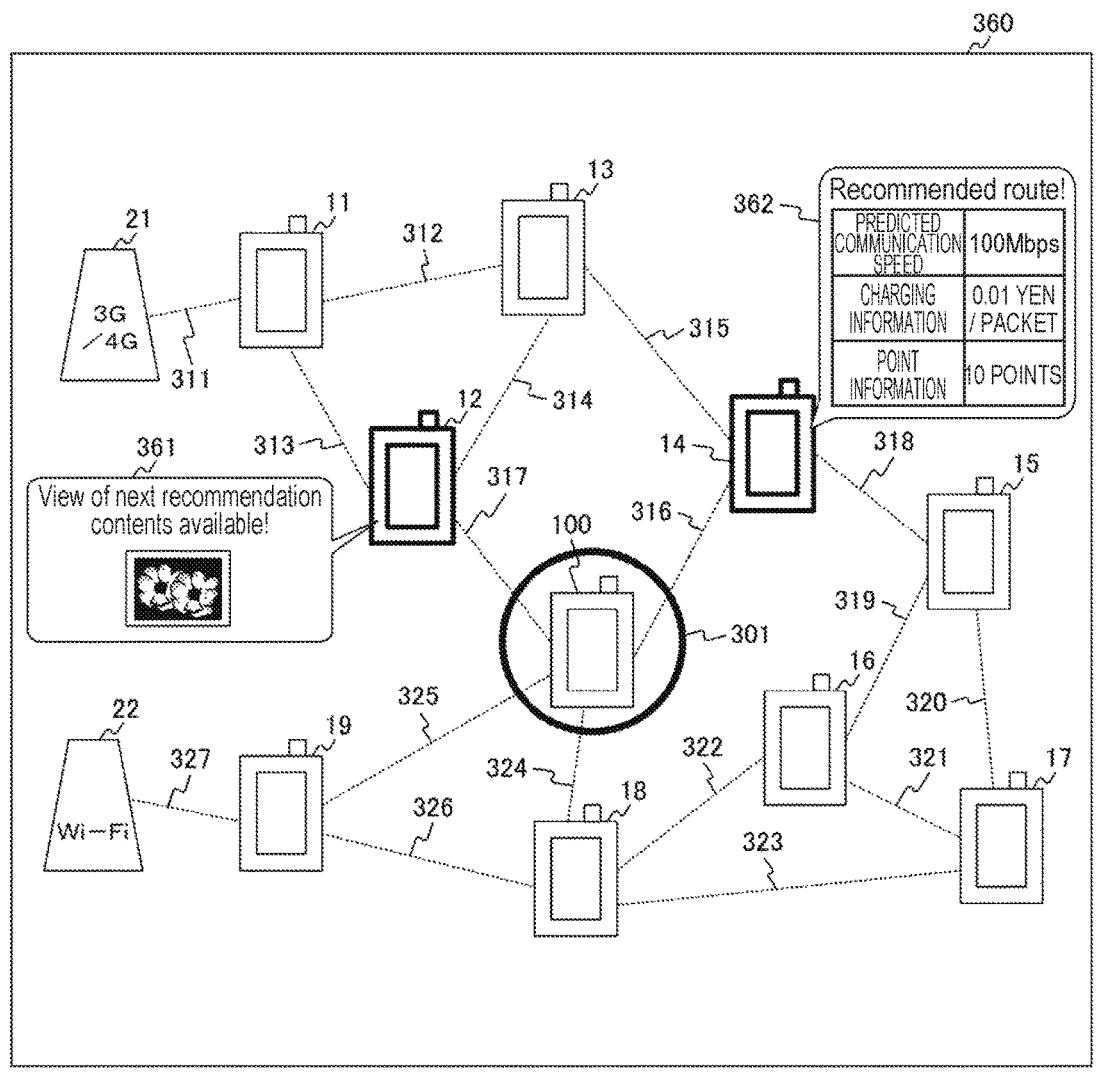
FIG. 15 is a diagram illustrating an example (display screen 360) of a display screen displayed at the input/output unit 170 in a second embodiment of the present technology.

FIG. 15 is a diagram illustrating one example (display screen 360) of a display screen displayed at the input/output unit 170 in the second embodiment of the present technology.

FIG. 15, for facilitation of the description illustrates an example of omitting the arrow 302 of the thick line and adding and displaying the recommendation information 361 of the information processing device 12 and the recommendation information 362 of the information processing device 14 on the display screen 300 illustrated in FIG. 9, for facilitation of the description.

Here, recommendation information is information (information related to an information processing device of a connection destination) determined according to preferences of a user. In other words, the recommendation information is priority information indicating priority related to the information processing device. For example, the recommendation information can be determined on the basis of contents in the setting information management table 230 illustrated in FIG. 6. For example, on the basis of the charging information 231, the point information 232, and the communication speed information 233 in the setting information management table 230, the recommendation information 362 related to connection candidate routes can be determined. In addition, for example, on the basis of the advertisement information 234 and the contents information 235 in the setting information management table 230, the recommendation information 361 related to services can be determined.

In this way, display for notifying a user of a recommended connection candidate route can be performed. In this case, for example, the recommended connection candidate route may be turned to a display form different from the other routes. In addition, for example, information processing devices in contact with the recommended connection candidate route may be turned to a display form different from the other information processing devices.

For example, the recommended connection candidate route or information processing device may be made to flicker, or the connection candidate route or the information processing device may be displayed in a color different from the other ones. Also, for example, the recommended connection candidate route or information processing device may be displayed in a thickness different from the other ones. Note that FIG. 15 illustrates an example of turning the information processing devices 12 and 14 in contact with the recommended connection candidate route to thick lines.

In addition, for example, a user may be notified by voice of the recommended connection candidate route or information processing device. For example, voice of "There are recommended contents in the information processing device 12. The information processing device 14 is in contact with a recommended route." can be outputted. In this way, the recommendation information can be visually or audibly reported to the user.

[Determination Example of Recommendation Information]

Here, an example of determining recommendation information related to a connection candidate route using setting information stored in the information processing device 100 will be described.

For example, the control unit 130 of the information processing device 100 acquires setting information stored in the setting information management table 230 (illustrated in FIG. 6). Subsequently, the control unit 130 extracts a connection candidate route that satisfies the acquired setting information from the other device information management table 200 (illustrated in FIG. 4).

For example, the control unit 130 extracts an information processing device for which a value equal to or smaller than the value of the charging information 231 among the acquired setting information is stored in the charging information 206 in the other device information management table 200. Then, the control unit 130 can extract a route to the extracted information processing device as a recommended route.

In addition, for example, the control unit 130 extracts an information processing device for which a value equal to or smaller than the value of the point information 232 among the acquired setting information is stored in the point information 207 in the other device information management table 200. Then, the control unit 130 can extract a route to the extracted information processing device as a recommended route.

In addition, for example, the control unit 130 extracts an information processing device for which a value equal to or larger than the value of the communication speed information 233 among the acquired setting information is stored in the predicted communication speed 205 in the other device information management table 200. Then, the control unit 130 can extract a route to the extracted information processing device as a recommended route.

In this way, a connection candidate route to an information processing device for which one of charging information, point information and communication speed information satisfies setting information can be extracted as a recommended route. Note that setting information (charging information, point information and communication speed information) used for extracting a recommended route may be selected by a user operation. In addition, a route to an information processing device satisfying all of the plurality of pieces of setting information (charging information, point information and communication speed information) can be extracted as a recommended route of highest priority. Also, a route to an information processing device satisfying the setting information except for one of the plurality of pieces of setting information (charging information, point information and communication speed information) may be set as a recommended route of the next highest priority. In the case that the priority of the recommended route is determined in this way, the priority can be included in the recommendation information and displayed.

Next, an example of determining recommendation information related to services using setting information stored in the information processing device 100 will be described.

As described above, for example, the control unit 130 acquires the setting information stored in the setting information management table 230, and extracts a connection candidate route that satisfies the acquired setting information from the other device information management table 200.

For example, the control unit 130 extracts an information processing device for which information items related to advertisement information stored in the advertisement information 234 among the acquired setting information are stored in the service information 209 in the other device information management table 200. For example, in the case that information related to intellectual properties is stored in the advertisement information 234, the control unit 130 extracts an information processing device for which advertisement information related to intellectual properties is stored in the service information 209 in the other device information management table 200. For example, the information processing device for which advertisement information including keywords (intellectual property, patent, trademark, patent or the like) related to intellectual properties in a title or text is stored in the service information 209 is extracted. Then, the control unit 130 can extract the advertisement information provided by the extracted information processing device as recommended service information.

In addition, for example, the control unit 130 extracts an information processing device for which information items related to contents information stored in the contents information 235 among the acquired setting information are stored in the service information 209 in the other device information management table 200. For example, in the case that information related to automobiles is stored in the contents information 235, the control unit 130 extracts an information processing device for which contents information related to automobiles is stored in the service information 209 in the other device information management table 200. For example, the information processing device for which contents information including keywords (maker names, an automobile model name, and parts name or the like) related to automobiles in a title or text is stored in the service information 209 is extracted. Then, the control unit 130 can extract the contents information provided by the extracted information processing device as recommended service information.

In this way, for example, an information processing device which provides a service (advertisement information or contents information) related to setting information can be extracted. Note that setting information (advertisement information or contents information) used for extraction of recommended service information may be selected by a user operation. Also, similarly to extraction of a recommended route, priority of recommended service information may be determined according to a height of relevancy with setting information.

In addition, in the case of extracting, on the basis of contents information and advertisement information, an information processing device where information related to them is stored, a data amount of contents information and advertisement information may be considered. For example, only an information processing device where contents information and advertisement information whose data amount is smaller than a predetermined value are stored may be extracted.

[Operation Example of Information Processing Device]

Figure 16:
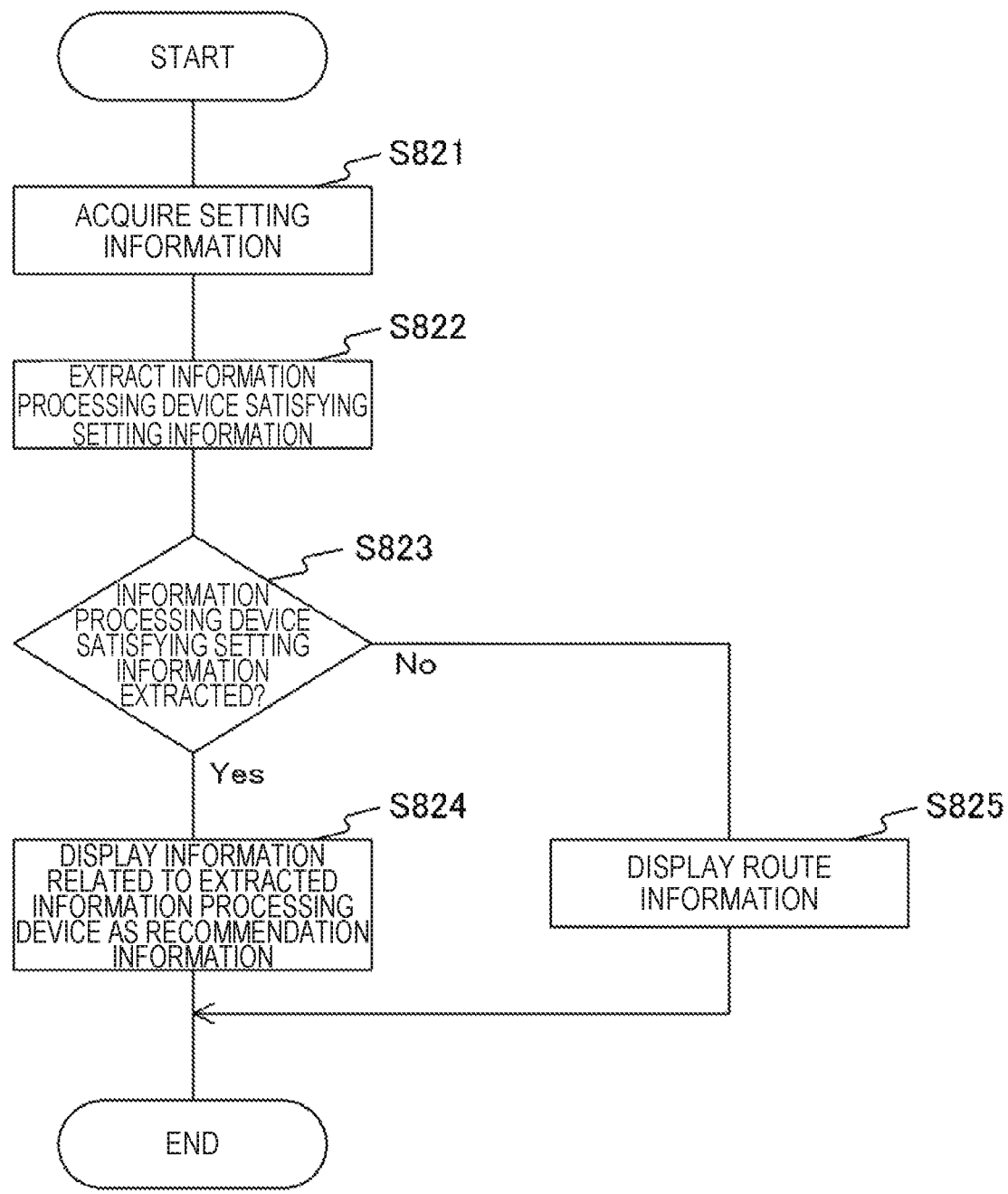
FIG. 16 is a flowchart illustrating an example of a processing procedure of recommendation information display processing by the information processing device 100 in a second embodiment of the present technology.

FIG. 16 is a flowchart illustrating one example of a processing procedure of recommendation information display processing by the information processing device 100 in the second embodiment of the present technology.

First, the control unit 130 acquires setting information stored in the setting information management table 230 (step S821). Subsequently, the control unit 130 extracts an information processing device satisfying the acquired setting information from the other device information management table 200 (step S822).

Then, the control unit 130 determines whether or not the information processing device satisfying the setting information is extracted (step S823). Then, when the information processing device satisfying the setting information is extracted (step S823), the control unit 130 makes the input/output unit 170 display information related to the extracted information processing device as recommendation information (step S824). For example, as illustrated in FIG. 15, pieces of the recommendation information 361 and 362 are displayed.

On the other hand, when the information processing device satisfying the setting information is not extracted (step S823), the control unit 130 makes the input/output unit 170 display route information (step S825).

[Example of Determining Recommendation Information Using Information of External Device]

An example of determining recommendation information using the information (the other device information management table 200 illustrated in FIG. 4) managed by the information processing device 100 is illustrated above. Here, for example, it is conceivable to determine recommendation information using information (various kinds of information about users) managed by an external device connected to a network. The external device is a device for implementing a social networking service (SNS), for example. Then, an example of determining recommendation information using the information of the external device will be described below.

[Configuration Example of Communication System]

Figure 17:
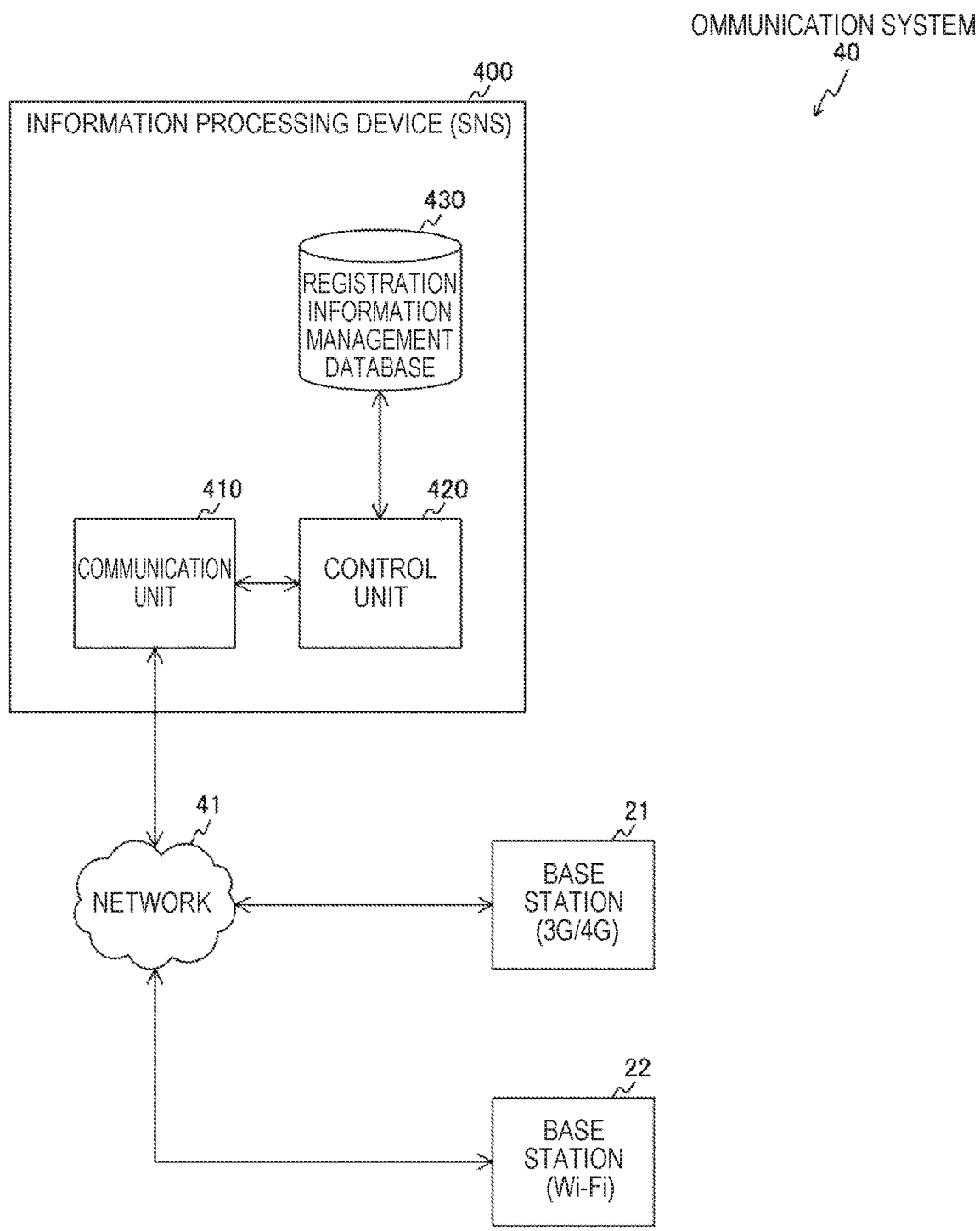
FIG. 17 is a diagram illustrating an exemplary system configuration of a communication system 40 in a second embodiment of the present technology.

FIG. 17 is a diagram illustrating a system configuration example of a communication system 40 in the second embodiment of the present technology.

The communication system 40 includes the base stations 21 and 22, a network 41, and an information processing device (SNS) 400.

The network 41 is a network (for example, a public network) such as a telephone network or the Internet.

The information processing device (SNS) 400 is an information processing device that manages various kinds of information (for example the information items illustrated in FIG. 18) about users of information processing devices (for example, the information processing devices 11 to 19, and 100 illustrated in FIG. 1) connected via the network 41. That is, the SNS is implemented by the information processing device (SNS) 400. Note that, in the second embodiment of the present technology, for facilitation of the description, an example of implementing the SNS by one device (the information processing device (SNS) 400) is illustrated, however, the SNS may be implemented by an information processing system formed of a plurality of devices.

The information processing device (SNS) 400 includes a communication unit 410, a control unit 420, and a registration information management database 430.

The communication unit 410 is connected to the network 41, and exchanges information with information processing devices via the network 41 on the basis of control of the control unit 420. For example, the communication unit 410 accepts a registration information acquisition request from the information processing device 100, and outputs the accepted registration information acquisition request to the control unit 420. Also, the communication unit 410 transmits information outputted from the control unit 420 to the information processing device which has transmitted the registration information acquisition request.

The control unit 420 performs various kinds of processing related to communication performed with information processing devices. For example, the control unit 420 performs authentication processing for the registration information acquisition request from the information processing device 100 and outputs information corresponding to the registration information acquisition request on the basis of the authentication result.

The registration information management database 430 is a database that stores various kinds of information about users who possess information processing devices. Note that the registration information management database 430 will be described in detail with reference to FIG. 18.

[Contents Example of Registration Information Management Database]

Figure 18:
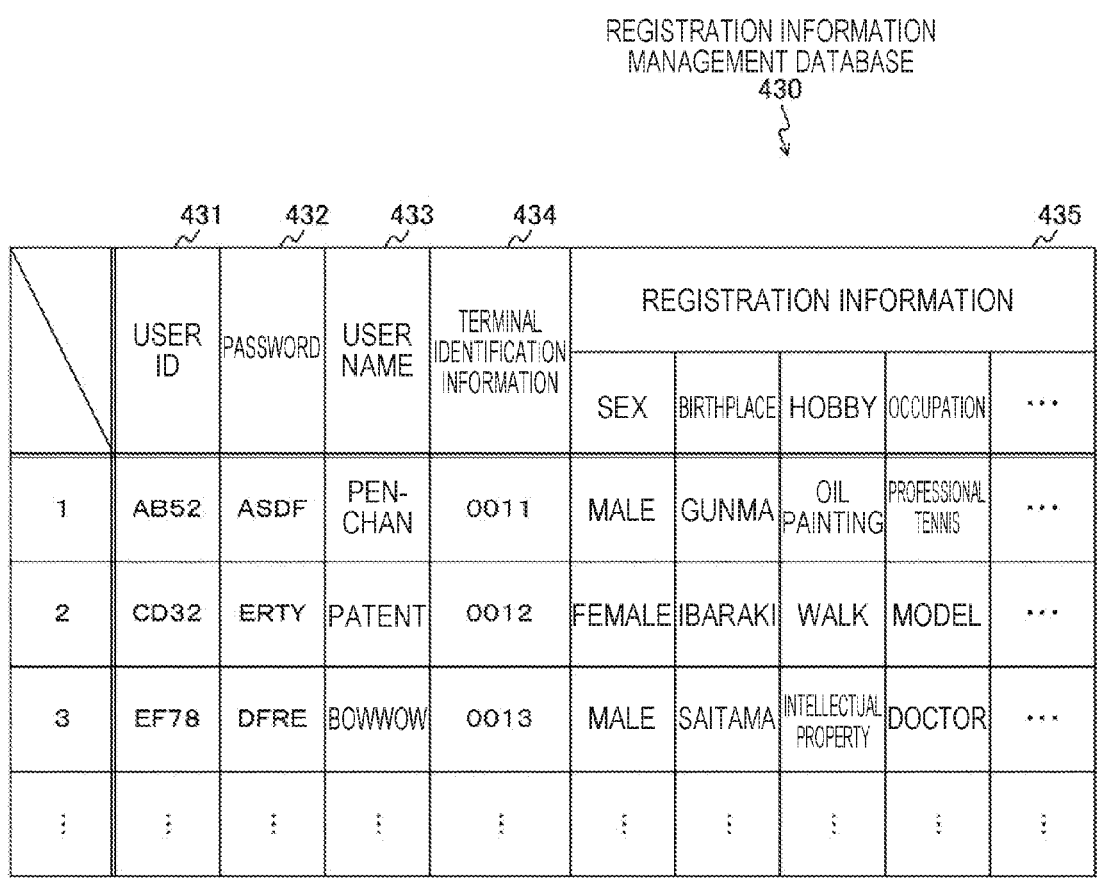
FIG. 18 is a diagram schematically illustrating a registration information management database 430 in a second embodiment of the present technology.

FIG. 18 is a diagram schematically illustrating the registration information management database 430 in the second embodiment of the present technology.

In the registration information management database 430, a user ID 431, a password 432, a user name 433, terminal identification information 434, and registration information 435 are stored in association. These pieces of information are, for example, successively updated by the control unit 420 on the basis of a request (a registration request or a change request) from information processing devices.

In the user ID 431, identification information for identifying each user is stored. Also, in the password 432, a password imparted to each user is stored. In addition, in the user name 433, a name for identifying each user is stored. Also, in the terminal identification information 434, identification information for identifying each information processing device is stored. Note that the terminal identification information 434 corresponds to the terminal identification information 201 illustrated in FIG. 4.

In the registration information 435, various kinds of information about each user are stored. For example, sex, a birthplace, a hobby and an occupation are stored.

In this way, in the registration information management database 430, for example, various kinds of information about the user under a contract for utilizing a membership service with a service provider which manages and operates the information processing device (SNS) 400 are stored as registration information.

[Communication Example]

Figure 19:
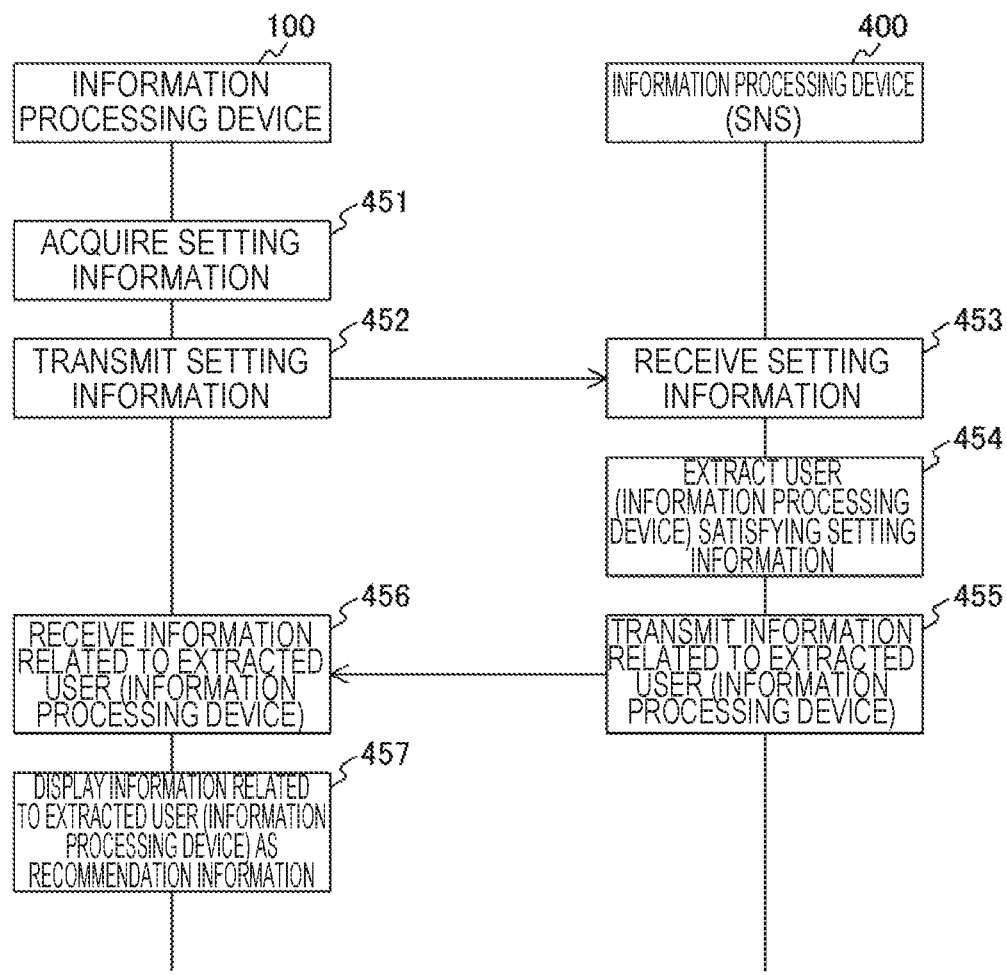
FIG. 19 is a sequence chart illustrating a communication processing example between devices of the communication system 40 in a second embodiment of the present technology.

FIG. 19 is a sequence chart illustrating a communication processing example among devices of the communication system 40 in the second embodiment of the present technology. Note that, FIG. 19 illustrates a communication processing example between the information processing device 100 and the information processing device (SNS) 400. Note that, in FIG. 19, for facilitation of the description, illustrations of the network 41 and the base stations 21 and 22 or the like between the information processing device 100 and the information processing device (SNS) 400 are omitted. In addition, when the information processing device 100 cannot directly communicate with the base station 21 or 22, it is assumed that the information processing device 100 performs communication by being connected to the base station 21 or 22 via one or a plurality of other information processing devices.

First, the control unit 130 of the information processing device 100 acquires setting information stored in the setting information management table 230 (451). Then, the control unit 130 of the information processing device 100 transmits the acquired setting information to the information processing device (SNS) 400 (452, 453).

When the setting information is received (453), the control unit 420 of the information processing device (SNS) 400 extracts a user (or an information processing device) satisfying the received setting information from the registration information management database 430 (454). For example, on the basis of relevancy between the information stored in the advertisement information 234 and the contents information 235 in the setting information management table 230 and the information stored in the registration information management database 430, the user (or the information processing device) satisfying the setting information is extracted.

For example, when "tennis" is stored in the advertisement information 234 or the contents information 235 in the setting information management table 230, a user for whom "professional tennis" is stored for the occupation in the registration information 435 in the registration information management database 430 is extracted. Also, for example, when "intellectual property" is stored in the advertisement information 234 or the contents information 235 in the setting information management table 230, a user for whom "intellectual property" is stored for the hobby in the registration information 435 in the registration information management database 430 is extracted. In addition, for example, when "Gunma" is stored in the advertisement information 234 or the contents information 235 in the setting information management table 230, a user for whom "Gunma" is stored for the birthplace in the registration information 435 in the registration information management database 430 is extracted.

Subsequently, the control unit 420 of the information processing device (SNS) 400 transmits information about the extracted user (or information processing device) to the information processing device 100 (455, 456). Note that the information about the extracted user (or information processing device) is information (for example, the user ID 431 or the terminal identification information 434) capable of specifying the information processing device that the user possesses, for example.

When the information about the extracted user (or information processing device) is received (456), the control unit 130 of the information processing device 100 specifies the information processing device that the user possesses, on the basis of the information about the extracted user (or information processing device). Then, the control unit 130 of the information processing device 100 makes the input/output unit 170 display the information about the specified information processing device as recommendation information (457). For example, the pieces of the recommendation information 361 and 362 are displayed as illustrated in FIG. 15.

In this way, using information (for example, sex, a birthplace, a hobby, and an occupation) that an owner of an information processing device generally discloses in the SNS, a user (information processing device) to be recommended can be searched. That is, a user of type wanted to be an acquaintance can be searched from user information of the SNS and the searched user (information processing device) can be provided for the user as recommendation information. Thus, using information (for example, sex, a birthplace, a hobby, and an occupation) that an owner of an information processing device generally discloses in the SNS, it is possible to be connected in a mesh network. Also, an opportunity of exchange through the SNS can be created with exchange of points and charges as an occasion.

In this way, the control unit 130 can perform control of making the input/output unit 170 display priority information (recommendation information) about route information on the basis of the setting information (the contents of the setting information management table 230) set beforehand. For example, the control unit 130 extracts an information processing device satisfying at least one of the information items included in the setting information (the contents of the setting information management table 230) from a plurality of information processing devices. Then, the control unit 130 makes the input/output unit 170 display the priority information for specifying the extracted information processing device or a route for connecting to the information processing device.

3. Third Embodiment

In the first and second embodiments of the present technology, an example of displaying route information, reference information, service information and recommendation information or the like is illustrated. Here, for example, a user who desires to recognize a group to which a subject device belongs on a network is also assumed.

Therefore, in the third embodiment of the present technology, an example of displaying information processing devices in group units is illustrated. Note that configurations of the information processing devices and the base stations in the third embodiment of the present technology are almost the same as those of the information processing devices 11 to 19 and 100, and the base stations 21 and 22 illustrated in FIG. 1 or the like. Therefore, for parts in common with the first embodiment of the present technology, the same signs as the first embodiment of the present technology are attached and some of the description will be omitted.

[Display Example Based on Group Information]

Figure 20:
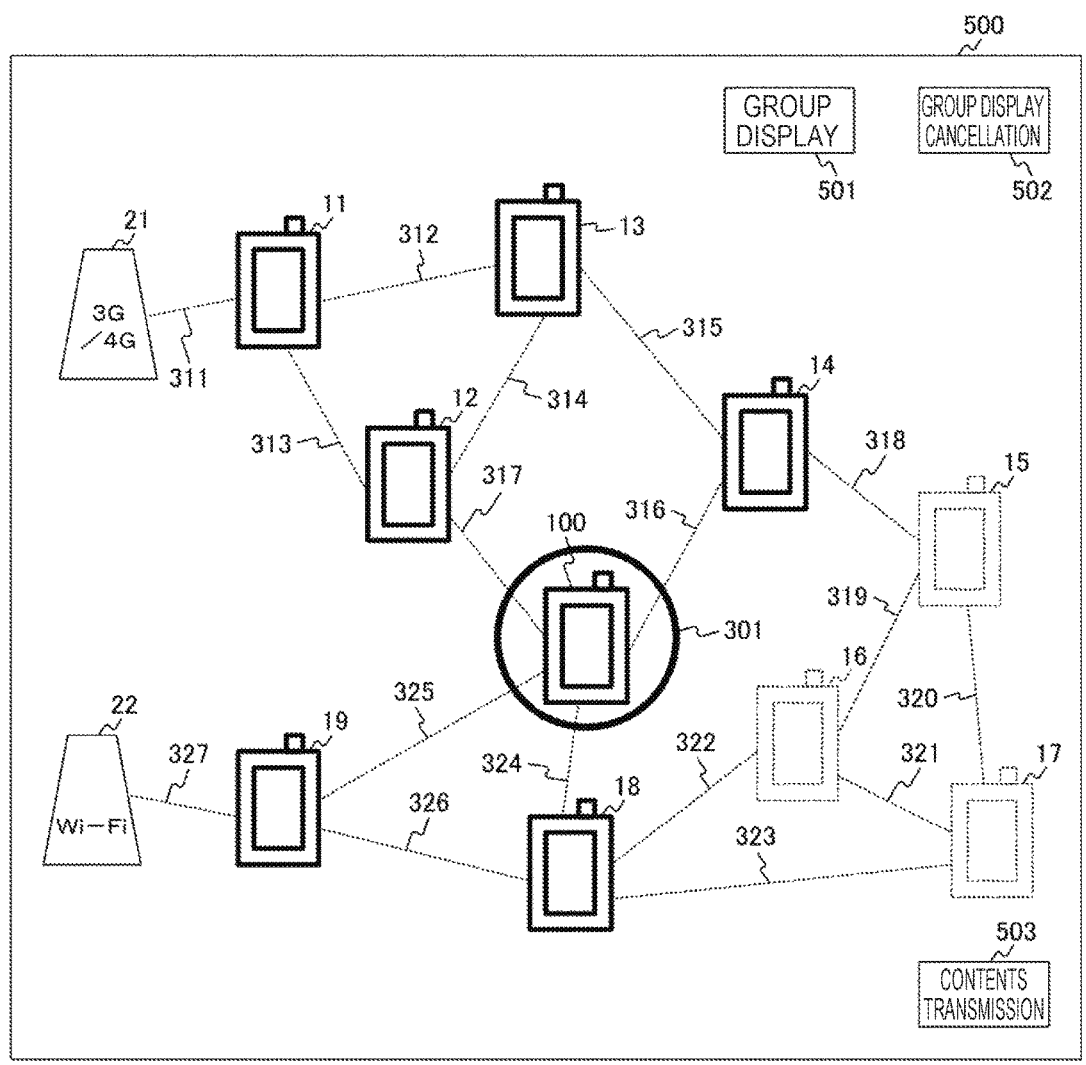
FIG. 20 is a diagram illustrating an example (display screen 500) of a display screen displayed at the input/output unit 170 in a third embodiment of the present technology.

FIG. 20 is a diagram illustrating one example (display screen 500) of a display screen displayed at the input/output unit 170 in the third embodiment of the present technology.

FIG. 20, for facilitation of the description, illustrates an example of adding a group display button 501, a group display cancellation button 502 and a contents transmission button 503 and changing a display form of information processing devices for each group on the display screen 300 illustrated in FIG. 9.

In FIG. 20, information processing devices belonging to a first group (a group to which the information processing device 100 belongs) are the information processing devices 11 to 14, 18, 19 and 100. Also, information processing devices belonging to a second group (a group to which the information processing device 100 does not belong) are the information processing devices 15 to 17.

In this case, the control unit 130 of the information processing device 100 makes marks that express the information processing devices 11 to 14, 18, 19 and 100 belonging to the first group be displayed as thick lines, on the basis of the group information 210 (illustrated in FIG. 4) in the other device information management table 200. In addition, the control unit 130 makes marks that express the information processing devices 15 to 17 belonging to the second group be displayed as dotted lines.

In addition, on the display screen 500, the group display button 501, the group display cancellation button 502, and the contents transmission button 503 are displayed.

The group display button 501 is a button to be pressed in the case of performing display in group units. For example, in the case that the group display button 501 is pressed, as illustrated in FIG. 20, the information processing devices are displayed in group units.

The group display cancellation button 502 is a button to be pressed in the case of canceling display in group units. For example, as illustrated in FIG. 20, in the case that the information processing devices are displayed in group units, when the group display cancellation button 502 is pressed, the display of the information processing devices in group units is canceled. That is, a normal display state is attained.

The contents transmission button 503 is a button to be pressed in the case of transmitting contents information held in the information processing device 100. Note that transmission of contents information using the contents transmission button 503 will be described in detail with reference to FIG. 22 and FIG. 23.

Note that FIG. 20 illustrates an example of turning the marks that express the information processing devices belonging to the first group to the thick lines and turning the marks that express the information processing devices belonging to the second group to the dotted lines, however, they may be displayed in other display forms. For example, it is preferable to display information processing devices so as to visually identify them in group units. For example, the information processing devices can be displayed so as to be surrounded by a thick line in group units. Also, only the information processing devices belonging to the group to which the information processing device 100 belongs may be displayed and the information processing devices belonging to the other group may be eliminated. In addition, a group to be a display object may be selected by a user operation.

[Operation Example of Information Processing Device]

Figure 21:
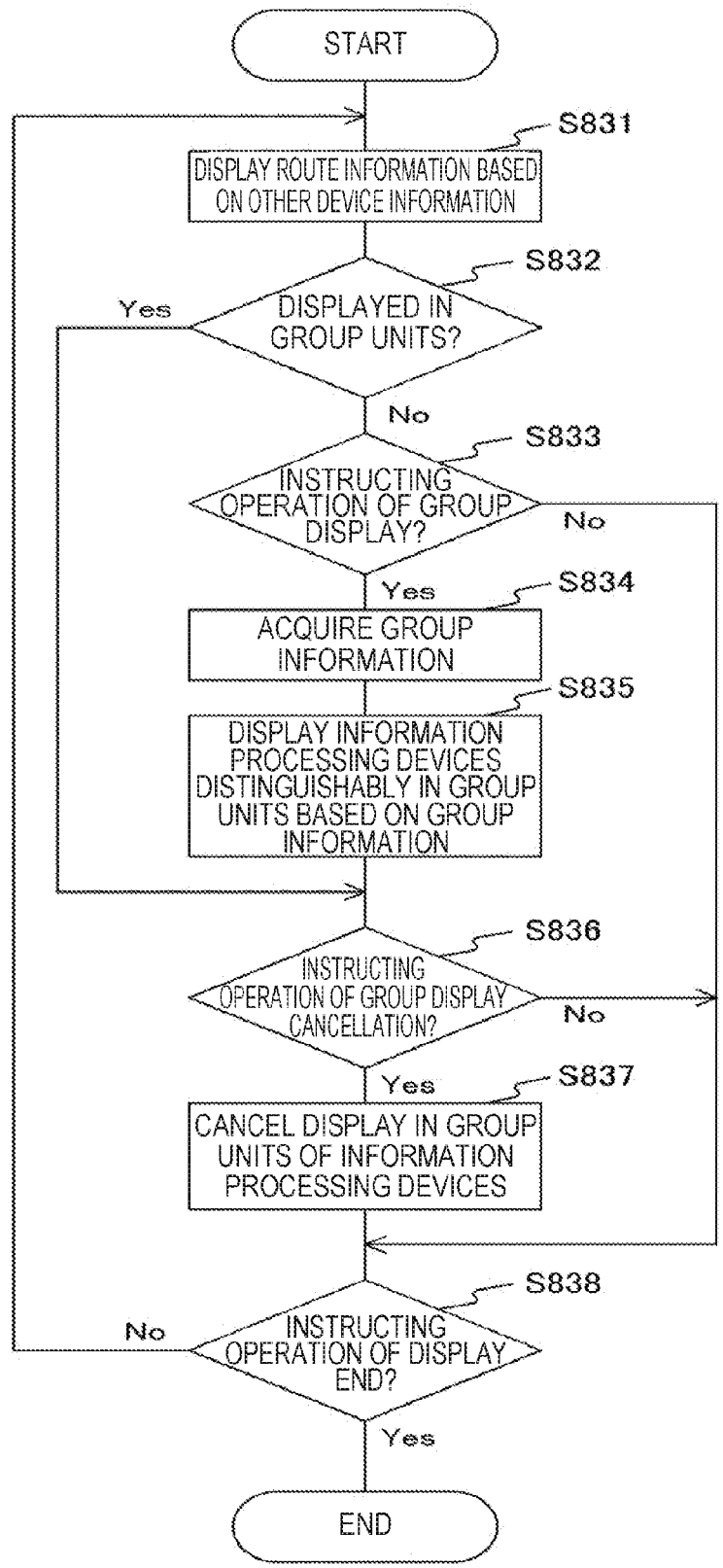
FIG. 21 is a flowchart illustrating an example of a processing procedure of group unit display processing by the information processing device 100 in a third embodiment of the present technology.

FIG. 21 is a flowchart illustrating one example of a processing procedure of group unit display processing by the information processing device 100 in the third embodiment of the present technology.

First, the control unit 130 makes the input/output unit 170 display route information (for example, a display screen including devices, connection routes and connection candidate routes) on the basis of the information items stored in the other device information management table 200 (step S831). For example, as illustrated in FIG. 9, the display screen 300 including devices, connection routes and connection candidate routes is displayed.

Subsequently, the control unit 130 determines whether or not it is during display in group units (step S832). Then, when it is during display in group units (step S832), processing advances to step S836. Also, when it is not during display in group units (step S832), the control unit 130 determines whether or not a group display instructing operation is performed (step S833). For example, whether or not a pressing operation of the group display button 501 illustrated in FIG. 20 is performed is determined (step S833).

When the group display instructing operation is performed (step S833), the control unit 130 acquires group information stored in the group information 210 (illustrated in FIG. 4) in the other device information management table 200 (step S834). Next, the control unit 130 changes a display form of the information processing devices to a display form in group units on the basis of the acquired group information, and performs display (step S835).

Subsequently, the control unit 130 determines whether or not a group display cancellation instructing operation is performed (step S836). For example, whether or not a pressing operation of the group display cancellation button 502 illustrated in FIG. 20 is performed is determined (step S836).

When the group display cancellation instructing operation is performed (step S836), the control unit 130 cancels display in group units of the information processing devices (step S837).

Next, the control unit 130 determines whether or not an instructing operation of ending display of route information is performed (step S838). Then, when the instructing operation is performed (step S838), an operation of the group unit display processing is ended. On the other hand, when the instructing operation is not performed (step S838), the processing returns to step S831.

In this way, the control unit 130 can perform control of making the input/output unit 170 display each of a plurality of information processing devices so as to identify them in group units.

[Contents Transmission Example in Group Units]

Figure 22:
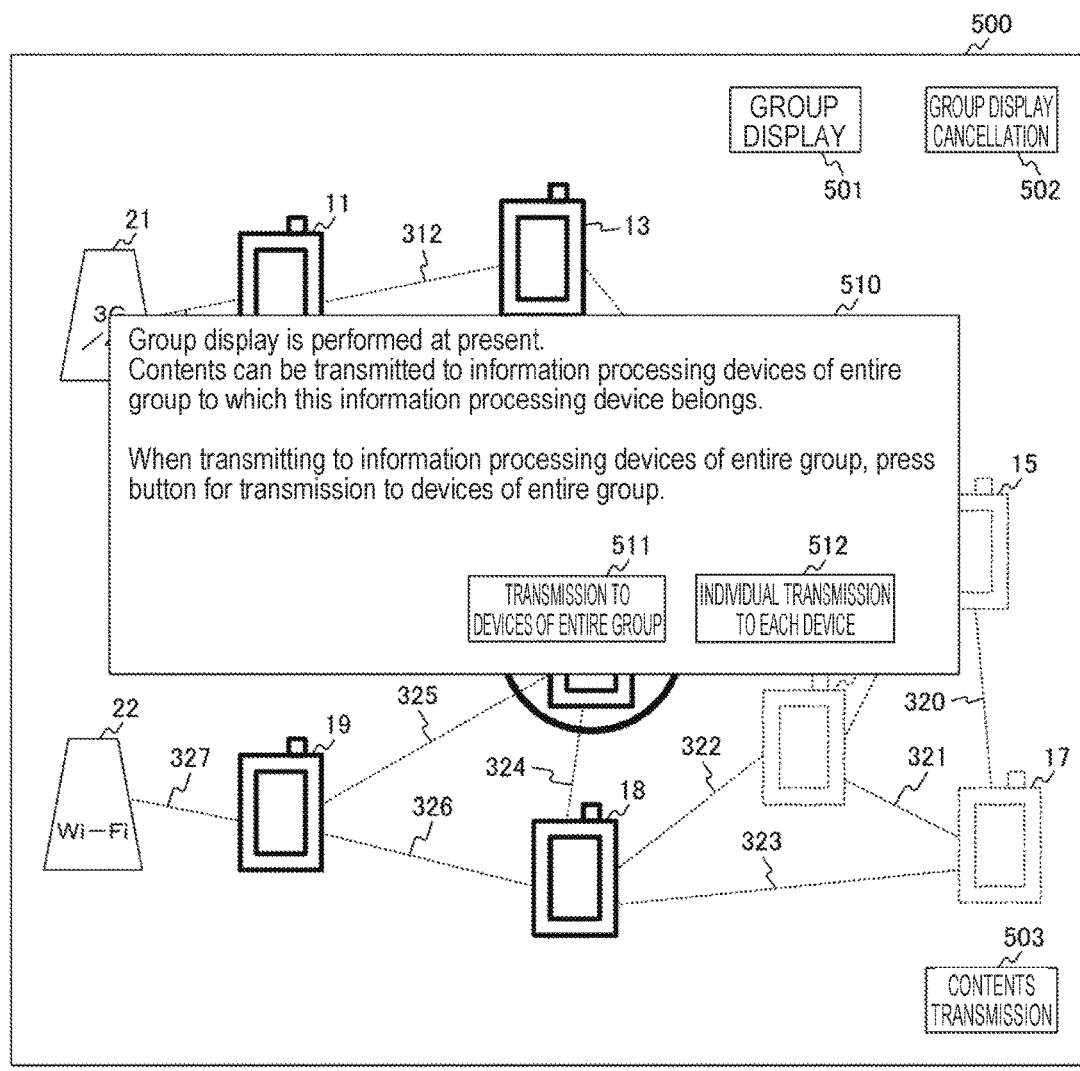
FIG. 22 is a diagram illustrating an example (contents transmission operation screen 510) of a display screen displayed at the input/output unit 170 in a third embodiment of the present technology.

FIG. 22 is a diagram illustrating one example (contents transmission operation screen 510) of a display screen displayed at the input/output unit 170 in the third embodiment of the present technology.

FIG. 22, for facilitation of the description, illustrates an example of adding and displaying the contents transmission operation screen 510 on the display screen 500 illustrated in FIG. 20. The contents transmission operation screen 510 is displayed after a pressing operation of the contents transmission button 503, for example.

The contents transmission operation screen 510 is provided with a button 511 for transmission to devices of the entire group and a button 512 for individual transmission to each device.

The button 511 for transmission to devices of the entire group is a button to be pressed when transmitting contents stored in the memory 140 to all of the other information processing devices belonging to the group to which the information processing device 100 belongs. Note that, when a plurality of contents are stored in the memory 140, the contents selected by a user are defined as a transmission object. For example, when a plurality of contents are stored in the memory 140, before displaying the contents transmission operation screen 510, a contents selection screen for selecting the contents to be the transmission object is displayed. Then, the contents selected by a user on the contents selection screen are defined as the transmission object.

Here, it is also assumed that the information processing device 100 is not connected to all the information processing devices of the group to which the subject device belongs. In this way, for the information processing device not connected to the information processing device 100 among the information processing devices belonging to the same group, contents may not be transmitted. That is, contents may be transmitted only to the information processing devices connected to the information processing device 100 among the information processing devices belonging to the same group. Or, contents transmission processing may be performed after performing connection processing with the information processing device 100 for all the information processing devices belonging to the same group.

The button 512 for individual transmission to each device is a button to be pressed when individually transmitting contents stored in the memory 140. In this way, in the case of individually transmitting contents, a user selects an information processing device of a transmission destination.

[Operation Example of Information Processing Device]

Figure 23:
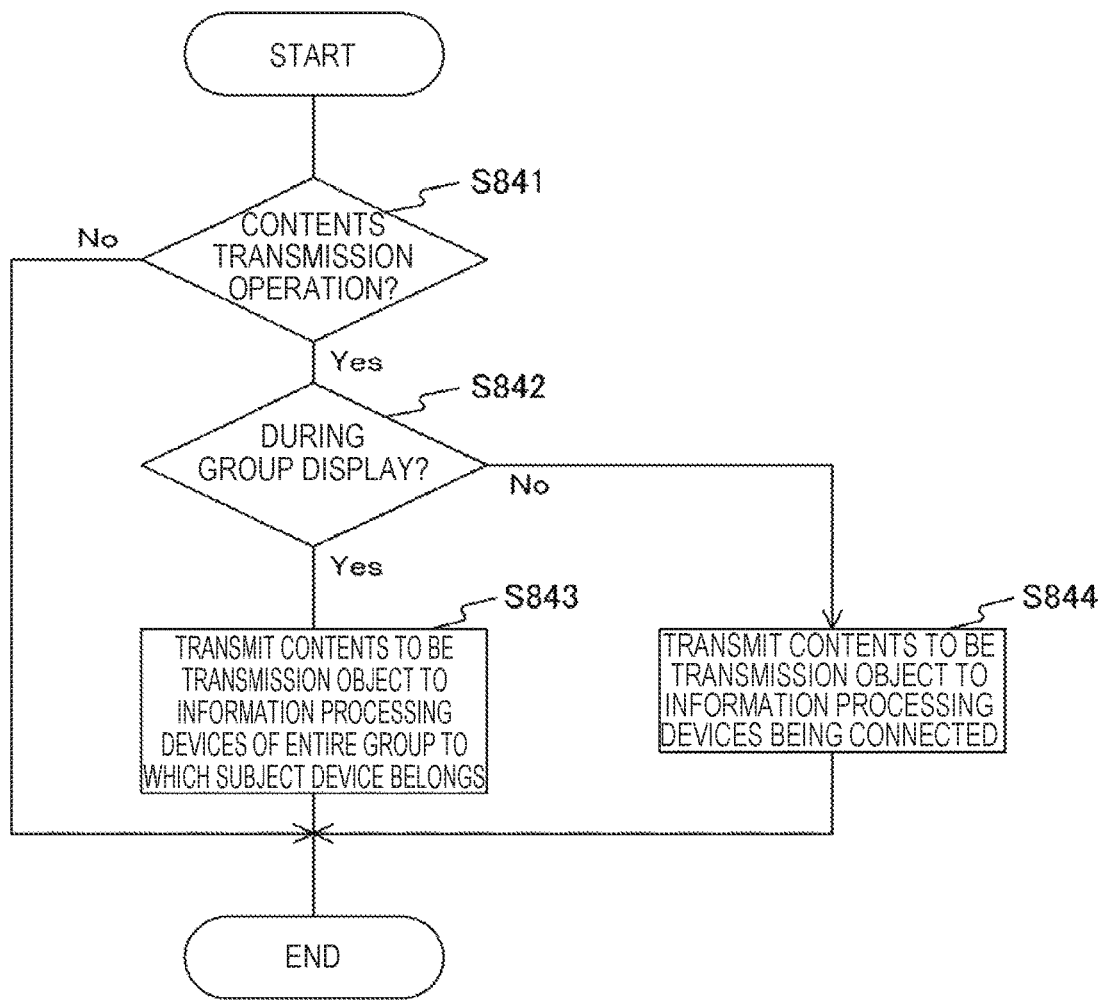
FIG. 23 is a flowchart illustrating an example of a processing procedure of contents transmission processing by the information processing device 100 in a third embodiment of the present technology.

FIG. 23 is a flowchart illustrating one example of a processing procedure of contents transmission processing by the information processing device 100 in the third embodiment of the present technology.

First, the control unit 130 determines whether or not a contents transmission operation is performed (step S841). For example, whether or not a pressing operation of the contents transmission button 503 illustrated in FIG. 22 is performed is determined (step S841). Then, when the contents transmission operation is not performed (step S841), an operation of contents transmission processing is ended.

Also, when the contents transmission operation is performed (step S841), the control unit 130 determines whether or not it is during group display (step S842). Then, when it is during group display (step S842), the control unit 130 transmits contents to be a transmission object to the information processing devices of the entire group to which the information processing device 100 belongs (step S843). Note that, as illustrated in FIG. 22, the contents transmission operation screen 510 may be displayed and whether or not to transmit contents to the information processing devices of entire group may be confirmed by a user.

In addition, when it is not during group display (step S842), the control unit 130 transmits the contents to be the transmission object to the information processing devices connected to the information processing device 100 (step S844).

Here, when it is not during group display, other than the information processing devices connected to the information processing device 100, the information processing device to be a transmission destination can be selected by a user operation. For example, after a selecting operation of the contents to be the transmission object, a predetermined operation (for example, a touch operation or a click operation to the mark that expresses the information processing device) for selecting the information processing device to be the transmission destination is performed. By the predetermined operation, desired contents can be transmitted to a desired information processing device.

In addition, contents can be transmitted to the other entire group other than the group to which the information processing device 100 belongs. For example, when group display is performed, a predetermined operation (for example, a touch operation or a click operation for selecting a group or an input operation of a group name) for selecting a group to be a transmission destination of the contents is performed. By the predetermined operation, desired contents can be transmitted to the information processing devices of the entire desired group.

Note that, in the third embodiment of the present technology, an example of transmitting contents as an operation to information processing devices belonging to a desired group is illustrated. However, also in the case of providing other services, it can be similarly performed. For example, advertisement information can be transmitted as an operation to the information processing devices belonging to the desired group.

That is, when a selecting operation of selecting the other information processing device to be a service provision destination is accepted, the control unit 130 can perform control for providing the selected other information processing device with the service. In addition, when a selecting operation of selecting a group to be a service provision destination is accepted, the control unit 130 can perform control for providing the information processing devices belonging to the selected group with the service.

Also, as an operation to the information processing devices belonging to the desired group, other operations may be performed. For example, the information processing devices belonging to the desired group can be made to perform a moving image display operation of displaying the same moving image.

Also, for example, it is also assumed that the information processing devices belonging to the desired group include an imaging unit. Then, for example, the information processing devices belonging to the desired group can be made to perform an imaging operation (shutter operation) at the same timing (or almost same timing). In this case, for example, the control unit 130 of the information processing device 100 can transmit control information for making a shutter operation be performed to the information processing devices belonging to the desired group and make them perform the imaging operation (shutter operation).

That is, when a selecting operation of selecting the other information processing device to be made to execute a predetermined operation is accepted, the control unit 130 can perform control for making the selected other information processing device execute the predetermined operation.

4. Fourth Embodiment

In the first embodiment of the present technology, an example of displaying route information, reference information, service information or the like is illustrated. Here, for example, it is also assumed that a user desires negotiation (for example, negotiation of a connection condition), for contents displayed in the reference information.

Then, in the fourth embodiment of the present technology, an example of negotiating a connection condition is illustrated. Note that, configurations of the information processing devices and the base stations in the fourth embodiment of the present technology are almost the same as those of the information processing devices 11 to 19 and 100, and the base stations 21 and 22 illustrated in FIG. 1 or the like. Therefore, for parts in common with the first embodiment of the present technology, the same signs as the first embodiment of the present technology are attached and some of the description will be omitted.

[Display Example when Negotiating Connection Condition]

Figure 24:
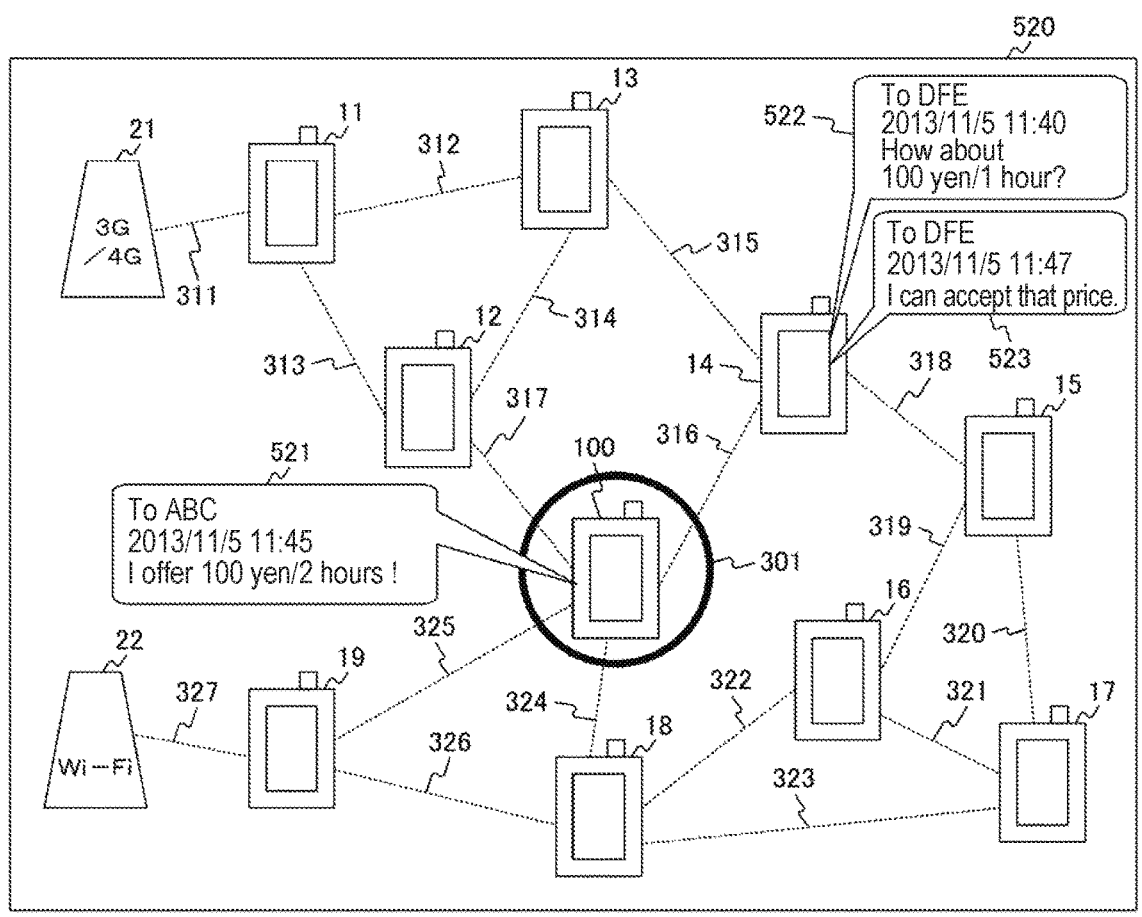
FIG. 24 is a diagram illustrating an example (display screen 520) of a display screen displayed at the input/output unit 170 in a fourth embodiment of the present technology.

FIG. 24 is a diagram illustrating one example (display screen 520) of a display screen displayed at the input/output unit 170 in the fourth embodiment of the present technology.

FIG. 24, for facilitation of the description, illustrates an example of omitting the arrow 302 of the thick line and adding and displaying pieces of conversation information 521 to 523 on the display screen 300 illustrated in FIG. 9.

The pieces of conversation information 521 to 523 are marks that express characters corresponding to negotiation information (or negotiation response information responding to it) exchanged between the information processing device 100 and the information processing device 14. For example, a display form like a general conversation can be attained by attaching a balloon to the mark including characters.

As described above, for route information, it is preferable to update information items in real time. Then, using a predetermined application (for example, an application for performing real time communication such as chat (for example, text data)), a connection condition can be negotiated with the information processing device of the connection destination for which the connection is requested.

For example, as illustrated in FIG. 24, a proposal (conversation information 522) of a connection condition (charging information) for continuously performing connection can be transmitted to the information processing device 100 from the connection destination (the information processing device 14) of the information processing device 100 which has requested the connection. In response to it, the information processing device 100 can transmit a response (conversation information 521) to the proposal (conversation information 522) to the information processing device 14. Further, the information processing device 14 can transmit a response (conversation information 523) to the response (conversation information 521) to the information processing device 100.

These exchanges can be performed from any information processing device. Also, these exchanges can be repeatedly performed.

[Communication Example]

Figure 25:
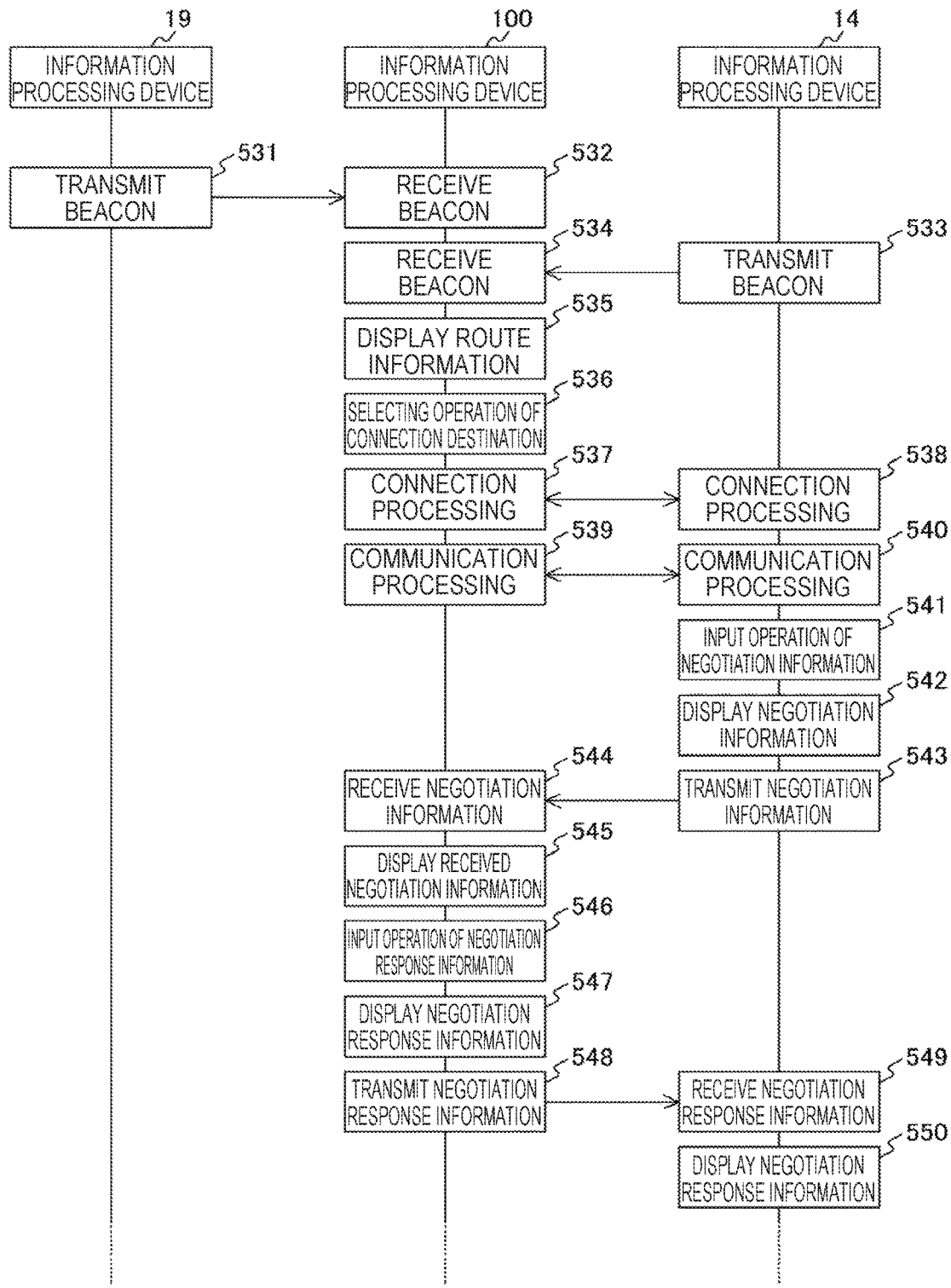
FIG. 25 is a sequence chart illustrating a communication processing example between devices of the communication system 10 in a fourth embodiment of the present technology.

FIG. 25 is a sequence chart illustrating a communication processing example among devices of the communication system 10 in the fourth embodiment of the present technology. Note that FIG. 25 illustrates a communication processing example among the information processing devices 100, 14, and 19.

First, the information processing device 19 transmits a beacon to nearby information processing devices (including the information processing device 100) (531, 532). Then, the information processing device 100 receives the beacon (532).

In addition, the information processing device 14 transmits a beacon to nearby information processing devices (including the information processing device 100) (533, 534). Then, the information processing device 100 receives the beacon (534). In this way, in the case of receiving the beacon, the control unit 130 of the information processing device 100 updates the contents of the other device information management table 200 on the basis of the subject device information and the other device information included in the received beacon.

Subsequently, the control unit 130 of the information processing device 100 makes the input/output unit 170 display route information on the basis of the latest contents of the other device information management table 200 (535). Next, a selecting operation of the information processing device of the connection destination by a user is performed (536). Here, an example that the information processing device 14 is selected as a connection destination is illustrated.

Next, connection processing is performed between the information processing device 14 selected by the selecting operation and the information processing device 100 (537, 538). When the connection processing is completed, communication processing exchanging various kinds of information is performed (539, 540).

Subsequently, an input operation of negotiation information by a user is performed in the information processing device 14 (541). For example, characters that newly propose charging information are inputted (541). Next, the information processing device 14 makes the input/output unit display the negotiation information inputted by the user (542). For example, the conversation information 522 illustrated in FIG. 24 is displayed. Then, the information processing device 14 transmits the negotiation information inputted by the user to the information processing device 100 (543, 544).

When the negotiation information from the information processing device 14 is received (544), the control unit 130 of the information processing device 100 makes the input/output unit 170 display the received negotiation information (545). Then, an input operation of negotiation response information by a user in order to respond to the negotiation information displayed at the input/output unit 170 is performed (546). For example, characters that respond to a new proposal of charging information are inputted (546). Subsequently, the control unit 130 of the information processing device 100 makes the input/output unit 170 display the negotiation response information inputted by a user (547). For example, the conversation information 521 illustrated in FIG. 24 is displayed. Then, the control unit 130 of the information processing device 100 transmits the negotiation response information inputted by a user to the information processing device 14 (548, 549).

When the negotiation response information from the information processing device 100 is received (549), the information processing device 14 makes the input/output unit display the received negotiation response information (550). In addition, since the exchange hereinafter is almost similar to the above-described processes (541 to 550), illustrations and the description will be omitted.

Note that, in this example, an example that connection processing is performed after a selecting operation of a connection destination is performed and negotiation information and negotiation response information are exchanged between the information processing devices which become communicable is illustrated. However, for example, an application capable of exchanging information in a conversation form may be automatically activated by the selecting operation of the connection destination. For example, a user performs a predetermined operation (for example, a touch operation or a click operation) for selecting a connection candidate route to the information processing device of the connection destination and a predetermined operation (for example, a touch operation or a click operation) for selecting the information processing device of the connection destination. When the predetermined operation is performed, in the information processing device 100, the application capable of exchanging information in a conversation form is activated, and conversations in a form of making a balloon with the information processing device of the connection destination becomes possible.

5. Fifth Embodiment

In the first embodiment of the present technology, an example of selecting a connection destination in an information processing device where route information, reference information and service information or the like are displayed and connecting to the connection destination is illustrated. Here, it is assumed that there is also a user who does not want to connect to the information processing device for which the connection destination is selected, among users of the information processing devices selected as the connection destination.

Then, in the fifth embodiment of the present technology, an example of confirming whether or not to permit the connection in an information processing device selected as a connection destination is illustrated. Note that, configurations of the information processing devices and the base stations in the fifth embodiment of the present technology are almost the same as those of the information processing devices 11 to 19 and 100, and the base stations 21 and 22 illustrated in FIG. 1 or the like. Therefore, for parts in common with the first embodiment of the present technology, the same signs as the first embodiment of the present technology are attached and some of the description will be omitted.

[Display Example of Notice Screen]

Figure 26:
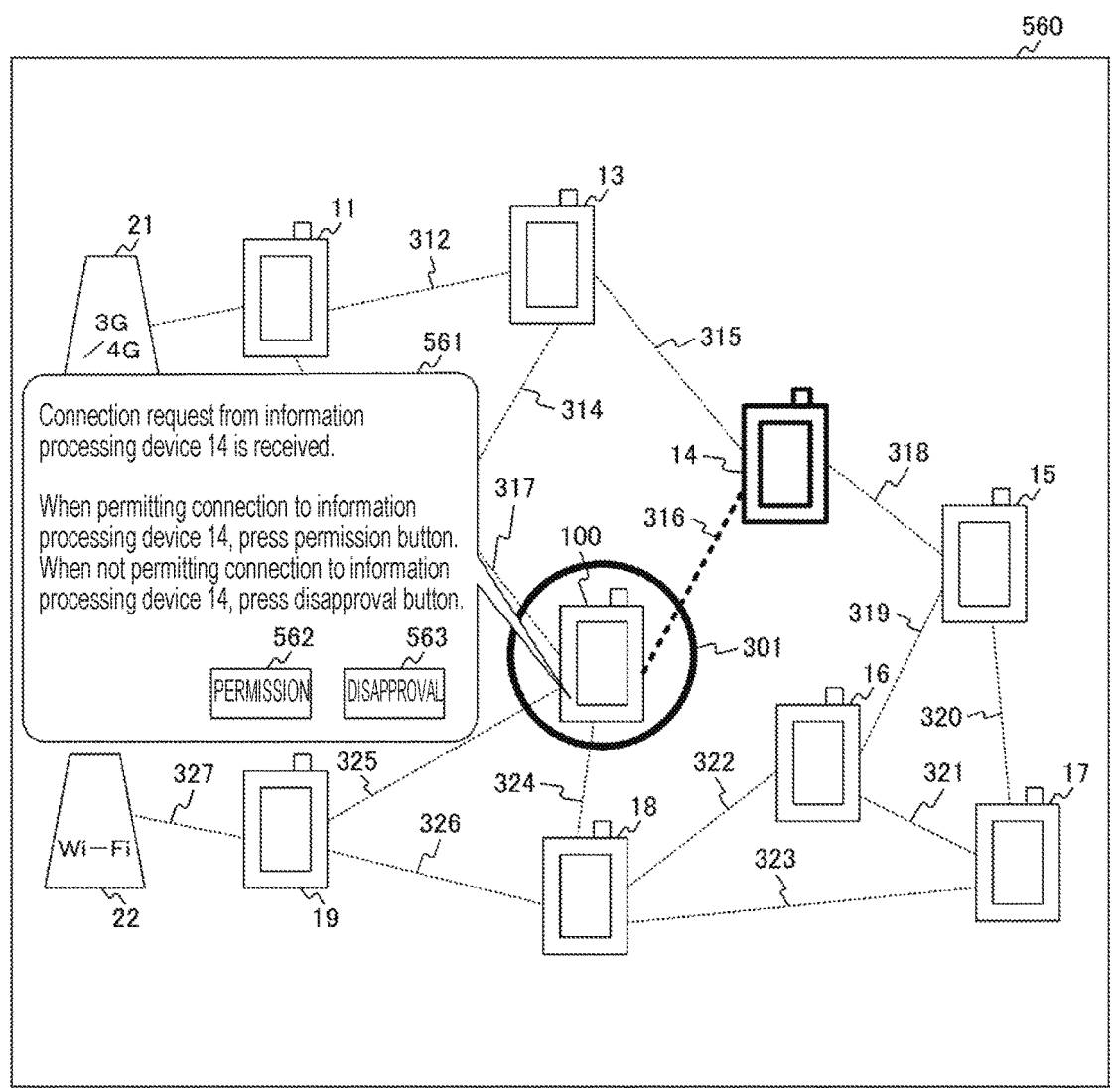
FIG. 26 is a diagram illustrating an example (display screen 560) of a display screen displayed at the input/output unit 170 in a fifth embodiment of the present technology.

FIG. 26 is a diagram illustrating one example (display screen 560) of a display screen displayed at the input/output unit 170 in the fifth embodiment of the present technology.

FIG. 26, for facilitation of the description, illustrates an example of omitting the arrow 302 of the thick line and adding and displaying a notice screen 561 on the display screen 300 illustrated in FIG. 9. The notice screen 561 is displayed when a connection request from the other information processing device is received, for example. FIG. 26 illustrates a display example of the notice screen 561 displayed when the connection request from the information processing device 14 is received. Also, in the case of displaying the notice screen 561 in this way, it is preferable to turn the information processing device which has transmitted the connection request and a route from the information processing device to the information processing device 100 to display forms that can be easily recognized by a user. For example, the mark that expresses the information processing device 14 and a dotted line 316 indicating a route between the information processing device 100 and the information processing device 14 can be displayed by thick lines.

On the notice screen 561, a permission button 562 and a disapproval button 563 are provided.

The permission button 562 is a button to be pressed in the case of permitting a connection to the other information processing device which has transmitted a connection request.

The disapproval button 563 is a button to be pressed in the case of disapproving a connection to the other information processing device which has transmitted a connection request.

In this way, in the fifth embodiment of the present technology, when the information processing device 100 is selected as a connection destination, a user of the information processing device 100 can recognize the selection on the notice screen 561. Then, the user can select the permission or disapproval of the connection using the notice screen 561. As a result, the connection processing is performed when permitted by the user. On the other hand, when disapproved by the user as the confirmation result, the connection processing is not performed. In this way, when a connection request is disapproved by the user, the information processing device which has transmitted the connection request that is disapproved may be notified that the connection request is disapproved. For example, a message of "Connection cannot be made since it is disapproved in an information processing device selected as a connection destination." can be outputted (for example, displayed or voice-outputted).

That is, when a connection request from the other information processing device displayed as route information is received, the control unit 130 of the information processing device 100 makes the input/output unit 170 display notice information (for example, the notice screen 561) for notifying that the connection request is received. Then, the control unit 130 controls wireless communication with the other information processing devices on the basis of operation input related to whether or not to permit the connection for the connection request. Note that, in FIG. 26, an example of displaying the notice information (for example, the notice screen 561) is illustrated, however, the notice information may be outputted by other output methods. For example, voice corresponding to a message displayed on the notice screen 561 may be outputted. In this case, voice is outputted also for an operation method (for example, pressing of a specific operation member) corresponding to pressing of the permission button 562 and the disapproval button 563.

[Communication Example]

Figure 27:
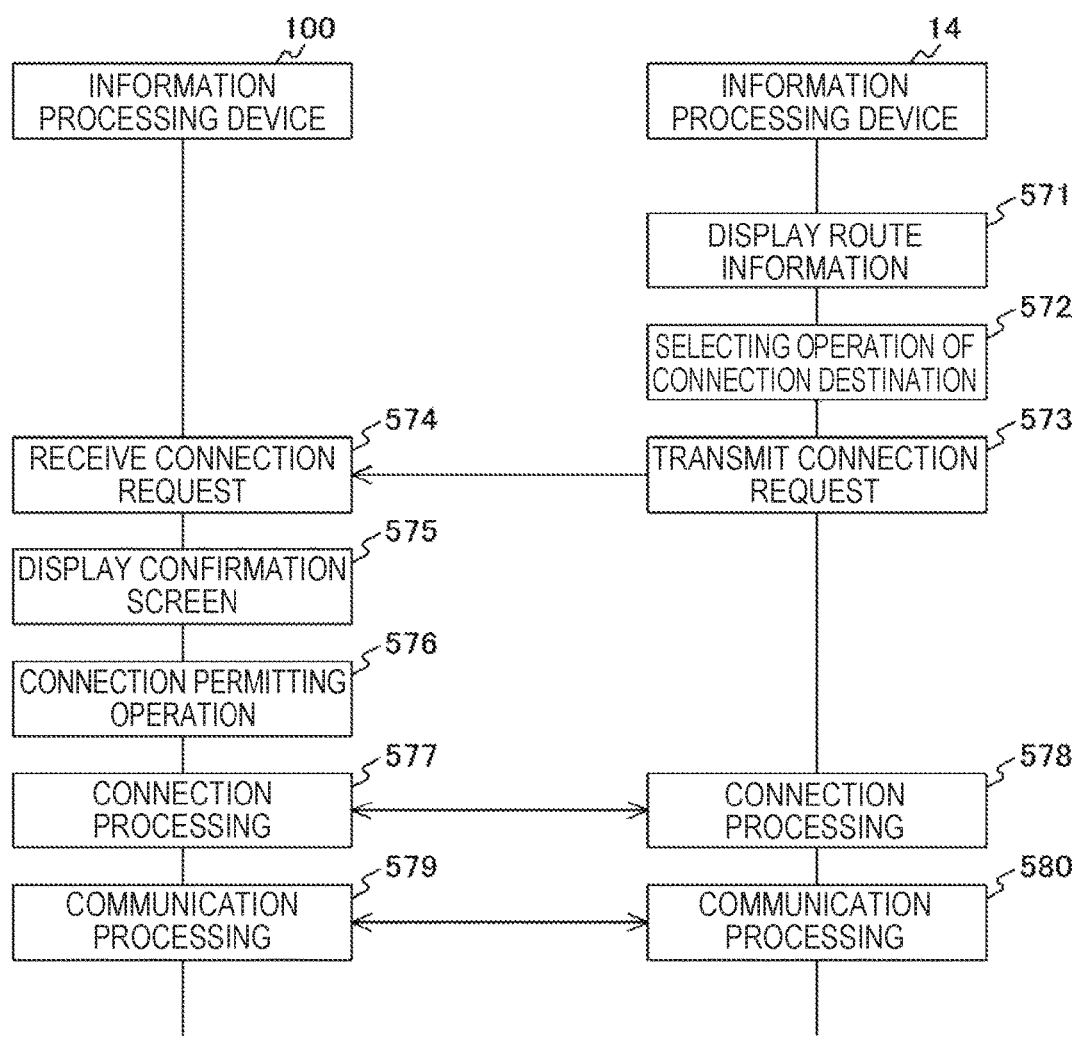
FIG. 27 is a sequence chart illustrating a communication processing example between devices of the communication system 10 in a fifth embodiment of the present technology.

FIG. 27 is a sequence chart illustrating a communication processing example among devices of the communication system 10 in the fifth embodiment of the present technology. Note that FIG. 27 illustrates a communication processing example between the information processing devices 100 and 14. Also, FIG. 27 illustrates an example of confirming the connection request from the information processing device 14 in the information processing device 100.

First, the control unit of the information processing device 14 makes the input/output unit display route information on the basis of the latest contents of the other device information management table (571). Subsequently, a selecting operation of an information processing device of a connection destination by a user is performed (572). FIG. 27 illustrates an example when the information processing device 100 is selected as a connection destination.

Next, the control unit of the information processing device 14 transmits a connection request to the information processing device 100 selected by the selecting operation (573, 574).

When the connection request from the information processing device 14 is received (574), the control unit 130 of the information processing device 100 makes the input/output unit 170 display a notice screen for notifying of the reception of the connection request and confirming whether or not to permit the connection (575). For example, as illustrated in FIG. 26, the notice screen 561 is displayed.

Subsequently, on the notice screen, a user operation (a permitting operation or a disapproving operation) is performed (576). For example, the user operation is performed by a pressing operation of the permission button 562 or the disapproval button 563 illustrated in FIG. 26. FIG. 27 illustrates an example when the permitting operation is performed as the user operation. When the permitting operation is performed (576), connection processing is performed between the information processing device 14 and the information processing device 100 (577, 578). When the connection processing is completed, communication processing of exchanging various kinds of information is performed (579, 580).

In this way, on condition that the permitting operation by the user is performed in the information processing device which has received the connection request, the connection according to the connection request is established. Thus, the connection according to the connection request can be established after the confirmation by the users of the information processing devices of the transmission source and the transmission destination of the connection request. Note that, in the fifth embodiment of the present technology, an example of coping with the connection request from the information processing device 14 capable of direct communication is illustrated, however, it is similarly applicable even in the case of coping with the connection request from the other information processing device capable of communication via a relay node.

In this way, according to the embodiment of the present technology, for a user interface (UI) for a mesh network, a UI full of variations can be provided. This UI is, for example, a UI capable of visualizing a connection structure of a mesh network. For example, when a user performs mesh network connection, the connection operation can be easily performed. Also, for example, when performing a contents distribution service or the like by a mesh network in a mobile device such as a smartphone, an optimum UI which is easy to use for a user can be provided.

That is, a user can easily switch a connection route or distribute contents or the like while visually confirming a connection relation. For example, just by an easy operation (for example, a touch operation) by a user on a display surface of the input/output unit 170, the connection route can be switched and the contents can be distributed or the like.

For example, when using an information processing device within a space were many people are present (for example, use in a school classroom) or when using an information processing device outdoors during mountain climbing or the like, the embodiment of the present technology is applicable.

Note that, in the embodiment of the present technology, an example of accepting displaying information items at the input/output unit 170 provided in the information processing device 100 and accepting operation input is illustrated. However, an external device (for example, a display device or an electronic device including a display unit) other than the information processing device 100 may be made to display the information on the basis of the control of the control unit 130 of the information processing device 100. In this case, operation input is accepted in the external device, and the control unit 130 acquires control signals according to the operation input from the external device, and performs each control.

Also, in the embodiment of the present technology, an example of displaying information items (route information, reference information, service information, recommendation information) as planar images (2D (2-dimensional) images) is illustrated, however, the information items may be displayed as stereoscopic images (3D (3-dimensional) images). For example, the information processing device 100 is provided with an input/output unit capable of displaying stereoscopic images. Then, the information items are displayed as the stereoscopic images at the input/output unit. Note that, an external device may be made to display the information items as stereoscopic images. In addition, the information items may be displayed as stereoscopic images using a 3D projector. Also, when displaying the information items as stereoscopic images in this way, it may be possible to perform operation input on the stereoscopic images.

In addition, in the embodiment of the present technology, an example of performing each control on the basis of operation input (for example, a contacting operation or an approaching operation) at the input/output unit is illustrated, however, for example, a gesture may be determined as operation input and each control may be performed on the basis of the gesture. For example, a gesture of moving a finger (for example, a pointing finger or a middle finger) of a user roughly in parallel to a display surface at the input/output unit or a gesture of moving it roughly vertically to the display surface may be determined and each control may be performed on the basis of the gesture. In this way, when determining the gesture, for example, the information processing device 100 is provided with an imaging unit (not shown in the figure) that images a subject and generates image data. The imaging unit is, for example, formed of an optical system (a plurality of lenses) and an imaging device. Then, the control unit 130 of the information processing device 100 can determine each gesture by performing image recognition processing for the image data generated by the imaging unit. For a determination method of the gesture, a known determination method (for example, see JP-2011-85966A) can be used. In addition, as described above, when displaying the information items as stereoscopic images, operation input may be performed on stereoscopic images. In this case, for example, a gesture of a user in stereoscopic images may be determined and the operation input of the user on the stereoscopic images may be detected.

Note that, in the embodiment of the present technology, an example of displaying connection relations of all information processing devices configuring a mesh network is illustrated, however, for example, only the connection relations of some information processing devices configuring the mesh network may be displayed. For example, an information processing device to be a display object may be set by a user operation. For example, the number of hops from the subject device may be set by a user operation, and only the information processing devices up to the set number of hops may be displayed. That is, zoom adjustment (for example, enlarging/reducing processing with the subject device at a center) is automatically performed so as to display only the information processing devices up to the set number of hops. Also, for example, a switching operation of the number of hops may be made possible also for the information processing devices during display and the zoom adjustment may be performed after the switching operation. Thus, for example, even when a display in use is small (for example, in the case of a small-sized information processing device (for example, a smartphone)), the display at the display can be made easy to see. Also, since the information processing devices with a large number of hops are not displayed, privacy is taken into consideration for the display. In addition, in the case of displaying the information processing devices with a large number of hops, it is assumed that the time until the display of all becomes relatively long. In contrast, by displaying only the information processing devices up to the set number of hops, the time to display all the information processing devices to be the display object can be shortened.

In addition, for example, an upper limit number of information processing devices to be a display object may be set and the information processing devices up to the predetermined number of hops may be displayed within the range. For example, the case that 10 is set as the upper limit number and there are five information processing devices of 1 hop is assumed. In this case, the five information processing devices of 1 hop are displayed and five or fewer information processing devices that are two hops ahead are displayed. Note that, when the number of the information processing devices that are two hops ahead is six or larger, five information processing devices satisfying a predetermined condition (for example, an order from the shortest distance or an order from the highest communication speed) can be selected and displayed.

Also, for example, a communication method (for example, a wireless LAN, a 3G system, or 4G system) for connecting to a network such as a public network may be displayed for each kind. For example, near each device (a base station or an access point) for connecting to a network such as a public network, information items in the case of being connected can be displayed. The display example is illustrated in FIG. 28.

[Display Example of Reference Information]

Figure 28:
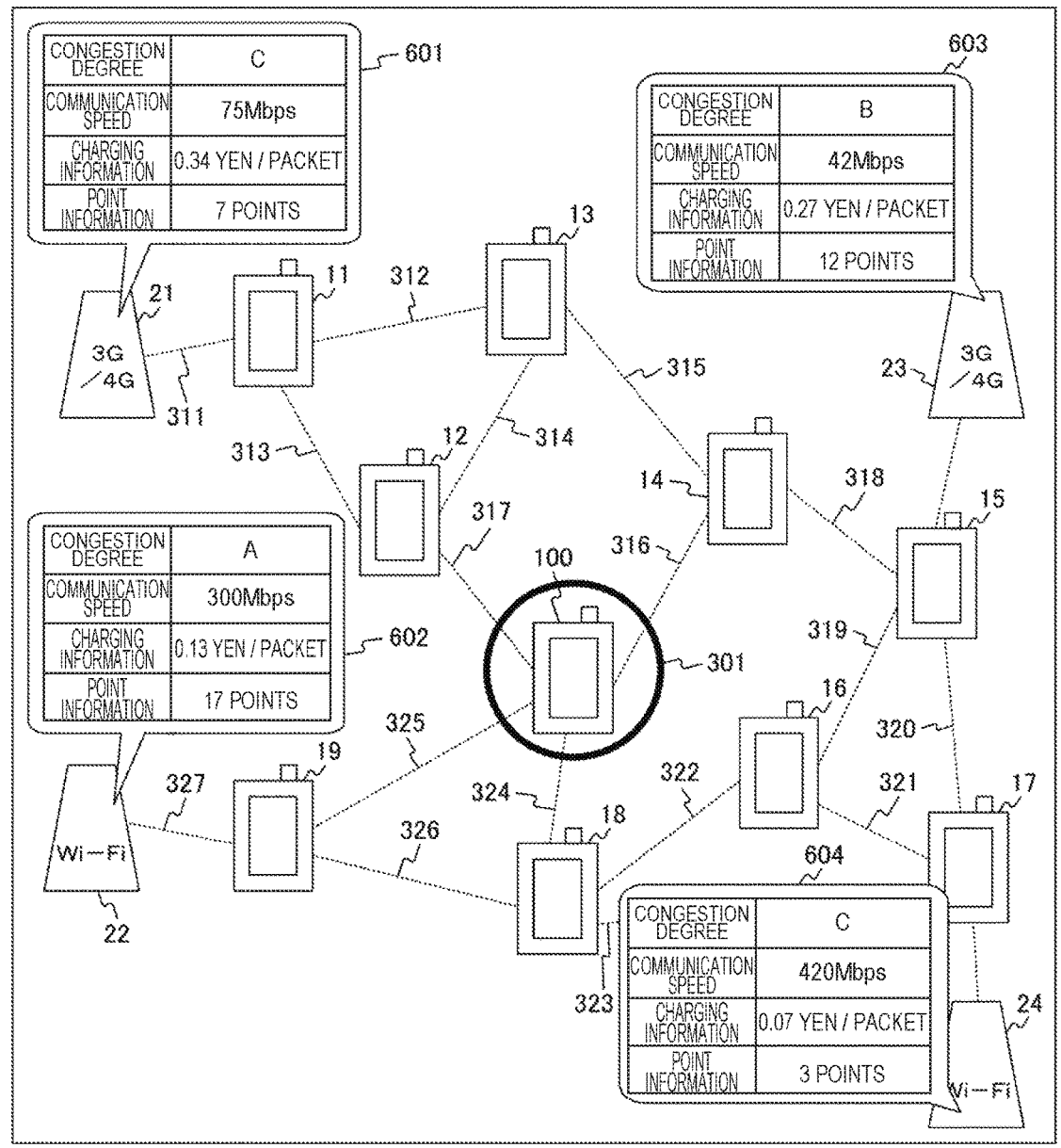
FIG. 28 is a diagram illustrating an example (display screen 600) of a display screen displayed at the input/output unit 170 in an embodiment of the present technology.

FIG. 28 is a diagram illustrating one example (display screen 600) of a display screen displayed at an input/output unit 170 in the embodiment of the present technology.

The display screen 600 is a modification of the display screen 300 illustrated in FIG. 9, and is different from the display screen 300 at a point that a base station 23 and a base station 24 are added and a point of displaying pieces of reference information 601 to 604 related to the base stations 21 to 22.

The base station 23 is a base station (information processing device) capable of performing a cellular phone service of at least one of the 3G system and the 4G system. Also, the base station 24 is a base station or an access point (information processing device) capable of performing communication utilizing the wireless LAN.

The pieces of the reference information 601 to 604 are information that a user refers to when connecting the information processing device 100 to a network such as a public network. That is, the pieces of the reference information 601 to 604 are information that a user refers to when selecting a network such as a public network as a connection destination of the information processing device 100.

FIG. 28 illustrates an example of displaying a congestion degree, a communication speed, charging information and point information related to the base station 21 when the information processing device 100 is connected to a network such as a public network via the base station 21 as the reference information 601. Relations between the base stations 22 to 24 and the pieces of the reference information 602 to 604 are similar.

Here, the congestion degree is a congestion degree (for example, a using rate of a wireless channel) of an information processing device connected to the base station, for example. As the congestion degree, for example, a value calculated on the basis of a relation between the number of information processing devices connectable to one base station and the number of actually connected information processing devices can be used. Also, as the congestion degree, for example, a value calculated on the basis of a relation between a total amount of wireless resources that one base station can use and an amount of actually used wireless resources can be used.

Note that, in FIG. 28, for facilitation of the description, A to C are illustrated as the congestion degree. For example, A means that a degree of congestion is low (that is, free), and C means that the degree of congestion is high (that is, crowded). Also, B means that the degree of congestion is between A and C.

In addition, information displayed at the pieces of the reference information 601 to 604 is transmitted periodically or non-periodically from the base stations 21 to 24, for example. Also, the information processing device 100 may hold these pieces of information in the other device information management table 200 (illustrated in FIG. 4) and display them.

When connecting the information processing device 100 to a network such as a public network, a user refers to the pieces of the reference information 601 to 604 and performs operation input of selecting a desired base station. For example, by performing a touch operation of touching a mark that expresses the desired base station, the information processing device 100 can be connected to a network such as a public network via the desired base station.

Also, the case that the information processing device 100 is capable of wireless communication by a plurality of communication systems (for example, the wireless LAN and the 3G system) is assumed. In this case, the information processing device 100 can be connected to a network such as a public network via a plurality of base stations (for example, the base stations 21 and 22). For example, a user refers to the pieces of the reference information 601 to 604, and performs a selecting operation of selecting the plurality of desired base stations simultaneously or successively. Thus, for example, a desired information processing device (for example, a contents provision sever) can be connected through a plurality of communication routes. For example, since a network such as a public network can be connected via a plurality of base stations, even in the case of downloading a large capacity of contents, downloading can be quickly performed using the plurality of communication routes.

In addition, when contents that should be displayed as the pieces of the reference information 601 to 604 are changed, that change and the contents after the change may be successively displayed. Also, when the contents that should be displayed as the pieces of the reference information 601 to 604 are changed, the information processing device 100 may detect a connection destination on a better condition than that of the present connection destination on the basis of the contents, and may automatically change the connection destination.

6. Application Example

The technology according to the disclosure can be applied to various products. For example, the information processing devices 11 to 19, and 100 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the information processing devices 11 to 19, and 100 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the information processing devices 11 to 19, and 100 may be wireless communication modules mounted in such terminals (for example, integrated circuit modules configured by one die).

6-1. First Application Example

Figure 29:
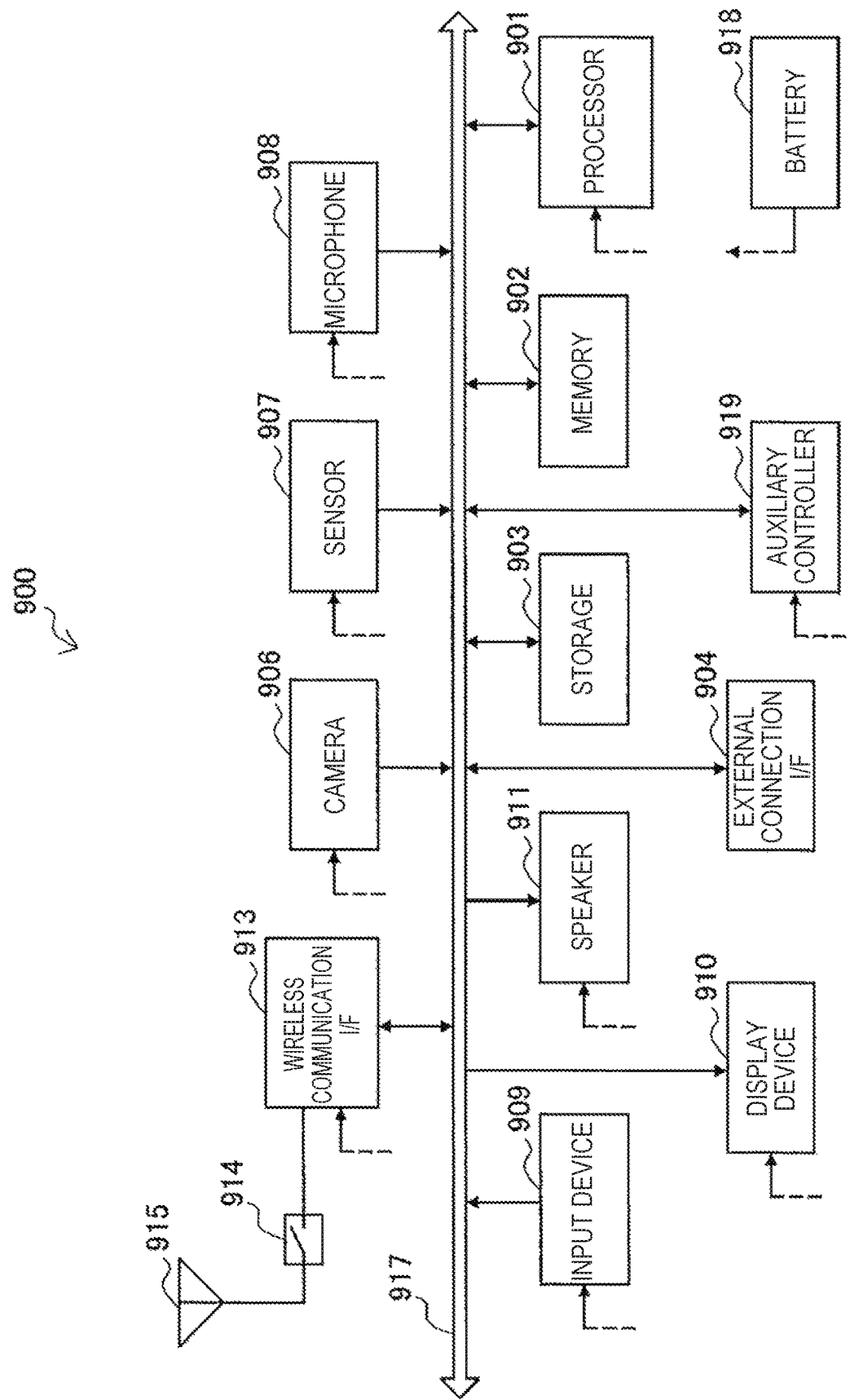
FIG. 29 is a block diagram showing an example of a schematic configuration of a smartphone.

FIG. 29 is a block diagram showing an example of a schematic configuration of a smartphone 900 to which an embodiment of the technology of the present disclosure can be applied. The smartphone 900 includes a processor 901, a memory 902, a storage 903, an externally connected interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in an ad hoc mode. The wireless communication interface 913 can typically include a base-band processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 29. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 29 via power supply lines partially indicated by dashed lines in the drawing. The auxiliary controller 919 causes, for example, minimum necessary functions of the smartphone 900 to be operated in a sleep mode.

Also, in the smartphone 900 illustrated in FIG. 29, the control unit 130, which are described by using FIG. 2, may be implemented in the wireless communication interface 913. Also, at least a part of these functions may be implemented in the processor 901 or the auxiliary controller 919.

Note that, when the processor 901 executes an access point function at an application level, the smartphone 900 may be operated as a wireless access point (a software AP). In addition, the wireless communication interface 913 may include a wireless access point function.

6-2. Second Application Example

Figure 30:
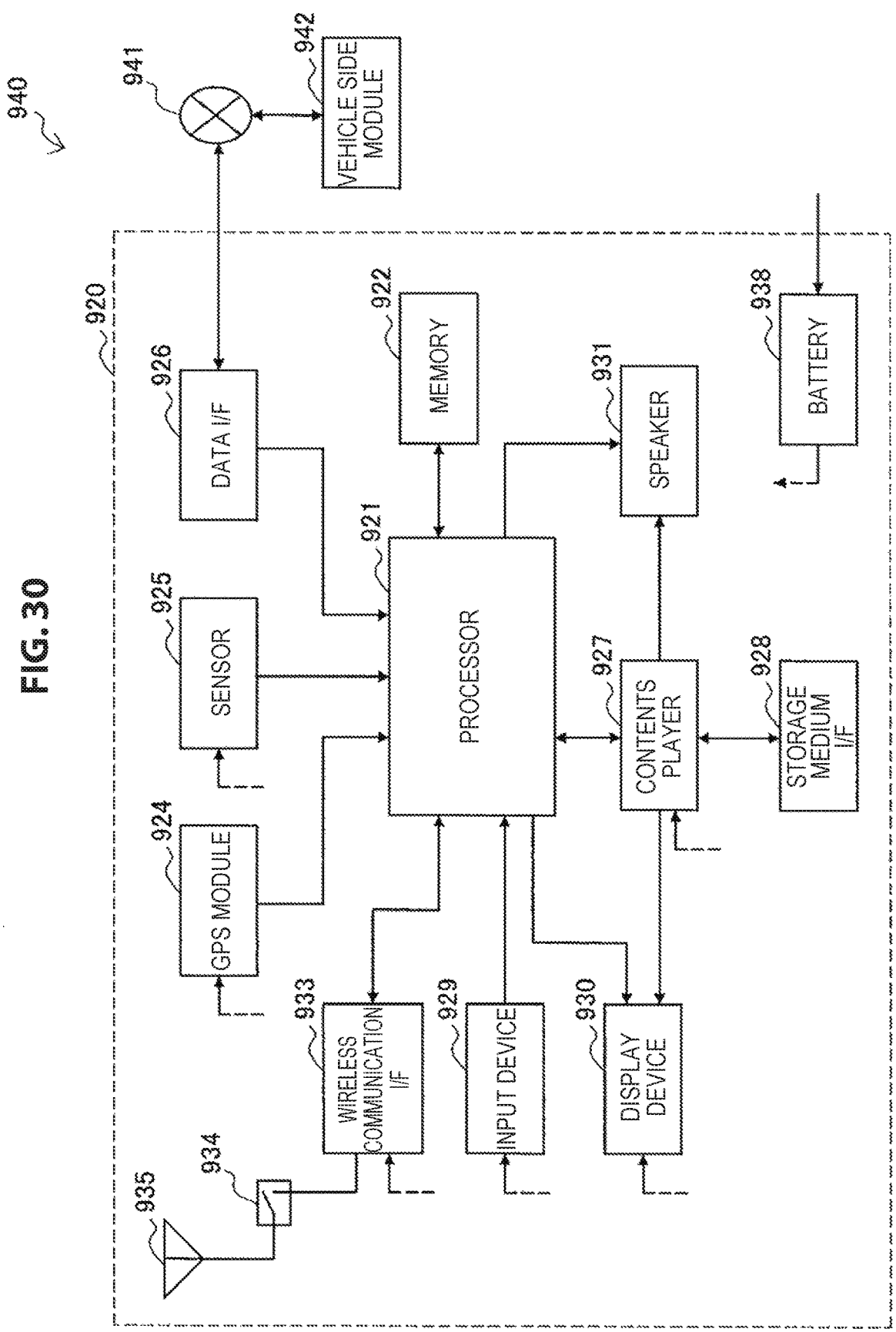
FIG. 30 is a block diagram showing an example of a schematic configuration of a car navigation device.

FIG. 30 is a block diagram showing an example of a schematic configuration of a car navigation device 920 to which an embodiment of the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not shown to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in an ad hoc mode. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 30. In this case, the antenna switch 934 may be omitted from the configuration of the car navigation device 920.

The battery 938 supplies electric power to each of the blocks of the car navigation device 920 shown in FIG. 30 via power supply lines partially indicated by dashed lines in the drawing. In addition, the battery 938 accumulates electric power supplied from the vehicle.

In the car navigation device 920 illustrated in FIG. 30, the control unit 130, which are described by using FIG. 2, may be implemented in the wireless communication interface 933. Also, at least a part of these functions may be implemented in the processor 921.

An embodiment of the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

The above-described embodiments are examples for embodying the present technology, and matters in the embodiments each have a corresponding relationship with subject matter in the claims. Likewise, the matters in the embodiments and the subject matter in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a sequence of sequences or may be handled as a program for causing a computer to execute the sequence of sequences and recording medium storing the program. As the recording medium, a CD (Compact Disc), an MD (MiniDisc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1) An information processing device including:
a control unit that makes a display unit display, as route information, relations between a plurality of information processing devices and routes related to wireless communication in a network in which the plurality of information processing devices are interconnected by the plurality of information processing devices performing the wireless communication in a one-to-one manner, and controls the wireless communication in the network on the basis of operation input related to the route information.

(2) The information processing device according to (1),
wherein the control unit performs control of making the display unit display, as the route information, at least one of connection route information indicating a connection route when the information processing device is connected to another information processing device by utilizing the wireless communication and connection candidate route information indicating a route through which the information processing device is capable of being connected to the other information processing device by utilizing the wireless communication.

(3) The information processing device according to (2),
wherein, when the operation input of selecting a route in the connection candidate route information displayed at the display unit is performed, the control unit performs control for connecting the information processing device and the other information processing device via the selected route.

(4) The information processing device according to (1) or (2),
wherein, when the operation input of selecting the other information processing device displayed at the display unit is performed, the control unit performs control for connecting the information processing device to the selected other information processing device.

(5) The information processing device according to (4),
wherein the control unit performs control of transmitting a connection request for connecting to the selected other information processing device to the other information processing device by utilizing the wireless communication.

(6) The information processing device according to any of (1) to (5),
wherein the control unit performs control of making the display unit display information related to another information processing device, which is information including at least one of communication speed information, charging information and point information, in association with the other information processing device.

(7) The information processing device according to any of (1) to (6),
wherein the control unit performs control of making the display unit display at least one of user information related to a user managing another information processing device and service information related to a service that the other information processing device is capable of providing by utilizing the wireless communication in association with the other information processing device.

(8) The information processing device according to any of (1) to (7),
wherein the control unit makes the display unit display point information related to another information processing device in association with the other information processing device, and performs control for exchanging the point information with the other information processing device when the information processing device is connected to the other information processing device by utilizing the wireless communication.

(9) The information processing device according to (8),
wherein the control unit performs control for transferring a point specified by the point information to the other information processing device when the information processing device is connected to the other information processing device by utilizing the wireless communication.

(10) The information processing device according to (9),
wherein the point is set on the basis of connection time with the other information processing device.

(11) The information processing device according to any of (1) to (10),
wherein the control unit performs control of making the display unit display priority information related to the route information, on the basis of setting information set beforehand.

(12) The information processing device according to (11),
wherein the setting information includes at least one of communication speed information, charging information, point information and user information related to a user managing the information processing device, and
wherein the control unit extracts an information processing device satisfying at least one of information items included in the setting information from the plurality of information processing devices and performs control of making the display unit display the priority information for specifying the extracted information processing device or a route for connecting to the information processing device.

(13) The information processing device according to any of (1) to (12),
wherein the control unit performs control of making the display unit display each of the plurality of information processing devices distinguishably in group units.

(14) The information processing device according to any of (1) to (13),
wherein, when a selecting operation of selecting another information processing device to be a provision destination of a service is accepted, the control unit performs control for providing the selected other information processing device with the service by utilizing the wireless communication.

(15) The information processing device according to any of (1) to (14),
wherein the control unit makes the display unit display each of the plurality of information processing devices distinguishably in group units, and when a selecting operation of selecting a group to be a provision destination of a service is accepted, the control unit performs control for providing each information processing device belonging to the selected group with the service by utilizing the wireless communication.

(16) The information processing device according to any of (1) to (15),
wherein, when a selecting operation of selecting another information processing device to be made to execute a predetermined operation is accepted, the control unit performs control for making the selected other information processing device execute the predetermined operation by utilizing the wireless communication.

(17) The information processing device according to any of (1) to (16),
wherein the operation input is at least one of a touch operation on a display surface of the display unit and an operation by a pointer using a pointing device.

(18) The information processing device according to any of (1) to (17),
wherein, when a connection request from another information processing device displayed as the route information is received, the control unit makes the display unit display notice information for notifying that the connection request is received, and controls the wireless communication with the other information processing device on the basis of the operation input related to whether or not to permit connection for the connection request.

(19) An information processing method including:
a display procedure of making a display unit display, as route information, relations between a plurality of information processing devices and routes related to wireless communication in a network in which the plurality of information processing devices are interconnected by the plurality of information processing devices performing the wireless communication in a one-to-one manner; and
a control procedure of controlling the wireless communication in the network on the basis of operation input related to the route information.

(20) A program that makes a computer execute:
a display procedure of making a display unit display, as route information, relations between a plurality of information processing devices and routes related to wireless communication in a network in which the plurality of information processing devices are interconnected by the plurality of information processing devices performing the wireless communication in a one-to-one manner; and
a control procedure of controlling the wireless communication in the network on the basis of operation input related to the route information.

REFERENCE SIGNS LIST 10, 40 communication system
11-19, 100 information processing device
21, 22 base station
41 network
101 bus
110 communication unit
111 antenna
120 I/O interface
130 control unit
140 memory
150 position information acquiring unit
160 operation accepting unit
170 input/output unit
171 input unit
172 display unit
180 voice output unit
400 information processing device (SNS)
410 communication unit
420 control unit
430 registration information management database
900 smartphone
901 processor
902 memory
903 storage
904 external connection interface
906 camera
907 sensor
908 microphone
909 input device
910 display device
911 speaker
913 wireless communication interface
914 antenna switch
915 antenna
917 but
918 battery
919 auxiliary controller
920 car navigation device
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle-side module

The invention claimed is:
1. A first information processing device, comprising:
a display device; and
a central processing unit (CPU) configured to:
control the display device to display route information, wherein the route information indicates relations between the first information processing device and a plurality of information processing devices, and routes related to wireless communication in a network,
wherein the first information processing device and the plurality of information processing devices are interconnected in the network and wirelessly communicate with each other in a one-to-one manner;
acquire a first user operation input related to the displayed route information;
determine connection route information based on the first user operation input, wherein the connection route information indicates a connection route between the first information processing device and a second information processing device of the plurality of information processing devices;
transmit a first connection request to the second information processing device based on the connection route information, wherein the first connection request comprises a first request to connect to the second information processing device; and control the wireless communication between the first information processing device and the second information processing device based on the first connection request.

2. The first information processing device according to claim 1,
wherein the CPU is further configured to control the display device to display, as the route information, at least one of the connection route information or connection candidate route information,
wherein the connection candidate route information indicates a route via which the first information processing device has capability to connect to a third information processing device of the plurality of information processing devices based on the wireless communication.

3. The first information processing device according to claim 2,
wherein the first user operation input comprises a selection of the connection route between the first information processing device and the second information processing device,
wherein the CPU is further configured to:
select the connection route based on the connection candidate route information displayed at the display device; and
connect the first information processing device and the second information processing device via the selected connection route.

4. The first information processing device according to claim 1,
wherein the first user operation input comprises a selection of a fourth information processing device of the plurality of information processing devices displayed at the display device, and
wherein the CPU is further configured to connect the first information processing device to the fourth information processing device.

5. The first information processing device according to claim 4,
wherein the CPU is further configured to transmit a second connection request to the fourth information processing device based on the wireless communication, and
wherein the second connection request comprises a second request to connect to the fourth information processing device.

6. The first information processing device according to claim 1,
wherein the CPU is further configured to control the display device to display information related to a fifth information processing device of the plurality of information processing devices, wherein the information is displayed in association with the fifth information processing device, and
wherein the information comprises at least one of communication speed information, charging information, or point information.

7. The first information processing device according to claim 1,
wherein the CPU is further configured to control the display device to display at least one of
user information related to a user associated with a sixth information processing device of the plurality of information processing devices or
service information related to a service that the sixth information processing device has capability to provide based on the wireless communication, and
wherein the at least one of the user information or the service information is displayed in association with the sixth information processing device.

8. The first information processing device according to claim 1,
wherein the CPU is further configured to:
control the display device to display point information related to a seventh information processing device of the plurality of information processing devices, wherein the point information is displayed in association with the seventh information processing device; and
exchange the point information with the seventh information processing device via the wireless communication based on a connection between the first information processing device and the seventh information processing device.

9. The first information processing device according to claim 8,
wherein the CPU is further configured to transfer a point specified by the point information to the seventh information processing device, and
wherein the point is transferred via the wireless communication based on the connection between the first information processing device and the seventh information processing device.

10. The first information processing device according to claim 9,
wherein the point is set based on a connection time of the connection between the first information processing device and the seventh information processing device.

11. The first information processing device according to claim 1,
wherein the CPU is further configured to:
determine priority information associated with the route information based on setting information stored in the first information processing device; and
control the display device to display the priority information.

12. The first information processing device according to claim 11,
wherein the setting information includes at least one of communication speed information, charging information, point information, or user information related to a user associated with the first information processing device, and
wherein the CPU is further configured to:
extract an eighth information processing device from the plurality of information processing devices based on the setting information; and
control the display device to display the priority information,
wherein the displayed priority information specifies at least one of the eighth information processing device or a route for connection between the eighth information processing device and the first information processing device.

13. The first information processing device according to claim 1,
wherein the CPU is further configured to control the display device to display the first information processing device and each of the plurality of information processing devices distinguishably in groups.

14. The first information processing device according to claim 1,
wherein the CPU is further configured to provide a service to a ninth information processing device of the plurality of information processing devices based on the wireless communication and acceptance of a selecting operation to select the ninth information processing device as provision destination of the service.

15. The first information processing device according to claim 1,
wherein the CPU is further configured to:
control the display device to display the first information processing device and each of the plurality of information processing devices distinguishably in groups; and
provide a service to each information processing device of the plurality of information processing devices that belongs to a group based on the wireless communication and acceptance of a selecting operation to select the group as a provision destination of the service.

16. The first information processing device according to claim 1,
wherein the CPU is further configured to control a tenth information processing device of the plurality of information processing devices to execute an operation based on acceptance of a selecting operation to select the tenth information processing device to execute the operation, and
wherein the tenth information processing device is controlled based on the wireless communication.

17. The first information processing device according to claim 1,
wherein the first user operation input is at least one of a touch operation on a display surface of the display device or an operation by a pointer based on a pointing device.

18. The first information processing device according to claim 1,
wherein the CPU is further configured to:
control the display device to display notice information based on reception of a second connection request from an eleventh information processing device of the plurality of information processing devices; and
control the wireless communication with the eleventh information processing device based on a second user operation input related to connection permission for the second connection request.

19. An information processing method, comprising:
in a first information processing device comprising a display device and a central processing unit (CPU):
controlling the display device to display route information, wherein the route information indicates relations between the first information processing device and a plurality of information processing devices, and routes related to wireless communication in a network,
wherein the first information processing device and the plurality of information processing devices are interconnected in the network and wirelessly communicate with each other in a one-to-one manner;
acquiring a user operation input related to the displayed route information;
determining connection route information based on the user operation input, wherein the connection route information indicates a connection route between the first information processing device and a second information processing device of the plurality of information processing devices;
transmitting a connection request to the second information processing device based on the connection route information, wherein the connection request comprises a request to connect to the second information processing device; and
controlling the wireless communication between the first information processing device and the second information processing device based on the connection request.

20. A non-transitory computer-readable medium having stored thereon, computer-executable instructions which, when executed by a computer, cause the computer to execute operations, the operations comprising:
controlling a display device to display route information, wherein the route information indicates relations between a first information processing device and a plurality of information processing devices, and routes related to wireless communication in a network,
wherein the first information processing device and the plurality of information processing devices are interconnected in the network and wirelessly communicate with each other in a one-to-one manner;
acquiring a user operation input related to the displayed route information;
determining connection route information based on the user operation input, wherein the connection route information indicates a connection route between the first information processing device and a second information processing device of the plurality of information processing devices;
transmitting a connection request to the second information processing device based on the connection route information, wherein the connection request comprises a request to connect to the second information processing device; and
controlling the wireless communication between the first information processing device and the second information processing device based on the connection request.

* * * * *